(12) United States Patent
Governale et al.

(10) Patent No.: US 10,439,831 B1
(45) Date of Patent: Oct. 8, 2019

(54) MEDIA CONTROL SYSTEM, PLATFORM AND METHOD

(75) Inventors: Nicholas A. Governale, Nesconset, NY (US); Edward G. Behan, East Point, GA (US); Michael Gutman, Commack, NY (US)

(73) Assignee: GLOBECOMM SYSTEMS INC., Hauppauge, NY (US)

(*) Notice: Subject to any disclaimer, the term of this patent is extended or adjusted under 35 U.S.C. 154(b) by 559 days.

(21) Appl. No.: 13/421,831

(22) Filed: Mar. 15, 2012

Related U.S. Application Data

(63) Continuation of application No. 13/199,550, filed on Aug. 31, 2011, now abandoned.

(60) Provisional application No. 61/518,239, filed on Apr. 30, 2011, provisional application No. 61/402,629, filed on Aug. 31, 2010.

(51) Int. Cl.
  *G06F 15/173* (2006.01)
  *H04L 12/14* (2006.01)
  *H04N 21/61* (2011.01)

(52) U.S. Cl.
  CPC ......... *H04L 12/14* (2013.01); *H04N 21/6125* (2013.01)

(58) Field of Classification Search
  CPC .............................. H04L 12/14; H04N 21/6125
  See application file for complete search history.

(56) References Cited

U.S. PATENT DOCUMENTS

| 5,537,141 A | 7/1996 | Harper et al. ................... 348/12 |
| 6,490,273 B1 * | 12/2002 | DeNap ................ H04L 12/5601 370/352 |
| 7,016,843 B2 * | 3/2006 | Fitzpatrick .............. G10L 15/26 379/88.01 |
| D552,568 S | 10/2007 | Harper et al. ................ D14/126 |
| D553,107 S | 10/2007 | Harper et al. ................ D14/126 |
| 7,653,574 B2 | 1/2010 | Harper et al. ................... 705/26 |
| 7,676,436 B2 | 3/2010 | Harper et al. ................... 705/51 |
| 7,835,991 B2 | 11/2010 | Harper et al. ................... 705/57 |
| 8,776,105 B2 * | 7/2014 | Sinha .................... G06T 1/0021 725/19 |
| 2002/0143901 A1 * | 10/2002 | Lupo ...................... G06Q 30/06 709/219 |
| 2003/0033390 A1 * | 2/2003 | Yonezawa .............. G06Q 30/02 709/220 |

(Continued)

*Primary Examiner* — Dhairya A Patel
(74) *Attorney, Agent, or Firm* — Pollack, P.C.

(57) ABSTRACT

An interactive, program-controlled, enterprise management system for selective access to operation, design, delivery and control of TCP/IP data over an interactive global communications network. The system comprises, for instance, a publisher module for creating content on the network including live events and uploading of video-on-demand programming; a single director module for controlling access to, and managing viewing of, the network content in real-time or live, including management of the live events with selective control over creation and management of slides, polling and on-line chat; an engineer module for controlling network infrastructure including encoders and media servers, real-time network status and access to any open trouble tickets on the network; and an administrator module for managing the viewer database, testing database, usage reports, billing and analytics.

5 Claims, 49 Drawing Sheets

(56) References Cited

U.S. PATENT DOCUMENTS

| | | | | |
|---|---|---|---|---|
| 2005/0102703 | A1* | 5/2005 | Querashi | H04H 20/82 |
| | | | | 725/117 |
| 2007/0107012 | A1* | 5/2007 | Rachamadugu | G06F 17/30017 |
| | | | | 725/34 |
| 2009/0078108 | A1* | 3/2009 | Rowe | G10H 1/0025 |
| | | | | 84/601 |
| 2009/0094376 | A1* | 4/2009 | Kosiba | H04L 29/06027 |
| | | | | 709/231 |
| 2009/0124376 | A1* | 5/2009 | Kelly | G07F 17/3206 |
| | | | | 463/29 |
| 2010/0062840 | A1* | 3/2010 | Herrmann | G07F 17/32 |
| | | | | 463/25 |
| 2013/0179275 | A1* | 7/2013 | Harb | G06Q 30/0277 |
| | | | | 705/14.73 |

* cited by examiner

MEDIA CONTROL SYSTEM, PLATFORM AND METHOD

This Application is a Continuation of U.S. patent application Ser. No. 13/199,550, filed Aug. 31, 2011 now abandoned, the disclosure of which is hereby incorporated by reference herein in its entirety, which Continuation is based on and claims priority of U.S. Provisional Patent Application Ser. No. 61/518,239, filed Apr. 30, 2011, and U.S. Provisional Patent Application Ser. No. 61/402,629, filed Aug. 31, 2010, the disclosures of which are hereby also incorporated by reference herein in their entireties.

FIELD OF THE INVENTION

The present invention relates generally to communications networks and, more particularly, to networks operating over the Internet and satellite for global applications.

BACKGROUND OF THE INVENTION

During the course of evolution of communications networks for global applications, such as those operating over the Internet and satellite, and the vast array of options that have been presented to Users, unique problems of complexity, practicality, security and universality have also arisen. These problems have made such networks not only complex, difficult and expensive to use, particularly for the enterprise, but have also created a great technological divide between the various media available, particularly between conventional satellite, cable television, telephones, cellular telephones and like mobile devices, as well as desktop/laptop computers operating over the Internet.

Specifically, while individual systems and solutions have been developed for operation over one or more of the respective communications networks, such systems have been found lacking in integration, for instance, the ability to effect digital display of both Live and On-Demand Media. These systems have also been found deficient in global reach, i.e., the ability to reach a global audience, and/or to reach computers, televisions and mobile devices. Other systems lack the capacity to effect multiple Content Delivery Network Internet delivery, interact with mobile devices, provide fluid communications across Internet, Satellite and Enterprise, e.g, Corporate, Networks, or interactivity between the presenter and the viewer. Consistently, conventional systems and solutions also have architectures that limit or even preclude system customization, extension, and/or expansion and growth by the User, according to market forces and customer needs.

Long standing systems for control and management of a viewer's experience in Real-Time or Live have been apparent in the Television Broadcast and Cable Television industries. For decades, when watching the Super Bowl, for instance, there are about 100 cameras on the event, and what the viewer sees at any given moment is controlled by a director or production manager in a Broadcast Studio. Although content and presentation is typically controlled by the production manager, interactivity by the Viewer and others who may act as a System Administrator have been found limited.

A platform, system and a service are, therefore, desired that run over the Internet for control and management of a viewer's experience in Real-Time or Live.

OBJECTS AND SUMMARY OF THE INVENTION

Accordingly, it is an object of the present invention to provide an interactive media system, platform and method for control and management of delivery of content over one or more TCP/IP enabled networks.

Another object of the present invention is to provide an Enterprise Media Control Platform for delivery, over a TCP/IP enabled network, of communications (e.g., corporate communications) which provide interactivity between presenter(s) and one or more viewers.

A further object of the present invention is to provide an Enterprise Media Control Platform that operates over multiple TCP/IP enabled transport architectures, i.e., satellite, terrestrial, mobile, and/or asymmetrical transport networks or the like.

Yet another object of the present invention is to provide simplified, streamlined access to system functionality, namely, by providing ready access to functions rather than having them buried in layers of menus/sub menus, or hidden deep in application panels.

Still another object of the present invention is to enable a provider of a service underlying the Enterprise Media Control Platform and System the ability to easily add/remove new and existing areas to the system, without having to redesign navigational or other application architecture(s), thereby permitting extensive, customer/market specific customization capabilities, that can be done quickly.

Yet a further object of the present invention is to support rapid modification of any application area, as needed, for changing deployment environments (e.g., Satellite, Mobile, Desktop) and customers, without affecting the rest of the application architecture or programming.

Still a further object of the present invention is to support the capability of delivering Cloud-like Software as a Service (SaaS) access to any application area defined in the system, or to be added in the future.

Another object of the present invention is to provide an Enterprise Media Control Platform and System with Modular Chairs, namely, a Publisher's Module (or Chair), a Director's Chair, an Engineer's Chair, and an Administrator's Chair, for one-click access to all major application areas, for any of a series of User types, including a Master, a Publisher, a Presenter, an Engineer, an Administrator, a Director and a Viewer.

Still another object of the present invention is to allow a provider of the service underlying the Enterprise Media Control Platform and System to offer customized subsets of any of the Modular Chairs or its supporting application Consoles, many of which are designed to operate as independent, vertical market ready applications, or collectively as part of the Platform and System.

Yet another object of the present invention is to provide an Enterprise Media Control Platform and System supported by secure Web Services, which may be readily used to enable integration to customer/third party systems, partnership opportunities and rapid integration with third party applications and, thereby, open-up a wide range of rapid entree opportunities into new markets.

Still a further object of the present invention is to provide an Enterprise Media Control Platform and System with a video and communications architecture built using next generation code and classes, thereby enabling a provider of the Service underlying the Platform and System to offer unique capabilities such as Adaptive Quality of Service and Bandwidth/Stream Switching (AQUA BASS) for fluid content delivery at the highest possible quality for each Viewer's connection speed, a multi-casting option for high efficiency customer deployments, RTSP protocol switching for satellite and set-top box (STB) deployment support, and other unique capabilities that are not otherwise available in the marketplace.

A further object of the present invention is to provide an Enterprise Media Control Platform and System that allows operation by a user, who acts as a production manager, to control and manage each viewer's experience in Real-Time or Live.

Yet a further object of the present invention is to provide a secure platform for publishing content, conducting interactive live events, and managing each viewer's access to programming.

Still another object of the present invention is to offer interactive, high quality video broadcasts with integrated polling and chat features, and to capture meaningful analytics on viewing behavior and testing results to improve effectiveness of enterprise communications.

Yet another object of the present invention is to provide an Enterprise Media Control Platform and System that is fully SCORM 1.2 compliant.

Another object of the present invention is to provide an interactive, program-controlled, enterprise management system for selective access to operation, design, delivery and control of TCP/IP data as a Web application over an interactive global communications network.

A further object of the present invention is to provide an interactive, program-controlled, enterprise management system as a Web application as an alternative to a client server application.

According to one aspect of the present invention, an interactive system is provided for control and management of the delivery of content over one or more TCP/IP enabled networks.

In accordance with another aspect of the present invention, there is provided an interactive, program-controlled, enterprise management system for selective access to operation, design, delivery and control of TCP/IP data as a Web application over an interactive global communications network. The system comprises a publisher module for creating content on the network including live events and uploading of video-on-demand programming; a single director module for controlling access to, and managing viewing of, the network content in real-time or live, including management of the live events with selective control over creation and management of slides, polling and on-line chat; an engineer module for controlling network infrastructure including encoders and media servers, real-time network status and access to any open trouble tickets on the network; and an administrator module for managing the viewer database, testing database, usage reports, billing and analytics. The system permits networks to distribute across multiple Internet content delivery networks for reaching and interacting with computers, televisions and mobile devices globally, while concurrently allowing an operator, e.g., an enterprise, to create and customize a secure, private network for its internal communications, employee training and digital display. Alternatively or concurrently, the administrator module is integrated with pre-existing enterprise systems to enhance workflow. Further in the alternative or concurrently therewith, the engineer module includes a virtual toolbox for speeding resolution of issues with an array of troubleshooting tools.

According to a further aspect of the present invention, there is provided an interactive, program-controlled, enterprise management system for selective access to operation, design, delivery and control of TCP/IP data as a Web application over an interactive global communications network. The system comprises a network including a plurality of servers for operation over the interactive global network, each server having one or more microprocessors and system memory; and a plurality of user devices each for presenting media content from the servers on a display, the display interfaced to the corresponding user device. At least one of the servers houses a publisher module for creating content on the network including live events and uploading of video-on-demand programming. At least one of the servers houses a single director module housed on at least one of the servers for controlling access to, and managing viewing of, the network content in real-time or live, including management of the live events with selective control over creation and management of slides, polling and online chat. Also, at least one of the servers houses an engineer module for controlling network infrastructure including encoders and media servers, real-time network status and access to any open trouble tickets on the network. In addition, at least one of the servers houses an administrator module for managing the viewer database, testing database, usage reports, billing and analytics, the administrator module including at least one function for administrator switching such that the operating node of the system for managing the viewer database, testing database, usage reports, billing and analytics is selectively switchable by and between one or more users of the system. The system further comprises a master control user interface for one-click access to each of the publisher, director, engineer and administrator modules so as to provide user access to and interaction with the major application areas corresponding to the respective modules for the entirety of control and management of the system by the user. The system permits networks to distribute across multiple Internet content delivery networks including satellite, terrestrial, mobile, symmetrical and asymmetrical transport to reach and interact with computers, televisions and mobile devices interactively and globally, and concurrently allow an operator to create and customize a secure, private network for its internal communications, employee training and digital display. Each of the modules is stored in the system memory and is executed by one or more of the microprocessors on the at least one server housing the respective module(s).

According to yet another aspect of the present invention, there is provided a program-controlled apparatus including an enterprise management platform and interactive system for control and management of the delivery of content over one or more TCP/IP enabled networks, the platform and interactive system having cloud-based programming modules for providing selective access to operation, design, delivery and control, respectively, of TCP/IP data as a Web application over an interactive global communications network, the platform and interactive system modules further permitting distribution of TCP/IP data across multiple Internet content delivery networks for reaching and interacting with computers, televisions and mobile devices interactively and globally, while concurrently allowing an operator to create and customize a secure, private network for its internal communications, employee training and digital display. The system comprises a network including a plurality of cloud-based servers for operation over the global network, each server having one or more microprocessors and system memory; and a plurality of user devices each for presenting media content from the servers on a display, the display interfaced to the corresponding user device. At least one of the servers houses a publisher module for creating content on the network including live events and uploading of video-on-demand programming. Also, at least one of the servers houses a single director module housed on at least one of the servers for controlling access to, and managing viewing of, the network content in real-time or live, including management of the live events with selective control over creation and management of slides, polling and online chat. Additionally, at least one of the servers houses an engineer module for controlling network infrastructure including encoders and media servers, real-time network status and access to any open trouble tickets on the network. Furthermore, at least one of the servers housing an administrator module for managing the viewer database, testing database, usage reports, billing and analytics, the administrator module including at least one function for administrator switching such that the operating node of the system for managing the viewer database, testing database, usage reports, billing and analytics is selectively switchable by and between one or more users of the system. The system includes a master control user interface for one-click access to each of the publisher, director, engineer and administrator modules for user access to and interaction with each of the major application areas corresponding to the respective modules for the entirety of control and management of the system by the user; wherein the system concurrently allows an operator to create and customize a secure, private network for its internal communications, employee training and digital display. Each of the modules is stored in the system memory and is executed by one or more of the microprocessors on the at least one server housing the respective module(s). The one or more TCP/IP enabled networks includes satellite, terrestrial, mobile, symmetrical and asymmetrical transport for operation over the interactive global communications network.

In accordance with still another aspect of the present invention, a method is provided for selective access to operation, design, delivery and control of TCP/IP data as a Web application over an interactive global communications network using an interactive, program-controlled, enterprise management system. The system comprises a publisher module for creating content on the network including live events and uploading of video-on-demand programming; a single director module for controlling access to, and managing viewing of, the network content in real-time or live, including management of the live events with selective control over creation and management of slides, polling and on-line chat; an engineer module for controlling network infrastructure including encoders and media servers, real-time network status and access to any open trouble tickets on the network; and an administrator module for managing the viewer database, testing database, usage reports, billing and analytics. The system permits networks to distribute across multiple Internet content delivery networks for reaching and interacting with computers, televisions and mobile devices globally, while concurrently allowing an operator, e.g., an enterprise, to create and customize a secure, private network for its internal communications, employee training and digital display.

According to yet a further aspect of the present invention is a method for providing selective access to operation, design, delivery and control of TCP/IP data as a Web application over an interactive global communications network using an interactive, program-controlled, enterprise management system, the system including a network including a plurality of servers for operation over the interactive global network, each server having one or more microprocessors and system memory, and a plurality of user devices each for presenting media content on a display, the display interfaced to the corresponding user device. Initially, content is created on the network, using a publisher module housed on at least one of the servers, including live events and uploading of video-on-demand programming. Access to, and management of viewing of, the network content is controlled using a single director module housed on at least one of the servers, for in real-time or live, including management of the live events with selective control over creation and management of slides, polling and online chat. In addition, network infrastructure is controlled using encoders and media servers, real-time network status and access to any open trouble tickets on the network, using an engineer module housed on at least one of the servers. The viewer database, testing database, usage reports, billing and analytics are managed using an administrator module housed on at least one of the servers, the managing step including administrator switching, performed by at least one function of the administrator module, such that the operating node of the system for managing the viewer database, testing database, usage reports, billing and analytics is selectively switchable by and between one or more users of the system. Finally, data from the system is distributed across multiple Internet content delivery networks including satellite, terrestrial, mobile, symmetrical and asymmetrical to reach and interact with computers, televisions and mobile devices interactively and globally, and concurrently a secure, private network is created and customized by way of operator selection for its internal communications, employee training and digital display.

BRIEF DESCRIPTION OF THE DRAWINGS

Figure 4:
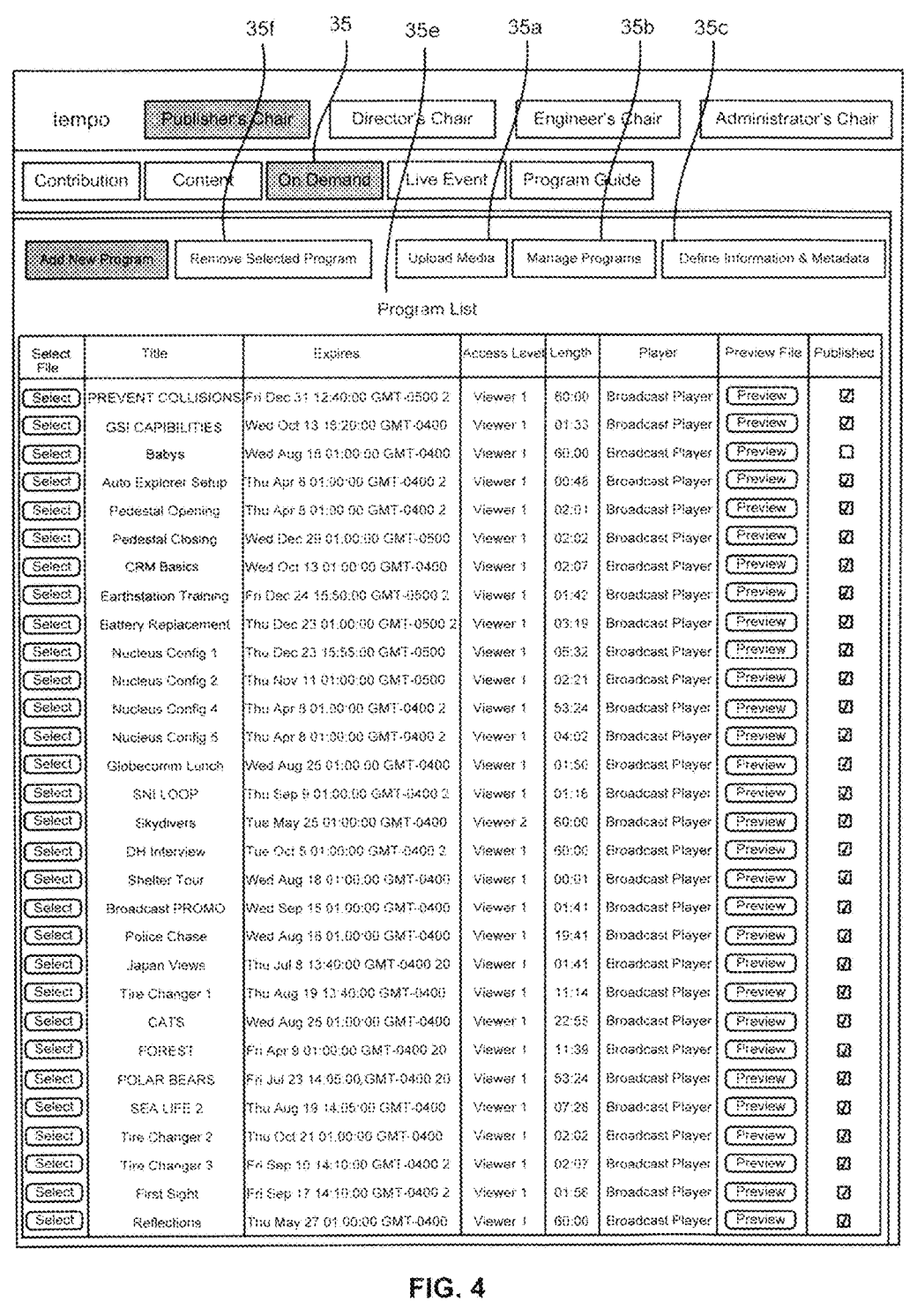

FIG. 4 shows an On-Demand Console of the Publisher's Chair, designated as an On-Demand Tab with a Program List and Add New Program/Remove Selected Program menu;

Figure 6:
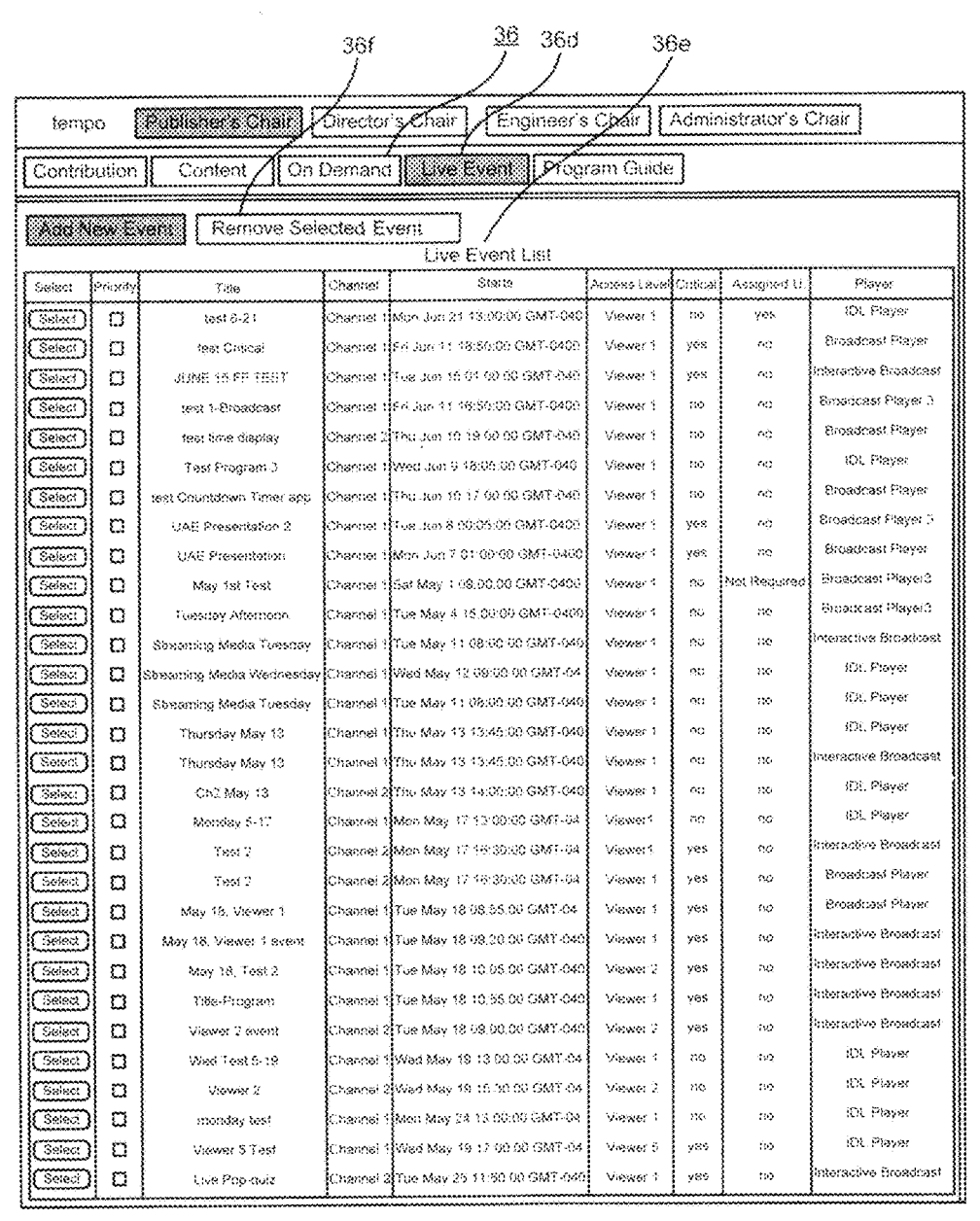

FIG. 6 illustrates a Live Events Console of the Publisher's Chair for live events management, with corresponding Live Events Tab, as viewed by the User, with Live Events List and Add New Event/Remove Selected Event menu;

FIG. 14 is a screen shot of a Master User Database (DB) Console of the Administrator's Chair set forth in FIG. 1, with corresponding Master User DB Console Tab for offering secure centralized User entry and management on top of secure Web Service API;

FIG. 15 illustrates a subset New User Panel or Tab of the Master User Database (DB) console shown in FIG. 14;

The same numerals are used throughout the figure drawings to designate similar elements. Still other objects and advantages of the present invention will become apparent from the following description of the preferred embodiments.

DETAILED DESCRIPTION OF THE PREFERRED EMBODIMENTS

Figure 1:
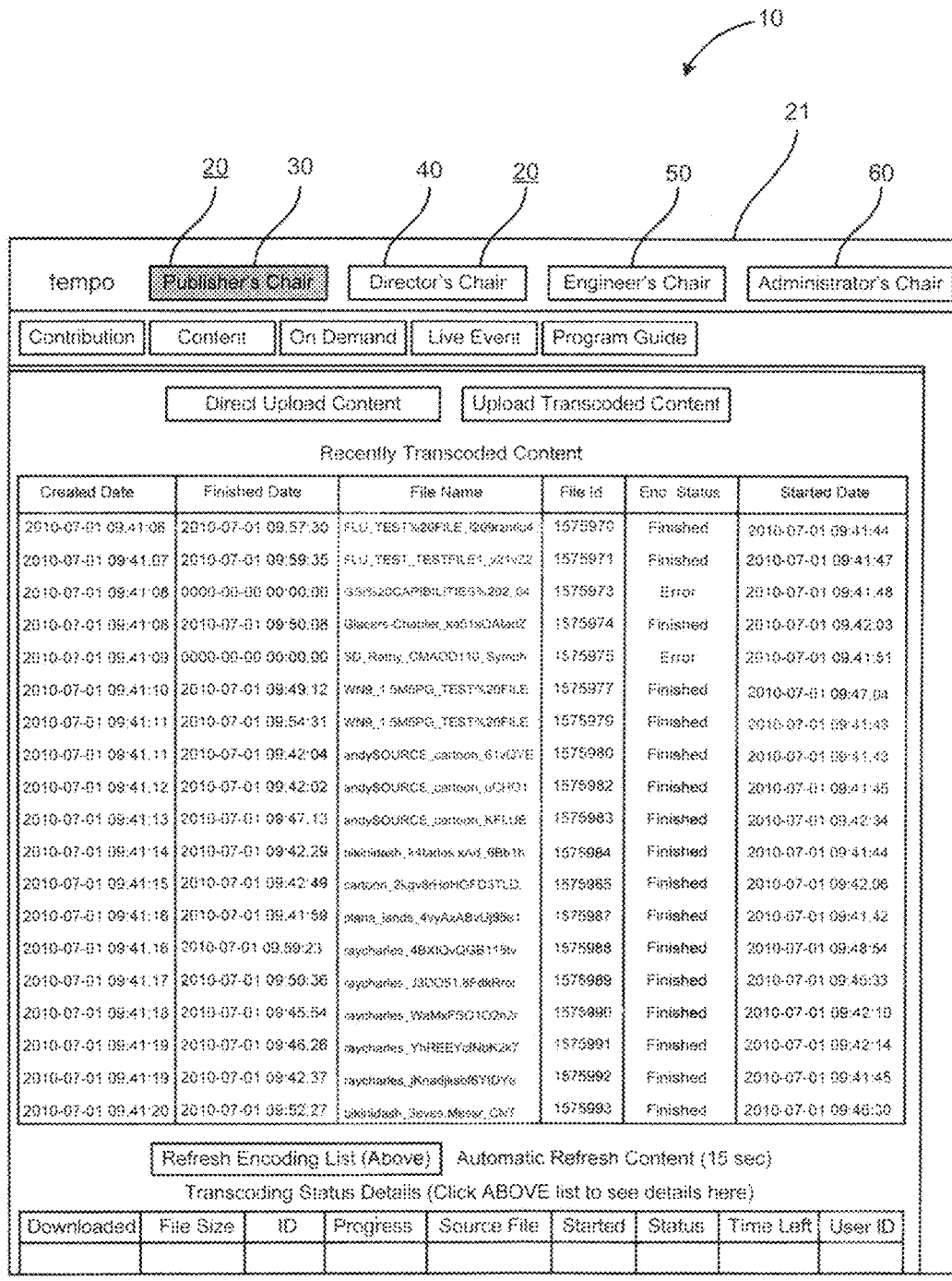
FIG. 1 is a screen shot of a Master Control Suite, according to one embodiment of the present invention, comprising a Publisher's Chair, a Director's Chair, an Engineer's Chair and an Administrator's Chair.
Figure 2:
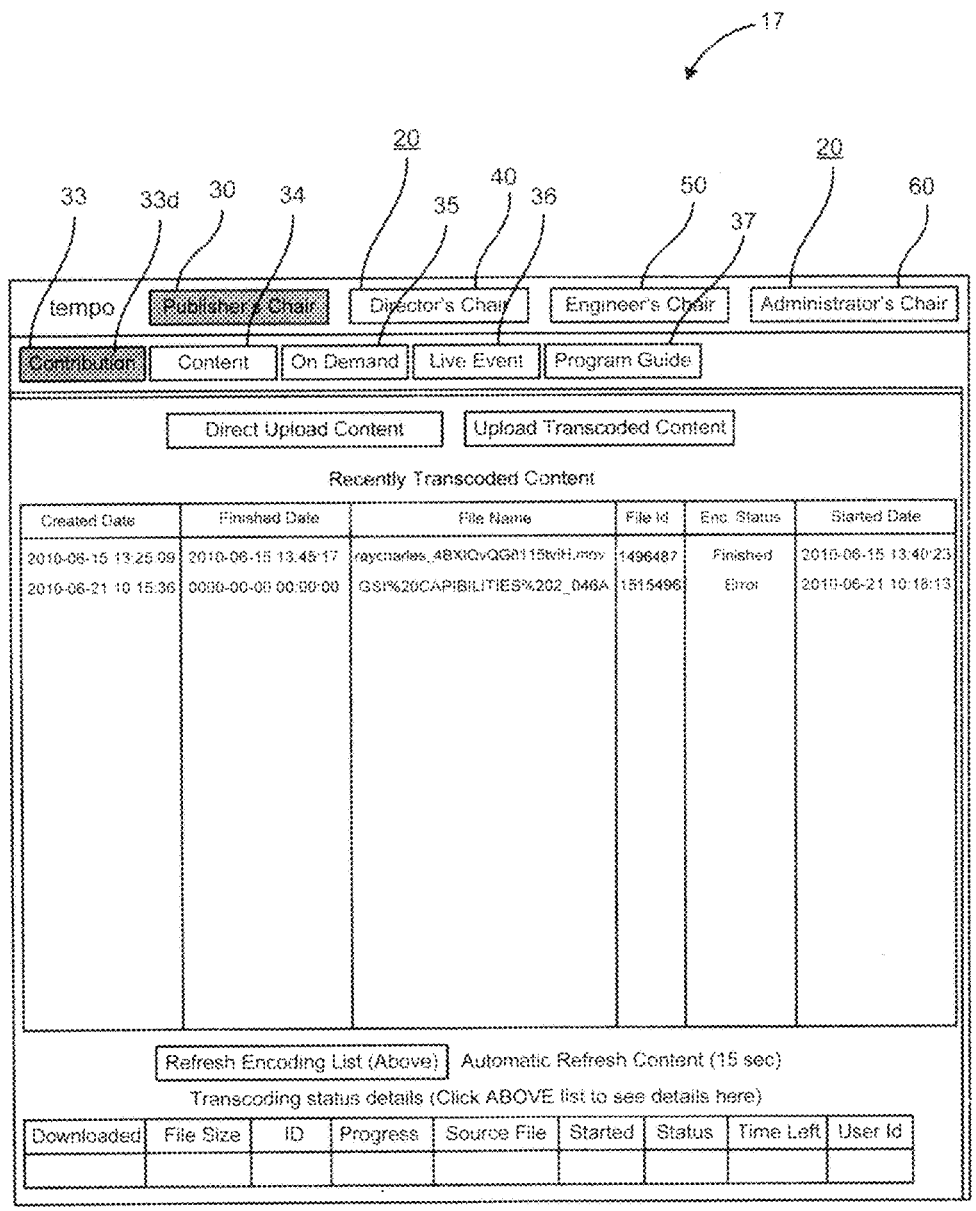
FIG. 2 shows a Contribution Console of the Publisher's Chair of FIG. 1, the Contribution Console designated to a User as a Contribution Tab with a listing of Recently Transcoded Content, Transcoding Status Details and Direct Upload Content/Uploaded Transcoded Content menu.
Figure 3:
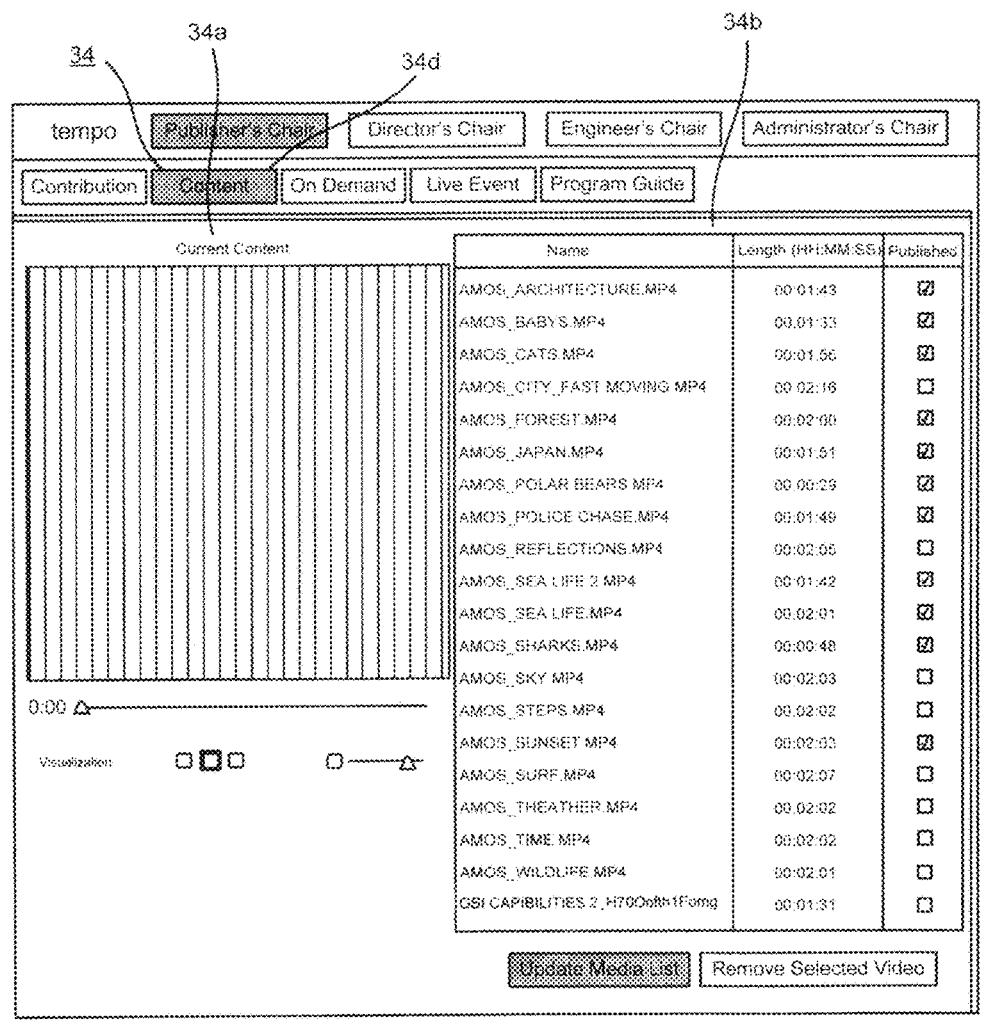
FIG. 3 illustrates a Content Console of the Publisher's Chair shown in FIG. 1, the Content Console designated to the User as a Content Console with Current Content and Update Media List/Remove Selected Video option.
Figure 5:
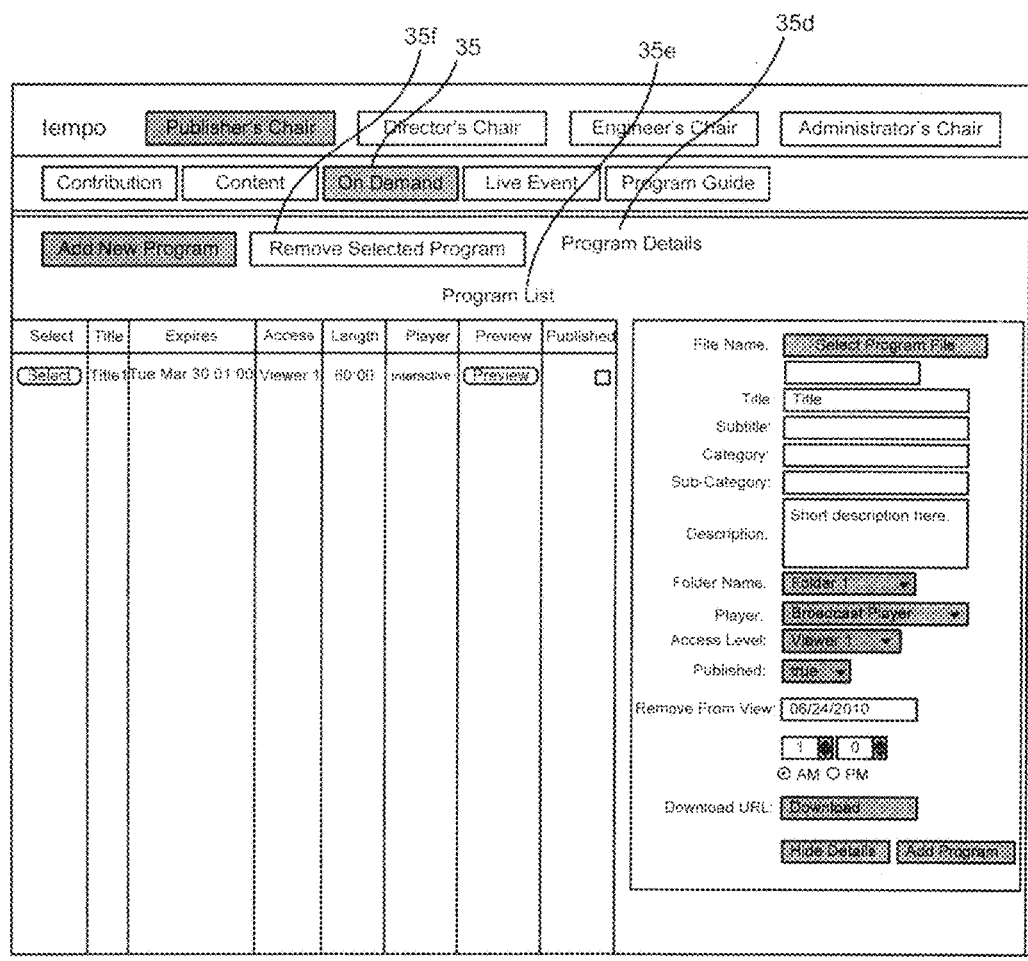
FIG. 5 is a screen shot of the On-Demand Tab set forth in FIG. 4 with Details Panel, according to another arrangement of the present invention.

Referring now to the drawings and, more particularly, to FIGS. 1-49, there is shown generally a specific, illustrative interactive platform, system and method for control and management of the delivery of content over one or more TCP/IP enabled networks, according to various aspects of the present invention. More particularly, the invention relates to an Enterprise Media Control Platform, System and a Service 10 for the delivery as a Web application, over a TCP/IP enabled network, of communications (e.g., corporate communications) providing interactivity between presenter(s) and viewers, ready customization, system analytics, and fluidity of operation and service. Alternatively or concurrently, the Platform operates over multiple TCP/IP enabled transport architectures, i.e., satellite, terrestrial, mobile, and/or asymmetrical transport networks or the like.

In one embodiment, best seen in FIGS. 42-45, an interactive, program-controlled, enterprise management platform and system, also known as TEMPO, is provided for selective access to operation, design, delivery and control of TCP/IP data 12 as a Web application over an interactive global communications network 11. The system desirably allows networks to distribute across multiple Internet content delivery networks for reaching and interacting with Computers 13, Televisions 14 and Mobile Devices 15 globally, and concurrently allowing an operator to create and customize a secure, private network 16 for its internal communications, employee training and digital display.

Generally speaking, the Service of the network of systems and software modules of the present invention provide control functions individually, namely, by a single production manager. In this respect, the embodiment combines the software and applicable apparatus into a system. The software modules 20 include a Publisher's Chair 30, a Director's Chair 40, an Engineer's Chair 50, and an Administrator's Chair 60. These modules are operated through a Master Control Website/Suite 21 that allows access to four (4) main operational control tables: also referred to as the Publisher's Chair, Director's Chair, Engineer's Chair and Administrator's Chair. Simply put, the system is a combination of infrastructure and software modules for single production manager control. A representative Master Control Suite is shown, for example, in FIGS. 1 and 2.

Master Control Suite 21 is also an interface which allows Users to manage all aspects of an Enterprise Media Network of the present invention. According to one aspect of the present invention, an Enterprise Media Control Platform and System 17 are provided, comprising the plurality of, and preferably four (4) or more, Modules (or Chairs) for one-click access to all major application areas of the interactive system by any of a series of User types, namely, a Master 22 (e.g., Globecomm Systems Service), a Publisher 31, a Director 41, an Engineer 51, an Administrator 61, a Presenter 70, and a Viewer 80. Notably, a Network Administrator 62 has the ability to grant access to any number of individuals and designates which elements of the Master Control Suite each individual can access. For instance, a selected individual may be given access to review reports and analytics, but not have the ability to publish content on the Network.

With specific reference to the Viewer, the system, in turn, provides four (4) or more levels of Viewer Access. Each Module or Chair of the present invention has a plurality of supporting application Consoles (or Sub-Modules) 23. Moreover, the present invention concurrently integrates three (3) major Interfaces: (i) Internet/Computers 13, (ii) Television 14, and (iii) Mobile Devices 15 (e.g., Cellular Telephones and Personal Digital Assistants).

The first Module or Chair of the Platform and System for one-click access to all major application areas is a Publisher's Chair 32 for creating content on the network including live events and uploading of video-on-demand programming. More specifically, the Publisher's Chair provides an integrated media publishing environment for "Live" Video/Audio, Pre-recorded (On-Demand) Audio Video and Graphics, as well as the ability to automatically transcode the same for Mobile, Desktop, Television or Satellite applications. It also allows the User to customize what is viewed—fonts, colors and the arrangement thereof. The Publisher's Chair provides for dramatic decrease in learning time, time and effort related to integrating new programs, events and media, by automating the configuration of all key settings and the data conversion process. It also provides automated functionality and workflow which eliminates the need for the User to buy, learn and use complex third party software. Additionally, the Publisher's Chair enables the provider of the service underlying the Enterprise Media Control Platform and System to provide Cloud-based software as a Service (SaaS) options for the customer.

In one embodiment, the Publisher's Chair comprises a plurality of Consoles including, but not limited to, a Contribution Console 33, a Content Console 34, an On-Demand Console 35, a Live Event Console 36 and a Program Guide Console 37 (or simply a Program Guide—a primary viewer interface). The Contribution Console is preferably displayed to a User of the Publisher's Chair as a Contribution Tab 33*d* shown, for instance, in FIG. 2 with a listing of Recently Transcoded Content, Transcoding Status Details and Direct Upload Content/Uploaded Transcoded Content menu. The Contribution Console, in turn, comprises a series of subset functions, presently, one to Encode 33*a*, one to Transcode 33*b* and another to Upload data 33*c*. Encode function 33*a* of the Contribution Console desirably provides dedicated functionality to "get" content into the System and purpose/repurpose the same for one or more target environments including Mobile, Desktop, Television STB and Satellite. The Encode function automates the workflow of integrating new media and events, as well as any necessary encoding/transcoding of such media. Beneficially, it bypasses the need to use external encoders, transcoders or third party applications, while providing simple, transparent integration to the rest of Enterprise Media Control Platform and System 17. In addition, the Encode function eliminates all of the normal learning process necessary to determine optimal settings, saving the customer weeks of learning and effect.

The next subset function of the Contribution Console is Transcode function 33*b*. This function provides dedicated functionality to "get" content into the system and purpose/repurpose it for one or more target environments including Mobile, Desktop, Television STB and Satellite. Briefly, the Transcode function, like the Encode function, automates the workflow of integrating new media and events, and any necessary encoding/transcoding of the media. It bypasses the necessity of using external transcoders and third party applications, by providing simple, automated transcoding and integration to the rest of the Enterprise Media Control Platform and System. This function also supports automatic optimization of content to desired target environment(s) including Mobile, Desktop, Television, Satellite and others. The Transcode function allows the provider of the service underlying the Enterprise Media Control Platform and System to offer highly optimized transcoding either as part of the Platform, System and Service, or as a standalone SaaS/Cloud-based application. Such built-in automation and optimization then enables the service provider to provide both customer-specific and market-specific encoding services, within an automated environment that shields customers from all of the complexity and issues commonly associated with Encoding/Transcoding, while drastically reducing support costs and requirements.

The last subset function of the Contribution Console, in the present embodiment, is Upload function 33*c*. This function provides fully-integrated secure media upload capabilities using Serial File Transfer Protocol (SFTP). Advantageously, it automates the workflow of uploading new media and events, as well as needed encoding/transcoding of the media. The Upload function bypasses external FTP applications, providing automated content upload and integration to Enterprise Media Control Platform and System 17. In addition, it allows the Publisher to track the status and percent completed of the media being uploaded. Preferably, this function utilizes the most secure uploading software available, e.g., a conventional software application. This is distinct and different from most Content Delivery Networks (CDN's) such as YouTube and the like which incorporate little or no uploading security. Notably, the Upload function desirably supports multi-Giga Byte file sizes—far beyond what is possible with conventional Content Delivery Networks, and has built-in file integrity verification to ensure that files are not corrupted during uploading.

The next Module of the Publisher's Chair is Content Console 34. This Console includes a series of subset functions, currently, a Video Preview function 34*a* and a Video Management function 34*b*. A corresponding Content Tab 34*c*, as the Content Console is desirably viewed by a User, is shown, for instance, in FIG. 3 with Current Content 34*d* and Update Media List/Remove Selected Video option 34*e*. In general, the Content Console, via the subset functions, provides instant video preview capabilities, and the ability to manage/remove video content. In this manner, it facilitates video quality and inspection of audio for levels of verification. Further, it provides a straight-forward integrated environment for reviewing all prerecorded video content, viewing of which is being used for current programs, and the ability to readily remove any stale or undesired content.

Another Module of the Publisher's Chair is On-Demand Console 35. This Console has a plurality of subset functions, presently, an Upload Media function 35*a*, a Manage Programs function 35*b*, and a Define Information & Metadata function 35*c*. An On-Demand Tab 35*d* corresponding to the Content Console is preferably displayed, as shown, for instance, in FIG. 4 with a Program List 35*e* and Add New Program/Remove Selected Program menu 35*f*. In general, the On-Demand Console enables program management of Video-On-Demand (VOD) and, more particularly, allows the User to upload, manage and define all VOD programs including categories (Folders) for an Electronic Program Guide (EPG), and any necessary descriptive information for publication. Desirably, this Console automates the workflow of integrating new VOD programs, and provides an easy-to-use interface for adding, modifying and managing VOD programs. In accordance with another aspect of the present invention, a screen shot of an On-Demand Tab with Details Panel 35*g* is set forth in FIG. 5.

Functionality of conventional systems has included On-Demand only, which is a "push" and "play" system. Functionality of the present invention, on the other hand, includes various players with five (5) components—a video window component (e.g., flash media), a slide poll window component (e.g., showing poll results), a chat window component, a voice component (e.g., showing a User raising his/her hand; where the Director then gives him/her the microphone), and a User list component (e.g., showing who is in on the event). On-Demand capability is also provided. Hence, for each event, the User's view again is customizable.

A further Module of the Publisher's Chair is a Live Events Console 36 for live events management which permits a User to define, manage and set channel and event-related information for any and all Live Events. A Live Events Tab 36*d* corresponding to this Console, as it is desirably viewed by a User, is illustrated, for example, in FIG. 6 with Live Events List 36*e* and Add New Event/Remove Selected Event menu 36*f*. This Console includes a series of subset functions, for instance, a Define Event Source function 36*a*, a Manage Events function 36*b*, and a Define Event Information & Metadata function 36*c*. The Live Events Console provides highly efficient, streamlined entry and validation, eliminates common sources of complexity, errors and confusion, thereby enabling rapid usability and significantly reducing learning time and errors inherent in general purpose online events systems. In allowing setting of Player type (e.g., "Broadcast", "Corporate" or Interactive Distance Learning "IDL"), the Console automatically defines all of the dozens of related supported features and functions specific to the type of event that the player supports. This, in turn, avoids the need to configure and manage these automated settings, thereby eliminating much of the complexity of configuration and management.

Figure 7:
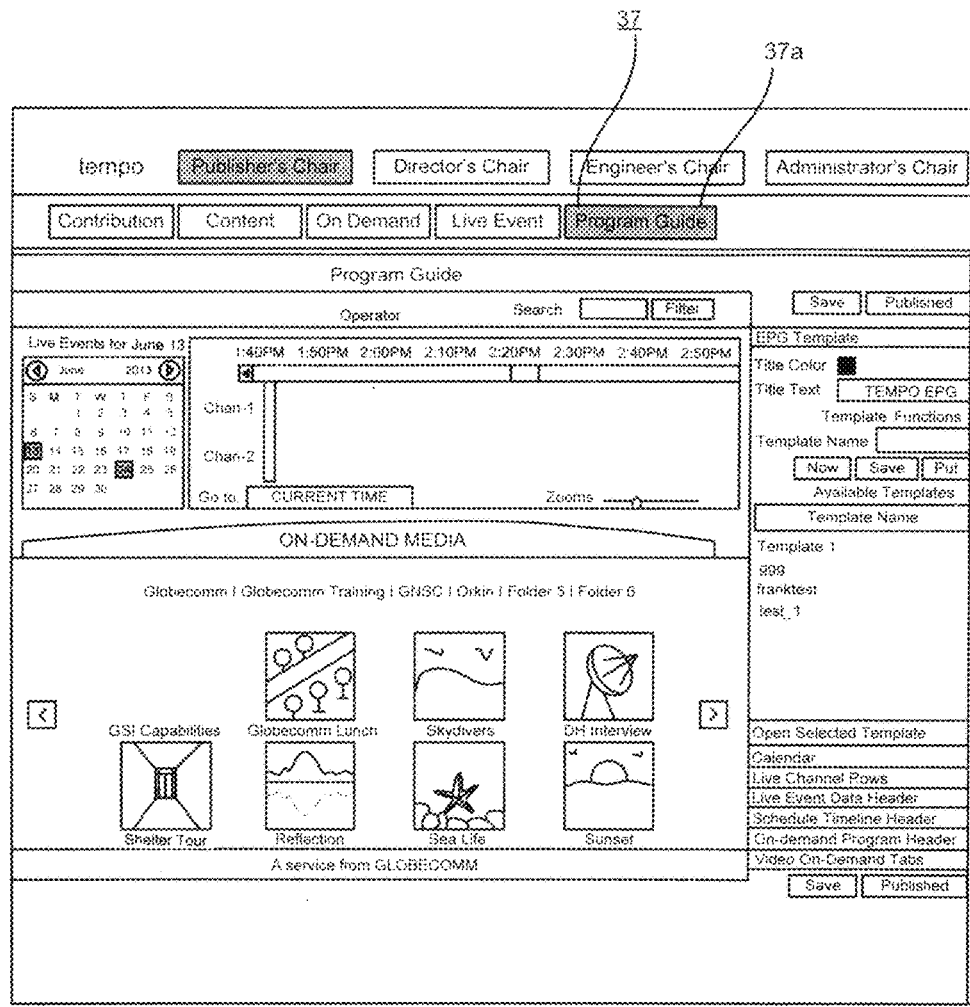
FIG. 7 is a Program Guide or Electronic Program Guide (EPG) Console of the Publisher's Chair, with corresponding Program. Guide Tab.

The last Module of the Publisher's Chair, according to the present embodiment, is Program Guide or Electronic Program Guide (EPG) Console 37. A screen shot of a representative Program Guide Tab 37a with corresponding operations is shown in FIG. 7. This Console provides an intuitive and easy-to-use Program Guide with both customer-specific and user-specific style and interface customization. The EPG Console's display of Live Events provides integrated, calendar, zoom, go now/go to date and other functions that provide ease to the User in finding and bringing up any given Live Event. User access to all Live Events may either be Open (i.e., free access to all Users) or Assigned (i.e., where the Administrator provides selected access—defines User/Viewer access to Live Events, as appropriate). With easy-to-use, folder-specific VOD content area, this Console provides simple navigation to all VOD content. Optimally, the EPG Console supports a plurality of different Viewer access levels, e.g., four or five, depending on the application, to VOD content, as well as content that can be set as Open Access for all Users. Additionally, an integrated real-time search engine is provided which permits rapid access to VOD content by any key metadata or related information. Notably, the Publisher's Chair, through the Live Events Console, provides an interface for scheduling start time and duration of Live Events in the Program Guide.

The second Module or Chair of the Platform and System for one-click access to all major application areas, and at the kernel of the present invention, is a single Director's Chair 42, i.e., a director or production manager for control and management of the viewer's experience in Real-Time or Live. In other words, the Director is the predominant chair for controlling and managing the User's experience. Unlike conventional systems, content, presentations, and various interactivity features are all controlled by a single "production manager" as a traditional production manager might control viewing of content in a Broadcast Studio. For instance, in the above-described example of a Viewer watching the Super Bowl, there are about 100 cameras on the event. What the viewer sees at any given moment is controlled by a Director. The Platform and System of the present invention brings that function, instead, to a service that runs over the Internet, the production manager being called a Director.

Generally speaking, the Director's Chair provides an integrated media publishing environment for "Live" Video/Audio, Pre-Recorded (On-Demand) Audio Video and Graphics, and the ability to automatically transcode the same for interfacing with a Mobile Device, Desktop, Television or Satellite. More specifically, the Director's Chair controls access to, and manages viewing of, network content in Real-Time or Live, including management of the live events with selective control over creation and management of slides, polling and on-line chat. It decreases dramatically the learning time of the User, as well as the time and effort related to integrating new programs, events and media, by automating the configuration of all key settings and of the associated conversion process. In providing automated functionality and workflow, the Director's Chair virtually eliminates the need for the User to buy, learn and use complex third party software. It is also designed to allow the provider of the service underlying the Enterprise Media Control Platform and System to supply Cloud-based Software as a Service (SaaS) option to the customer.

With the Director's Chair (which desirably comprises an Interactive Server), all modules are preferably enabled/disenabled from/by the Director's Chair. The Director's Chair desirably has control of all views from both the User's and Presenter's view. This Chair is the Master Control which essentially controls, enables and manages functionality, availability and views of the player window for both Users and Presenters. The corresponding screen provides the Director with all of the control features necessary to deliver the Broadcast.

Figure 8:
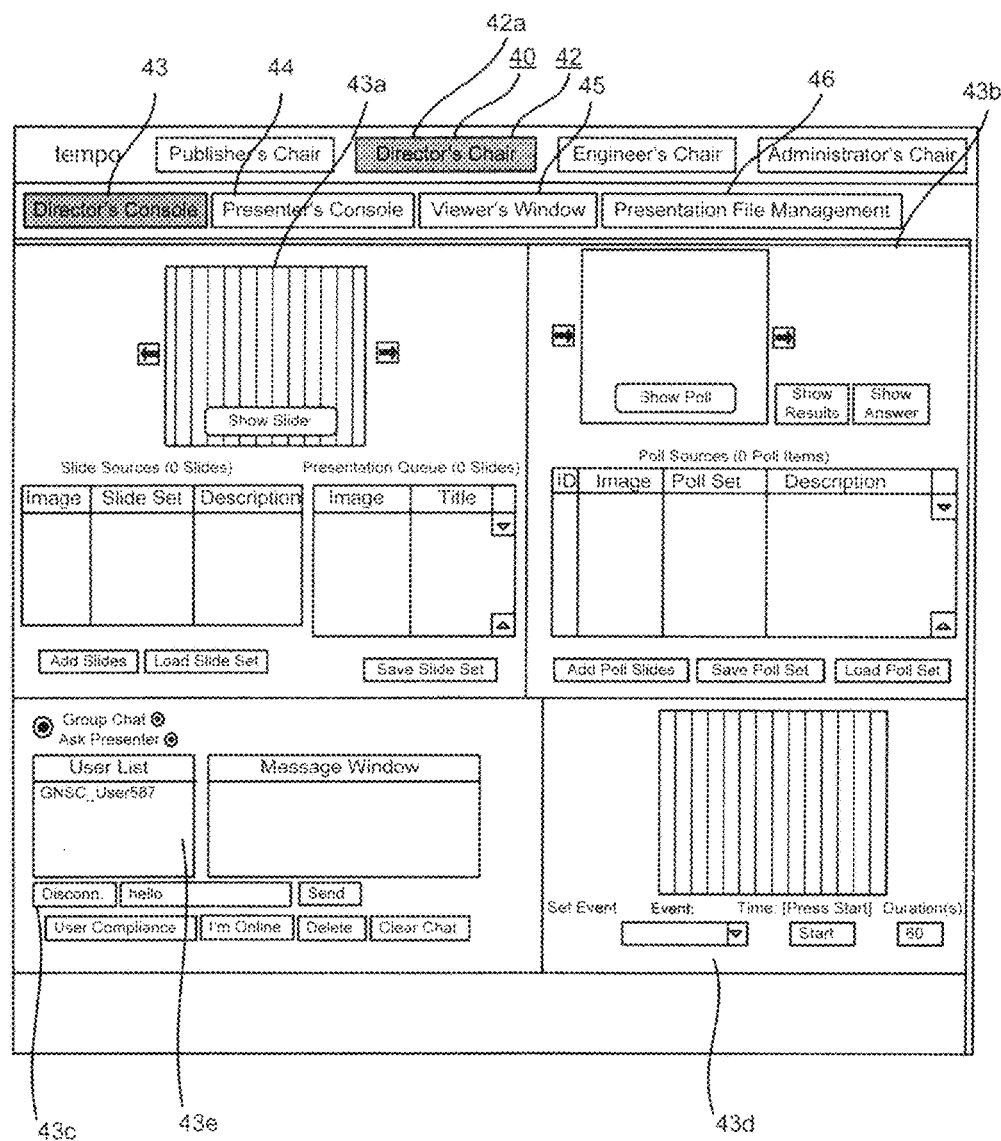
FIG. 8 shows a Director's Console of the Director's Chair set forth in FIG. 1 with corresponding Director's Tab as viewed by the User.
Figure 9:
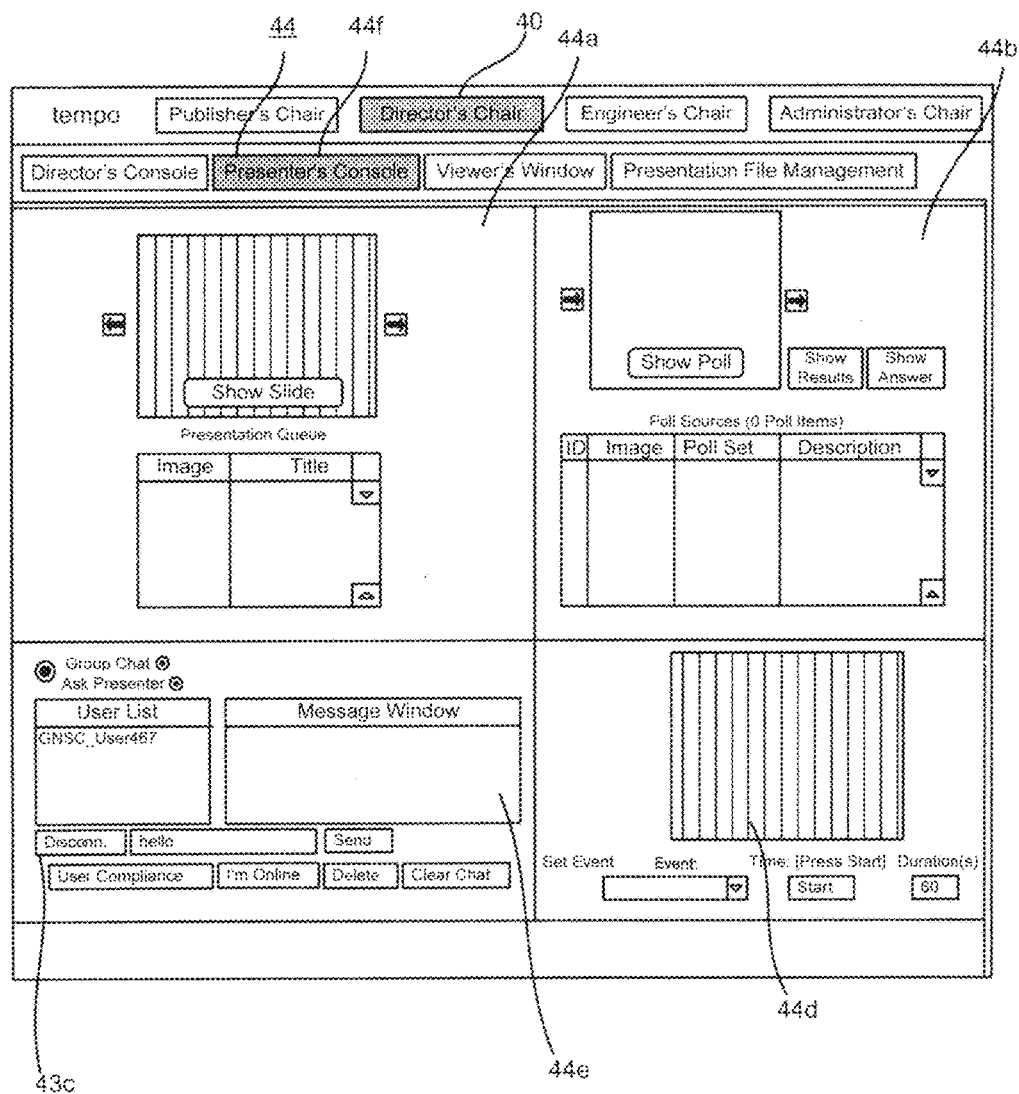
FIG. 9 illustrates a Presenter's Console of the Director's Chair with corresponding Presenter's Tab from the perspective of the User.
Figure 10:
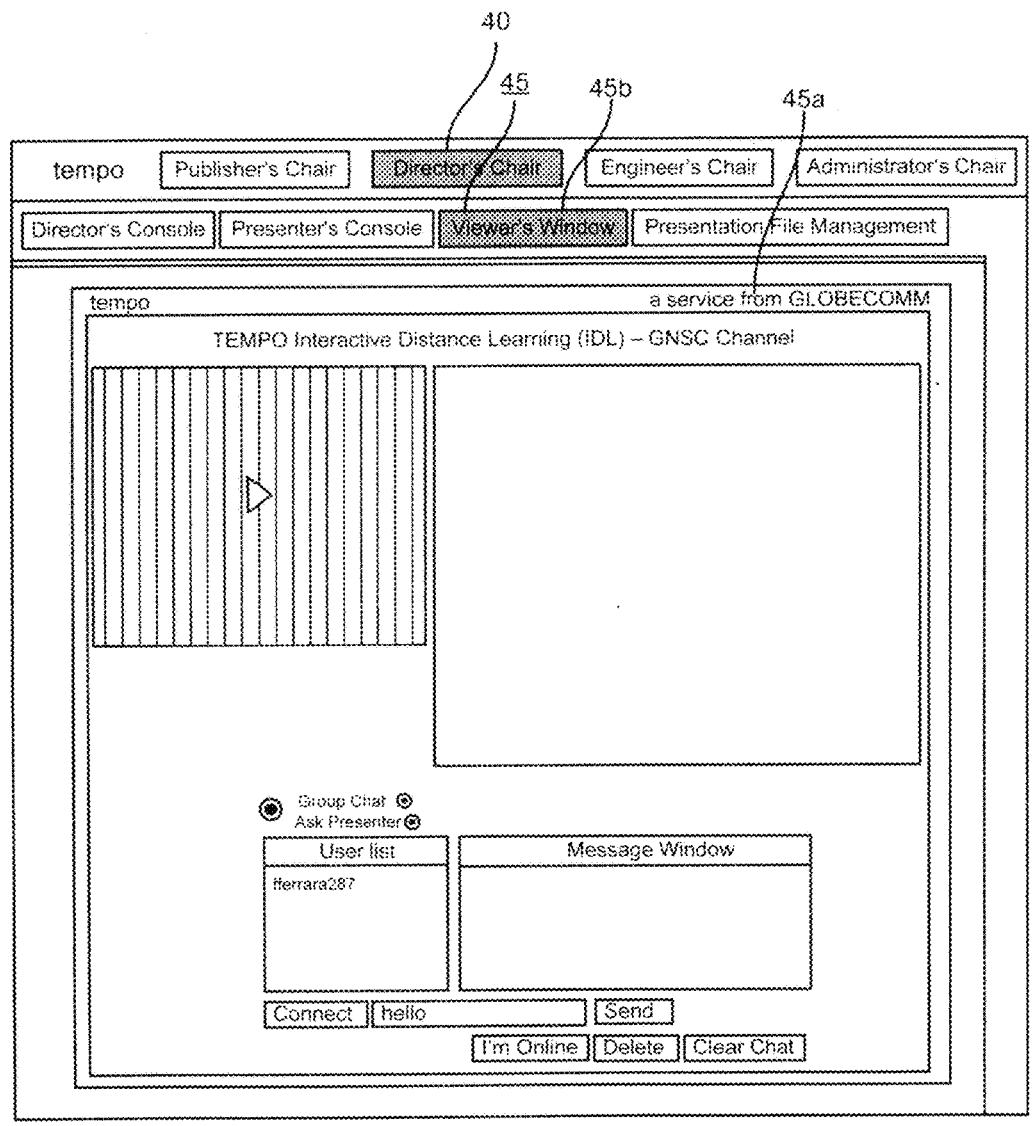
FIG. 10 shows the Viewer's Console of the Director's Chair with corresponding Viewer's Window or Tab displaying a TEMPO Interactive Distance Learning (IDL)—GNSC Channel.
Figure 11:
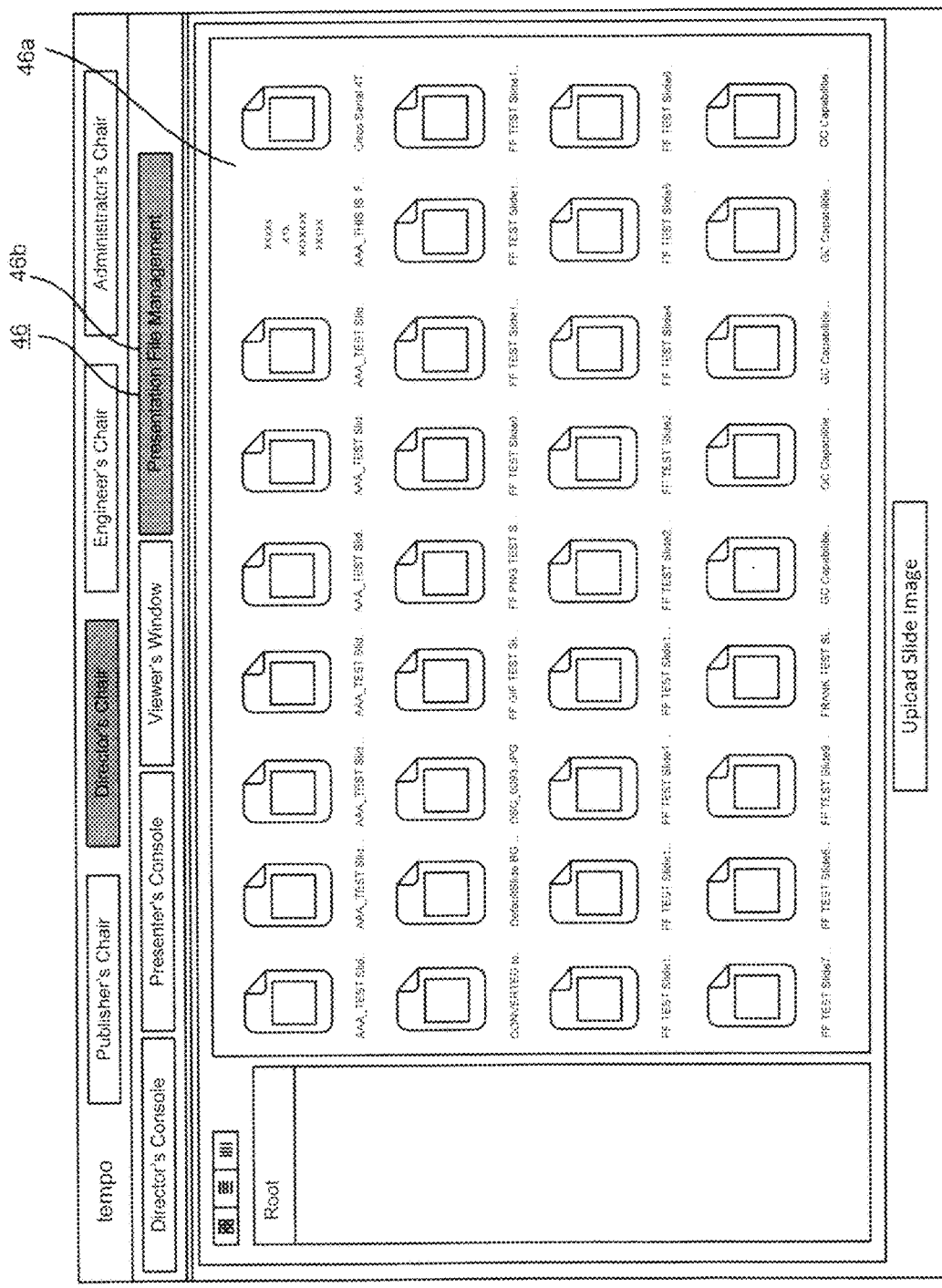
FIG. 11 illustrates a Presentation Console of the Director's Chair with corresponding Presentation File Management Tab.

In the present embodiment, the Director's Chair comprises a plurality of Consoles including, but not limited to, a Director's Console 43, a Presenter's Console 44, a Viewer's Console 45, and a Presentation File Console 46. An illustrative Director's Tab 42a corresponding to the Director's Console, as it is preferably viewed by a User, with representative operations is best seen in FIG. 8. The Director's Console, in turn, has a series of subset functions, currently, a Slides Panel function 43a, a Polls Panel function 43b, a Chat Panel function 43c, a Preview Panel function 43d, a Voice Over Internet Protocol (VoIP) Panel function 43e, and other capabilities. In other words, this Console delivers interactive Slides, Polls, Chat, Preview, VoIP, real-time testing, communication, presentation and other capabilities in a unified interface. Advantageously, back-end User interaction and testing occurs transparently both to the User and the Director. The Director need only select the event, and any User/Viewer who has the appropriate Viewer Access level or who has been specifically assigned to a part of, or participate in, the Live Event. Such Viewer is then able to participate with no additional setup or configuration of any kind.

Moreover, the Director may switch between any type of activity with a single click—from Slides, to Polls, to any current or future Module that may be provided or integrated. In addition to providing the aforementioned six subset functions of the present embodiment, the Director's Console beneficially has a modular architecture for enabling switching between virtually any type of modules created, while automating the capture of all interactive activity for later analytics, security or other purposes. This back-end communications architecture, combined with unique client-side processing extension(s), is optimized for allowing an extraordinarily high number of simultaneous Users, without the limitations of conventional systems. For example, using the present invention, a single server that would normally handle delivery of approximately 1000 Users before experiencing system problems, may now accommodate about 10,000 to about 20,000 Users. This expansion is due, at least in part, to use of advanced stream handling, e.g., conventional, coupled with automated content delivery network (CDN) handoff and integration, e.g., also conventional. Similarly, this advanced architecture allows for simultaneous Mobile, Desktop, Television, Satellite and other targets without having to re-engineer the entire system.

The first of the Director's Console subset functions, namely, Slides Panel 43a, provides a highly flexible and easy-to-use area to handle slide-related functions. It offers a set of integrated controls for adding slides, showing slides, moving slides between one or more "Slide Sets" that the User can define for each Live Event, and make them available to the Presenter or the Viewers—all using traditional point and click, and drag-and-drop actions. The Slides Panel is characterized by use of, what are universally considered to be, "Best Practices" for all content handling, display and management activities, to make it as easy and familiar to the User as possible. It also permits the Director to extend or retract any available Slide to the Presenter, providing real-time slide management between the Director and Presenter within any Live Event.

Polls Panel 43b, which is the second of the Director's Console subset functions, provides an area that is extremely powerful, but simple to use, for handling all Poll-related functions. The Polls Panel offers a set of integrated controls for adding Polls, showing Polls, moving Polls between one or more "Poll Sets" that the User can define for each Live Event, and for making them available to the Presenter or Viewer(s)—all using simple point and click and drag-and-drop actions. The Polls Panel function, like the Slide Panel, uses what are universally considered to be "Best Practices" for all Poll handling, display and management activities. An objective is to make operation as easy and familiar to the User as possible. It additionally allows the Director to extend or retract any available Poll to the Presenter, providing real-time Poll management between the Director and Presenter within any Live Event. Furthermore, the Poll Setup workflow is optimized so as to reduce dramatically the time and complexity of creating new Slides. This is accomplished by leveraging automation and streamlining entry, thereby reducing the average time it takes to add a new Slide by over 75% as compared to traditional general purpose e-learning tools.

When a poll is taken, and when Viewers answer, the system of the present invention collects every answer by User and by event. In this manner, the invention provides a complete record of analytical results.

The third subset function of the Director's Console is Chat Panel 43c. This Panel provides the User with a real-time, text-based communication tool that is integrated directly with the Platform and System's Live Events architecture, with integrated User Roster, text broadcasting, User Compliance (i.e., a function for tracking whether the User is online and paying attention) and many other features than can be enabled selectively by the provider of the Service underlying the Platform and System, on a per-customer basis. The Chat Panel function provides a relatively simple, efficient communications tool which bypasses the necessity for setup or configuration by the Director or the Presenter. It is built upon a flexible, feature-rich set of programming, e.g., conventional or $3^{rd}$ party software of ZeroFooprint, Inc., with options including, but not limited to, audio, video, private break-out rooms/sessions and the like, and more within the spirit and scope of the present invention. The Chat Panel is integrated using the latest interactive media classes from Adobe and ZFP (ZeroFootPrint, Inc.), with the ability to support high-efficiency multicasting, adaptive quality monitoring/switching and more, thereby placing its capabilities significantly ahead of any of the standard systems available in the marketplace.

The fourth subset function of the Director's Console, Preview Panel 43d, enables instant preview of any Live Event at any time, via one simple selection, i.e., one click. It provides full size, high resolution preview of any Live Event, for review at the highest possible fidelity, e.g., on a conventional high definition display. The Preview Panel desirably integrates all available Viewer Options into Preview, including Video, Chat, Slides, Polls, etc.

The fifth subset function, VoIP Panel 43e, is one of a plurality of custom modular functions developed for the Service underlying Enterprise Media Control Platform and System 17, according to the present embodiment, for extending the Live Events, E-Learning, Communications and other capabilities of the present invention. Additionally, the present invention, more particularly, provides controlled Voice Over IP. For instance, using Controlled Voice Over IP, the Administrator sees a Viewer/User raising his/her hand during a presentation, and turns the microphone over to such Viewer/User so that the other Viewers/Users cannot interrupt. It also allows open chat, creation and showing of Slides, Polls/questions, etc. In this respect, the Director 41 is again the predominant chair for controlling and managing the User's experience. Advantageously, in being modular in form, this function is readily added to or omitted from the Platform and System without changing the core architecture or programming of the present invention. In addition to providing computer-to-computer voice communications, the VoIP Panel permits leveraging of $3^{rd}$ party SIP, enabling the System's VoIP to communicate with any existing telephones, PBX's, cellular telephones or other standard telephone systems anywhere in the world. In this manner, open chat, creation and showing of Slides, Polls/questions, etc. are readily permitted.

Notably, in accordance with the unique architecture provided by the present invention, the Director's Console may include one or more additional subset functions with further capabilities in modular form for customized applications or customer-specific system requirements.

Turning now to the second Console of Director's Chair 40, namely, Presenter's Console 44, this function operates in conjunction with the Director's Chair, where the Director's Chair queue's-up all of the appropriate Slides, Polls and Event settings, so that the Presenter 70 can stay focused on the presentation. In not requiring that the Presenter define, setup, upload or manage any element of the presentation, the delivery of Live Events is greatly simplified for the Presenter so that the Presenter may instead stay focused on selecting what he/she desires to present to the Viewers. The Presenter's Console is particularly beneficial in requiring no training for a Presenter to conduct presentations. As there is no need for setup nor content management, the Presenter need only login and immediately begin conducting the presentation. Additionally, use of "Plug-in" or modular consoles, extensions and associated customization allows the present invention to provide customer and market specific options, without modifying the core system application. A corresponding Presenter's Tab 44f with representative operations is provided, for example, in FIG. 9. Hence, by the present invention, not just the Director, but also the Presenter can control the console (e.g., move/slide/drag things around) on the display.

Like the Director's Console, the Presenter's Console also includes a series of subset functions, presently, a Slides Panel function 44a, a Polls Panel function 44b, a Chat Panel function 44c, a Preview Panel function 44d, a Voice Over Internet Protocol (VoIP) Panel function 44e, and other capabilities. In other words, this Console delivers interactive Slides, Polls, Chat, Preview, VoIP, real-time testing, communication, presentation and other capabilities in a unified interface. The first function, namely, Slides Panel 44a, provides a highly flexible, but easy-to-use area for handling all slide-related functions of the Console. This function offers a set of integrated controls for adding slides, showing slides, moving slides between one or more "Slide Sets" that are User definable for each Live Event, and makes the slides available to the Presenter and the Viewers—all using simple point and click and drag-and-drop actions. The Slides Panel is characterized by use of, what are universally considered to be, "Best Practices" for all content handling, display and management activities, to make Slides presentation as easy for and familiar to the User as possible. It also permits the Director to extend or retract any available Slide to the Presenter, providing real-time slide management between the Director and Presenter within any Live Event.

The second subset function of the Presenter's Console is Polls Panel 44b. This Panel provides an area, like that for the Director's Console, that is extremely powerful, but simple in use, for handling all Poll-related functions. The Polls Panel offers a set of integrated controls for adding Polls, showing Polls, moving Polls between one or more "Poll Sets" that the User can define for each Live Event, and making them available to the Presenter or Viewer(s)—all using simple point and click and drag-and-drop actions. The Polls Panel function, like the Slide Panel, uses again what are universally considered to be "Best Practices" for all Poll handling, display and management activities. An objective is to make it as familiar to and easy for the User as possible. It further allows the Director to extend or retract any available Poll to the Presenter, providing real-time. Poll management between the Director and Presenter within any Live Event. Furthermore, the Poll Setup workflow is optimized so as to dramatically reduce the time and complexity of creating new Slides. This is done, at least in part, by leveraging automation and streamlining entry, thereby reducing the average time it takes to add a new Slide by over 75% as compared to traditional general purpose e-learning tools.

The third subset function of the Presenter's Console is Chat Panel 44c. This Panel provides the User with a real-time, text-based communication tool that is directly integrated to the Platform and System's Live Events architecture, with integrated User Roster, text broadcasting, User Compliance (i.e., a function for tracking whether the User is online and paying attention) and many other features than can be selectively enabled by the provider of the service underlying the Platform and System, on a per-customer basis. The Chat Panel function provides a relatively simple and efficient communications tool which bypasses the necessity for setup or configuration by the Director or the Presenter. It is built upon a flexible, feature-rich set of programming, e.g., conventional or $3^{rd}$ party software of ZeroFooprint, Inc., with options including, but not limited to, audio, video, private break-out rooms/sessions and the like, and more within the spirit and scope of the present invention. The Chat Panel is integrated using the latest interactive media classes, for instance, from Adobe and/or ZFP, with the ability to support high-efficiency multicasting, adaptive quality monitoring/switching and more, thereby placing its capabilities significantly ahead of any of the standard systems available on the market today.

The fourth subset function of the Presenter's Console, Preview Panel 44d, enables instant preview of any Live Event at any time, via one simple selection, i.e., one click. It provides full size, high resolution preview of any Live Event, for review at the highest possible fidelity, e.g., on a conventional high definition display. The Preview Panel preferably integrates all available Viewer Options into the Preview, including Video, Chat, Slides, Polls, etc.

The fifth subset function, VoIP Panel 44e, in the context of the Presenter's Console, is one of a plurality of custom modular functions developed for the Service underlying Enterprise Media Control Platform and System 17, in accordance with the present embodiment, for extending the Live Events, E-Learning, Communications and other capabilities of the present invention. Favorably, being modular in form, this function is readily added to or omitted from the Platform and System of the present invention without changing its core architecture or programming. In addition to providing computer-to-computer voice communications, the VoIP Panel permits leveraging of $3^{rd}$ party Session Initiation Protocol (SIP), enabling the System's VoIP to communicate with any existing telephones, Private Branch Exchanges (PBX's), cellular telephones or other standard telephone systems anywhere in the world.

As is the case with the Director's Console, pursuant to the unique architecture provided by the present invention, the Presenter's Console may similarly include one or more additional subset functions with further capabilities in modular form for customized applications or customer-specific system requirements.

The third module or Console of the Director's Chair is Viewer's Console 45. This function essentially allows Director 41, Presenter 70 or Master User 22 to quickly see the Live, full-screen output of any event at any time. Unlike the Director's Console and Presenter's Console, the Viewer's Console includes a single subset function, currently, a Preview Panel function 45a. In this manner, in addition to the Preview operations described above, the Viewer's Console enables fast verification of activity of any Event at any time, and permits the Director/Publisher to selectively view the status of any event with one selection. A corresponding Viewer's Window or Tab 45b is set forth, for instance, in FIG. 10, such Viewer's Window presently displaying a TEMPO Interactive Distance Learning (IDL)—GNSC Channel.

The fourth Console of the Director's Chair is Presentation Console 46. This Console provides a universal file management interface for uploading, managing, naming, organizing and removing slides and related content from the System of the present invention. The Presentation Console has only one subject function, namely, a File Management Console 46a. A Presentation File Management Tab 46b corresponding to the Presentation Console and/or File Management Console is displayed, for instance, in FIG. 11. In addition to universal file management interface operations, as set forth above, the Presentation Console enables anyone familiar with Windows or Mac style file managers to use it without any learning curve. Providing further ease of use, the interface of the Presentation Console advantageously supports all necessary features, while insulating the User from having to worry about things like paths, formats, etc. In addition to standard Icon and List viewing modes, the Presentation Console, in general, and the File Management Console, in particular, has a "quick-flip" visual book mode for simple and powerful review of available content.

Referring now to the third Module or Chair of the Platform and System for one-click access to all major application areas, an Engineer's Chair 50 is provided for controlling network infrastructure including encoders and media servers, real-time network status and access to any open trouble tickets on the network. Generally speaking, the Engineer's Chair provides a centralized area for access to health, status and settings of all key customer-specific functionality.

Figure 12:
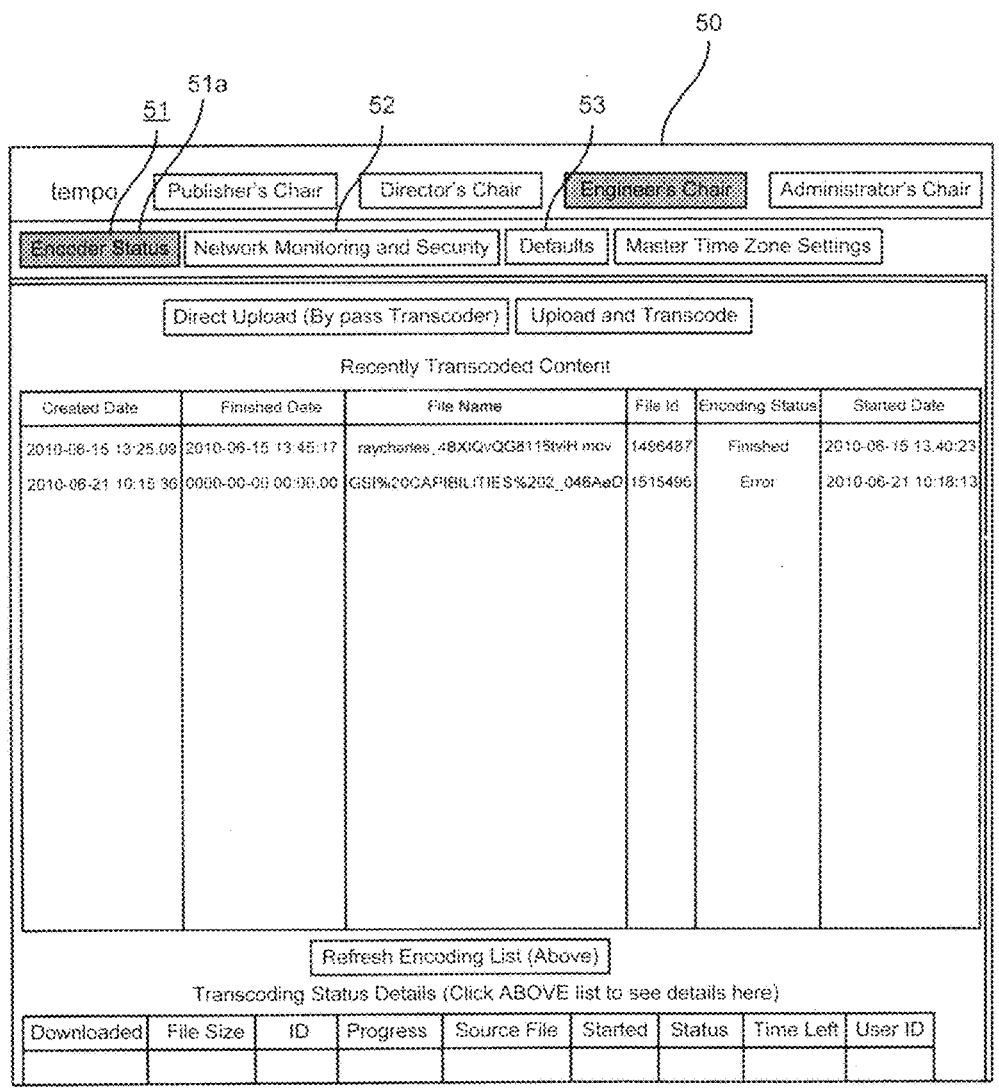
FIG. 12 shows an Encoder Status Console of the Engineer's Chair set forth in FIG. 1 with corresponding Encoder's Status Console Tab for providing at-a-glance status of all media encoding, transcoding and handling status, with percentage completion, date tagging and other useful information.
Figure 13:
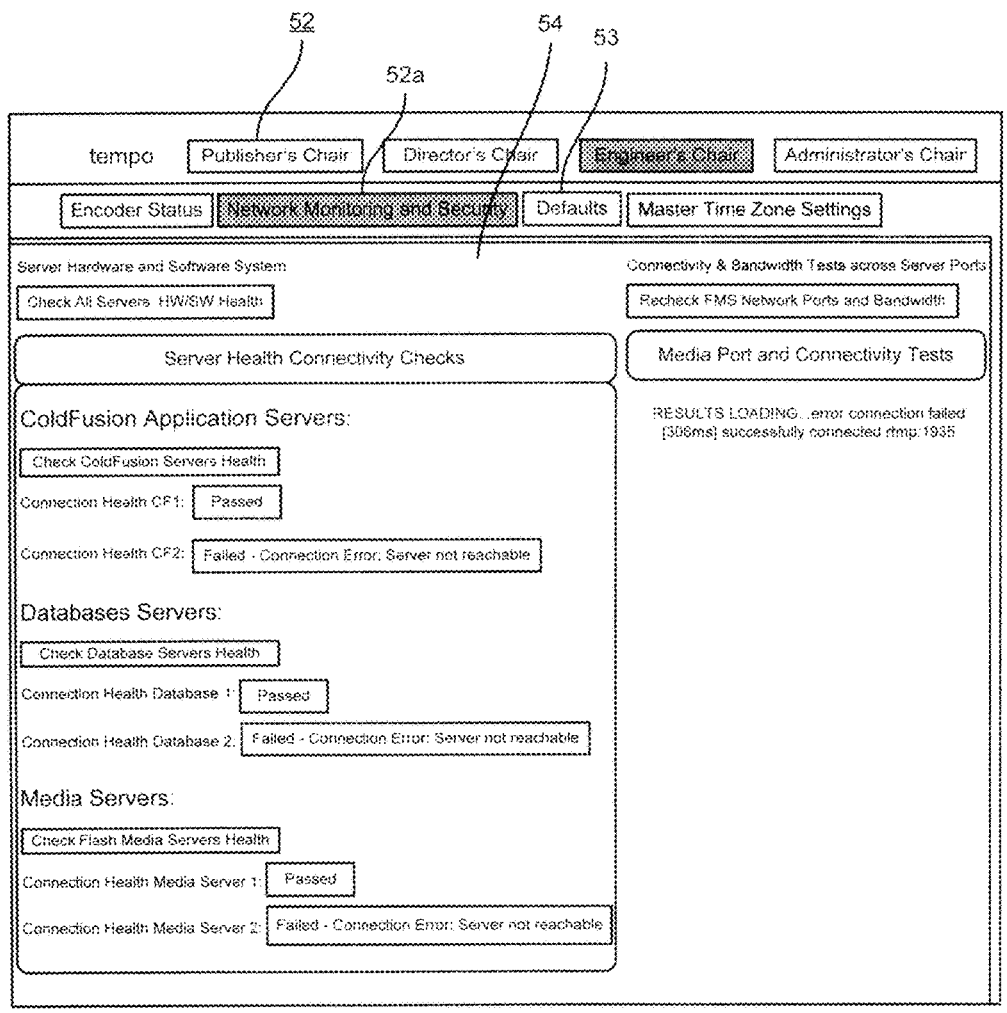
FIG. 13 is a screen shot of a Network/Systems Health Console of the Engineer's Chair with corresponding Network Monitoring And Security Tab and associated automated diagnostics for enabling the customer to track down possible network, server and communications issues at the click of a button.
Figure 16:
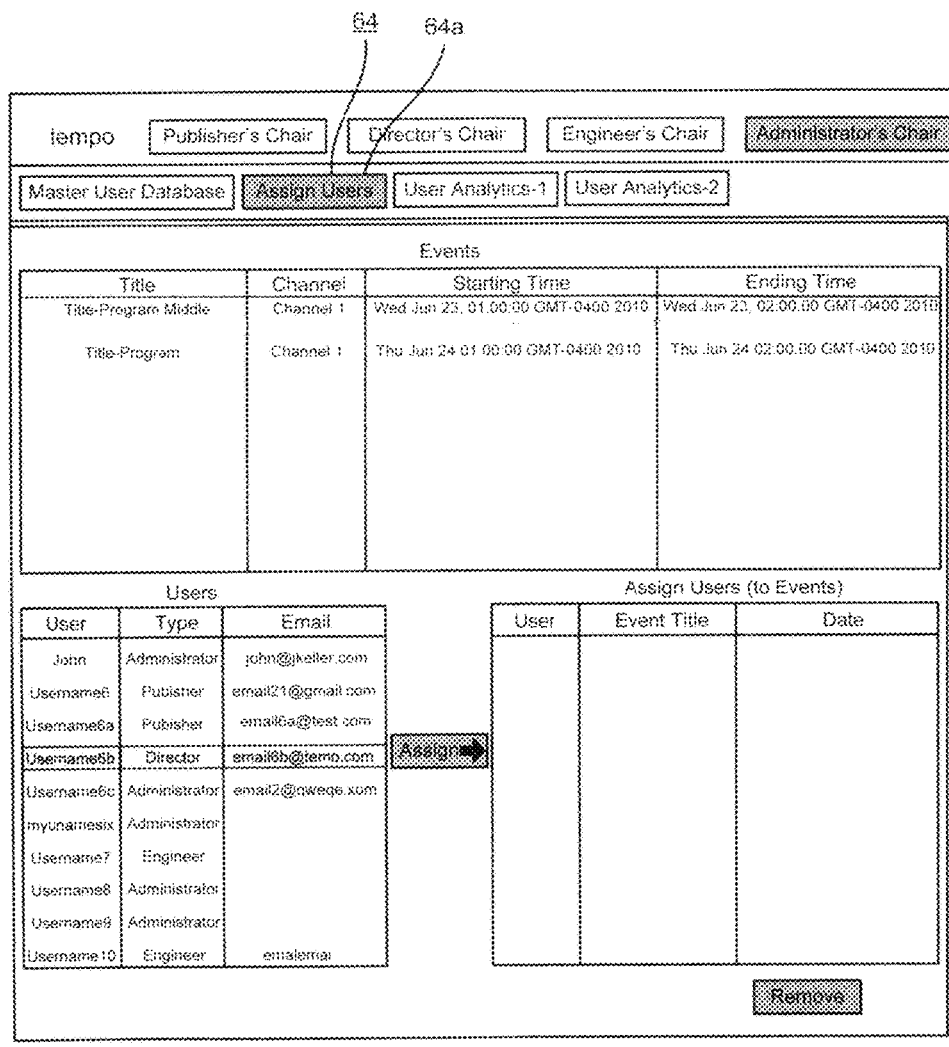
FIG. 16 shows an Assign Users Console of the Administrator's Chair set forth in FIG. 1 with corresponding Assign User's tab for providing a simple point-and-click interface that enables Administrators and Master Users to add users to Live Events.

In the present embodiment, the Engineer's Chair comprises a plurality of Consoles including, but not limited to, an Encoder Status Console 52, a Network/Systems Health Console 53, and a Defaults Console 54. The Encoder's Status Console, a corresponding Tab 52a for which is shown in FIG. 12, provides at-a-glance status of all media encoding, transcoding and handling status, with percentage completion, date tagging and other useful information. The Network/Systems Health Console utilizes extensive automated diagnostics to enable the customer to track down possible network, server and communications issues at the click of a button. A screen shot of a Network Monitoring And Security Tab 53a, corresponding generally to the Network/Systems Health Console, is provided in FIG. 13. Intelligent automation provided by this Console, in general, eliminates the need for training to effectively use the diagnostics System. As for Defaults Console 54, this function provides a location for any customer-specific functions that may be needed/requested for their unique environment and requirements.

Alternatively or concurrently, Engineer's Chair or Module 50 includes a virtual toolbox 55 for speeding resolution of issues with an array of troubleshooting tools.

The fourth and last Module or Chair of the Platform and System for one-click access to all major application areas is Administrator's Chair 60. The Administrator's Chair gives access to all User setup, configuration, analytics and management operations, allowing management of the Viewer database, testing database, usage reports, billing and analytics. The Administrator's Chair, in the present embodiment, has of a plurality of modules or Consoles including, but not limited to, a Master User Database (DB) Console 63, an Assign Users Console 64, a User Analytics Console 65 and a Video Analytics Console 66. In other words, the present invention is not only about User "experience" but also analytics.

Figure 14:
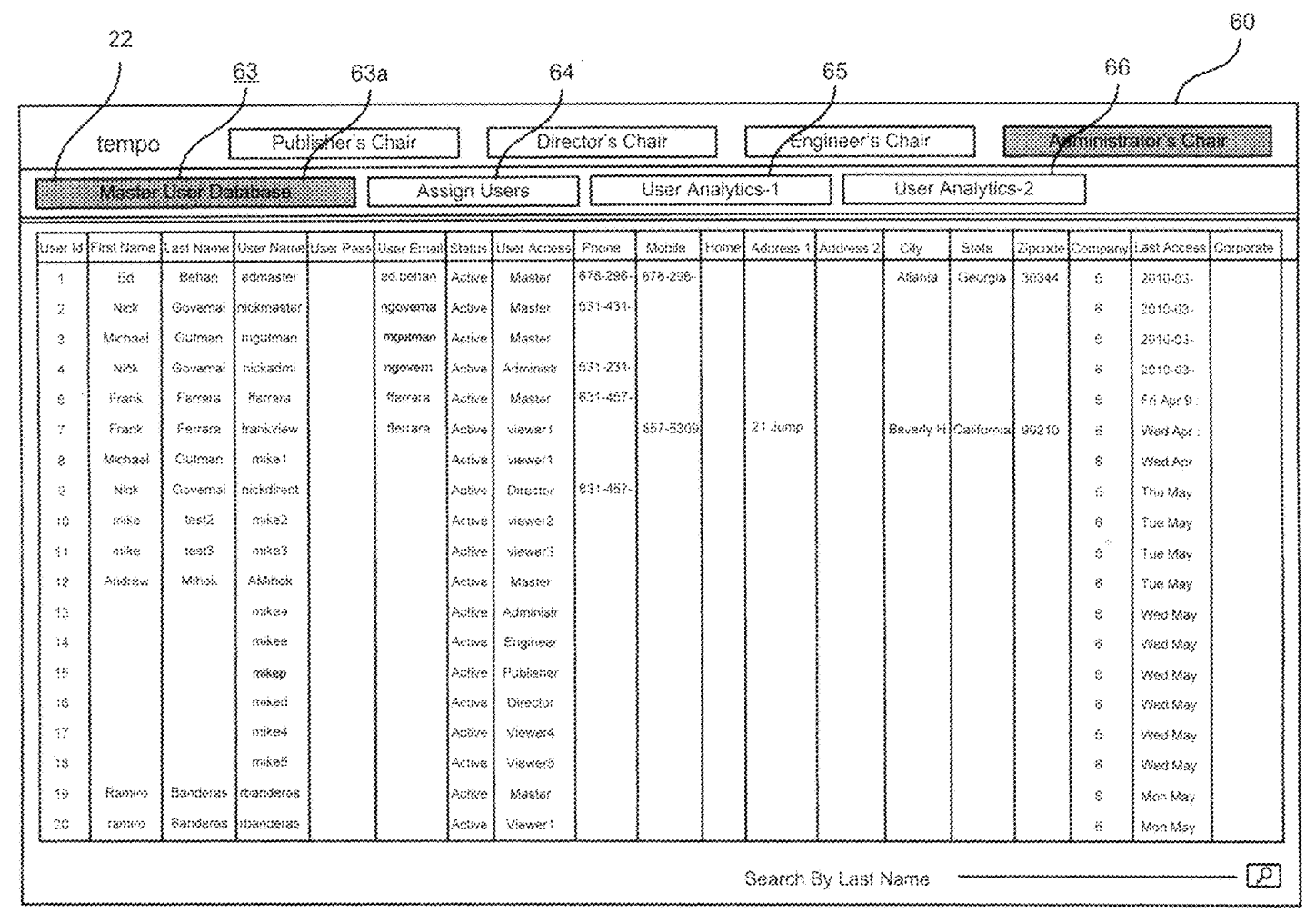
Figure 15:
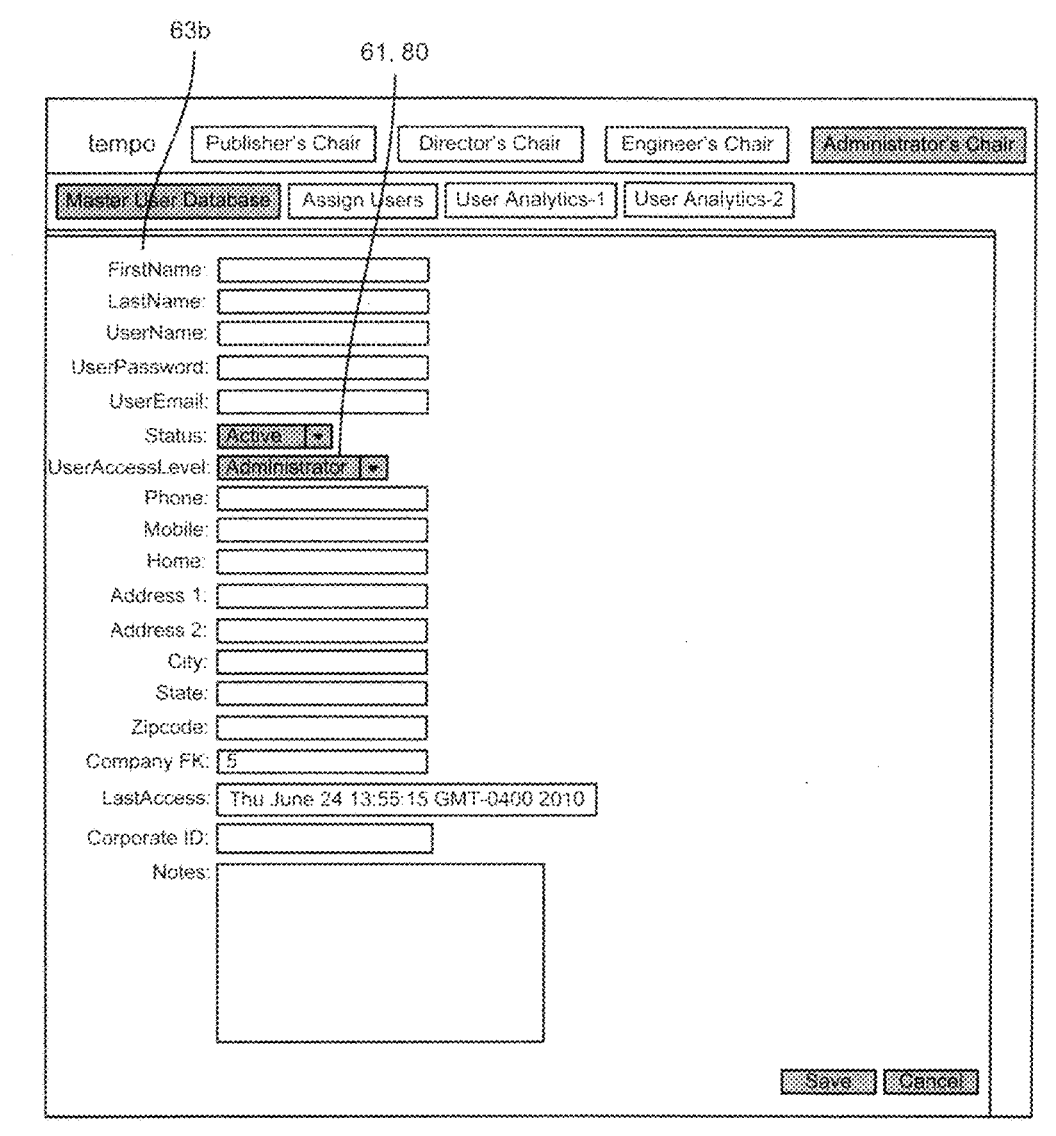

More specifically, the Master User DB Console, a Tab 63a and screen shot for which is shown in FIG. 14, offers secure centralized User entry and management, created on top of secure Web Service API for ease in Lightweight Directory Access Protocol (LDAP)/Active Directory integration. A subset New User Tab 63b is shown in FIG. 15. Assign Users Console 64 provides a simple point-and-click interface that enables Administrators 61 and Master Users 22 to add Users to Live Events. An illustrative Assign Users Tab 64a is displayed in FIG. 16.

Figure 17:
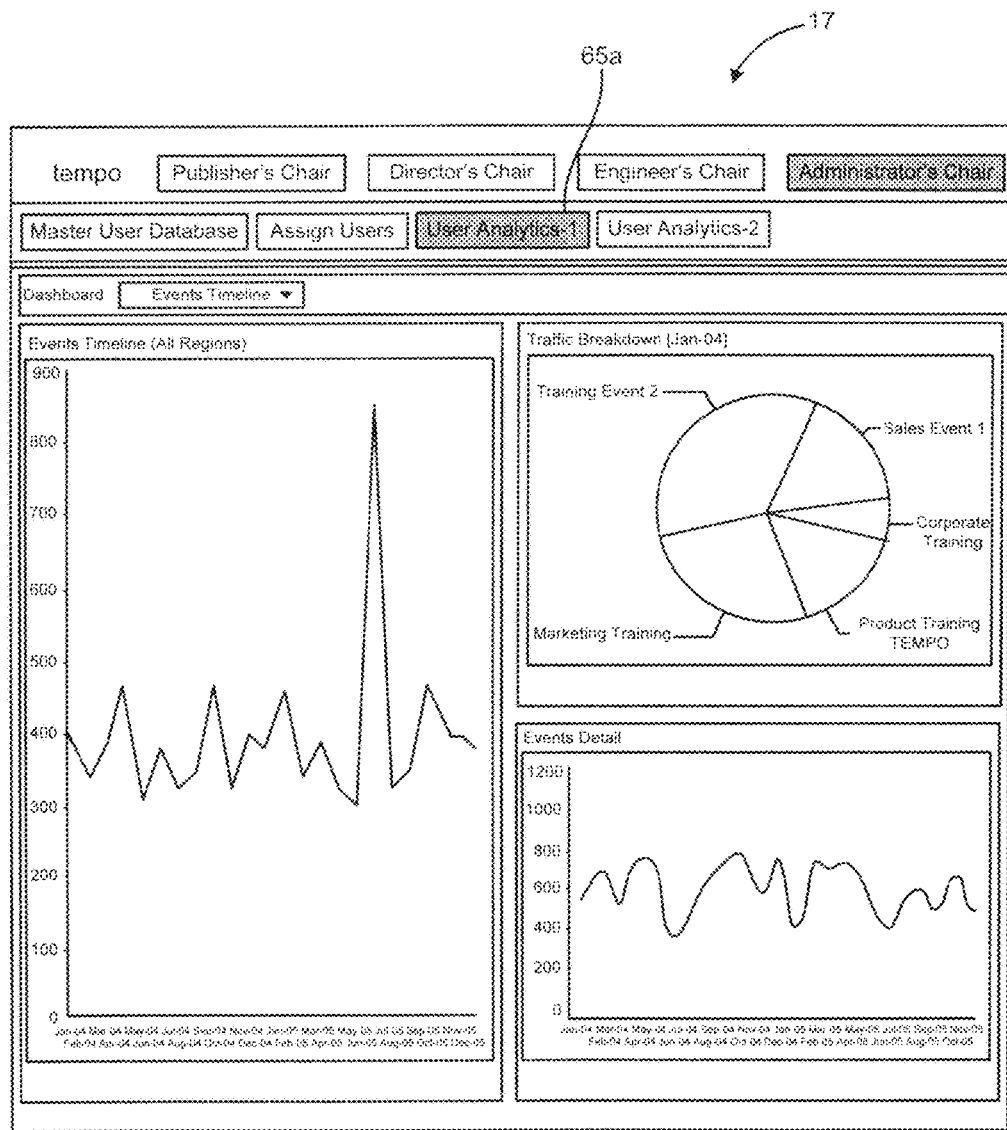
FIG. 17 is a screen shot of a User Analytics Console of the Administrator's Chair, with corresponding User Analytics—1 Tab for providing User Analytics report types for tracking and querying users by events, questions, performance or in any related combination thereof.
Figure 18:
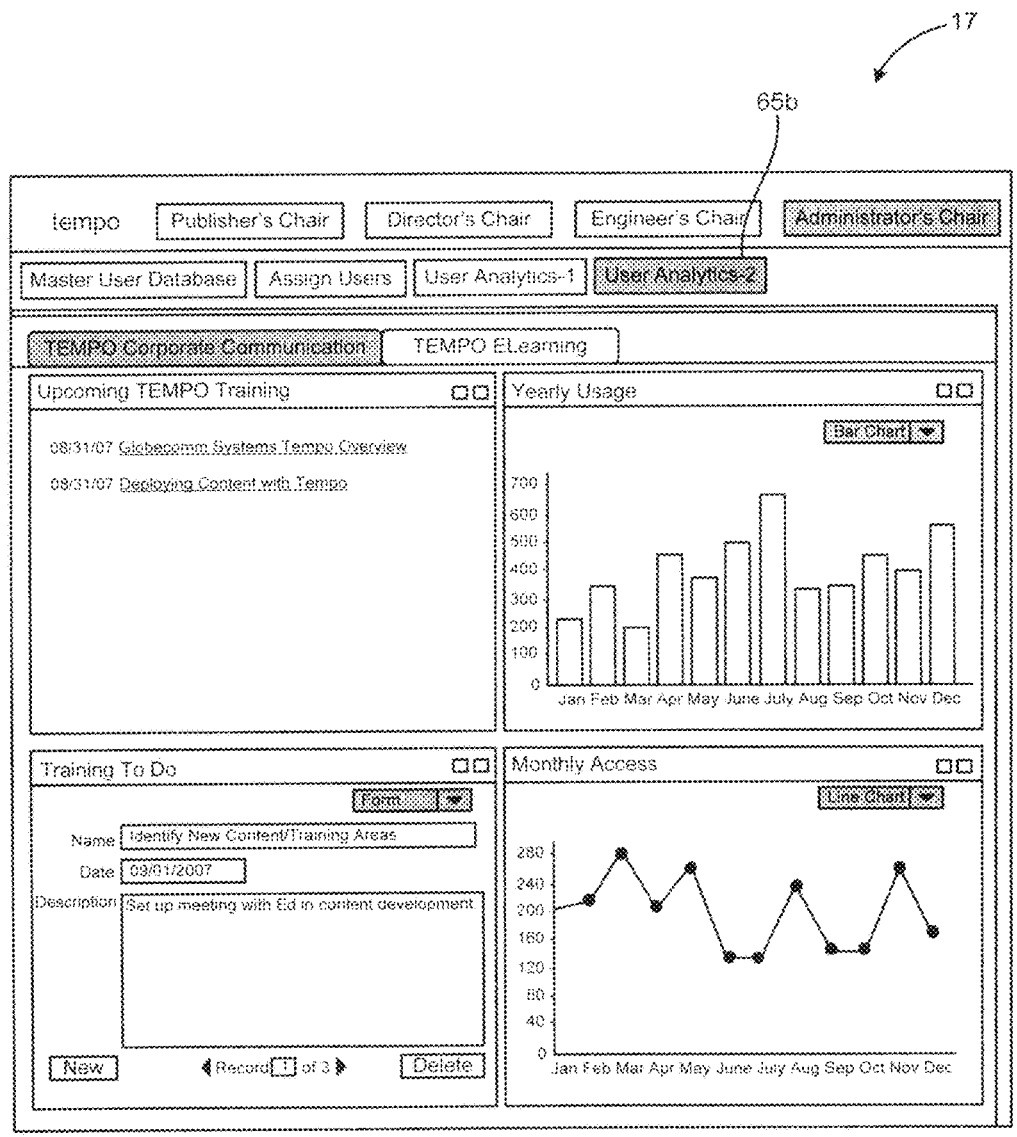
FIG. 18 is a screen shot of a User Analytics Console of the Administrator's Chair, with corresponding User Analytics—2 Tab for providing User Analytics report types for tracking and querying users by events, questions, performance or in any related combination thereof.

The User Analytics Console, with corresponding Tabs shown in FIGS. 17 and 18, provides all of the essential User Analytics report types for tracking and querying Users by events, questions, performance or in any related combination thereof. Such Tabs include User Analytics-1 65a and User Analytics-2 65b. This Console is built on an extraordinarily flexible architecture that allows the provider of the service underlying Enterprise Media Control Platform and System 17 to create/define new types of analytics in XML, bypassing the need to reprogram the System of the present invention. In this regard, the present invention collects data on programming and Viewers/Users. Such data is then used to develop detailed analytic charts and graphs to provide insight on usage, polling efficiency and other metrics. The invention also collects data about User compliance, for instance, to determine whether the User is in front of his/her Computer or outside mowing the lawn.

Figure 19:
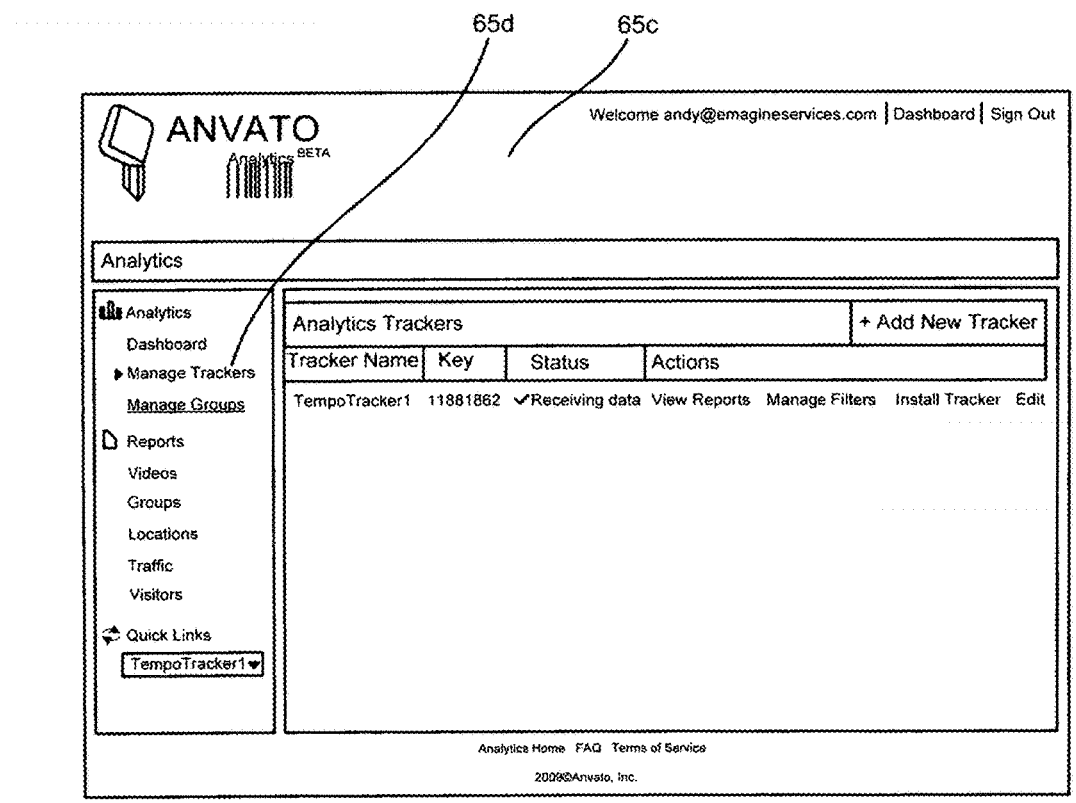
FIG. 19 shows an Analytics Menu for the User Analytics Console according to FIGS. 17 and 18, with a Manage Trackers function activated for management and supervision of trackers assigned by the system.
Figure 20:
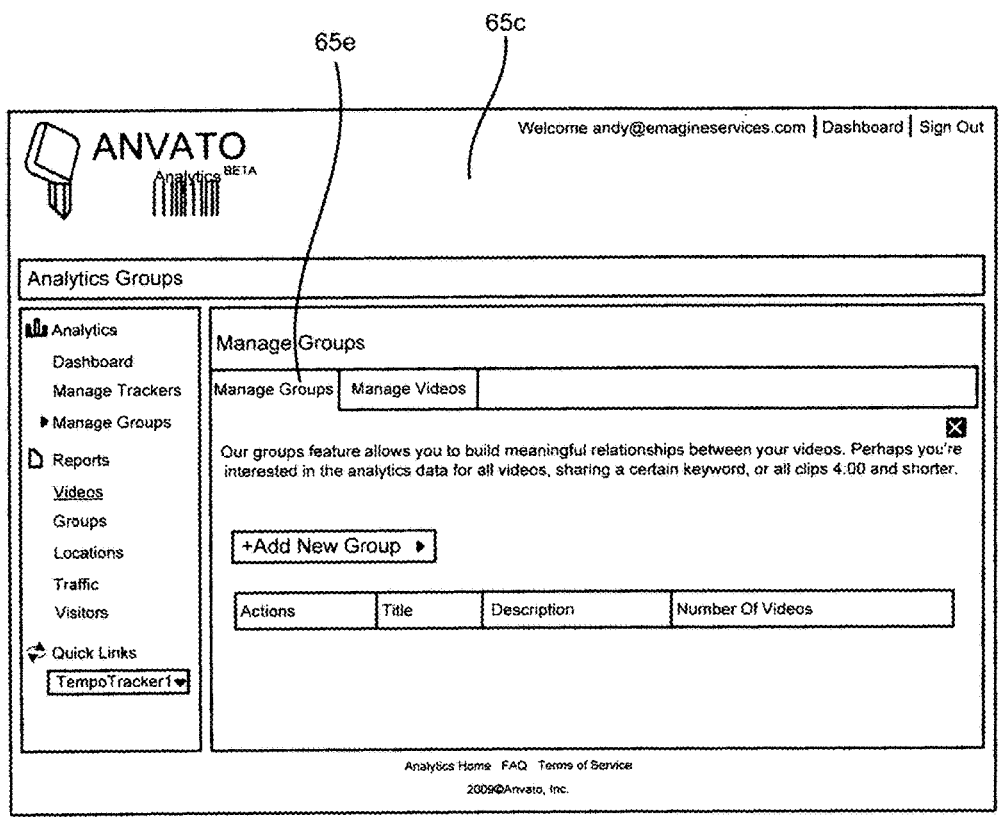
FIG. 20 illustrates a Manage Groups function of the Analytics Menu in FIG. 19 with a Manage Groups function activated for allowing the User to build relationships between their Video, or viewing analytics data for all videos sharing a particular keyword, or viewing all video clips shorter than a selected period of time.
Figure 21:
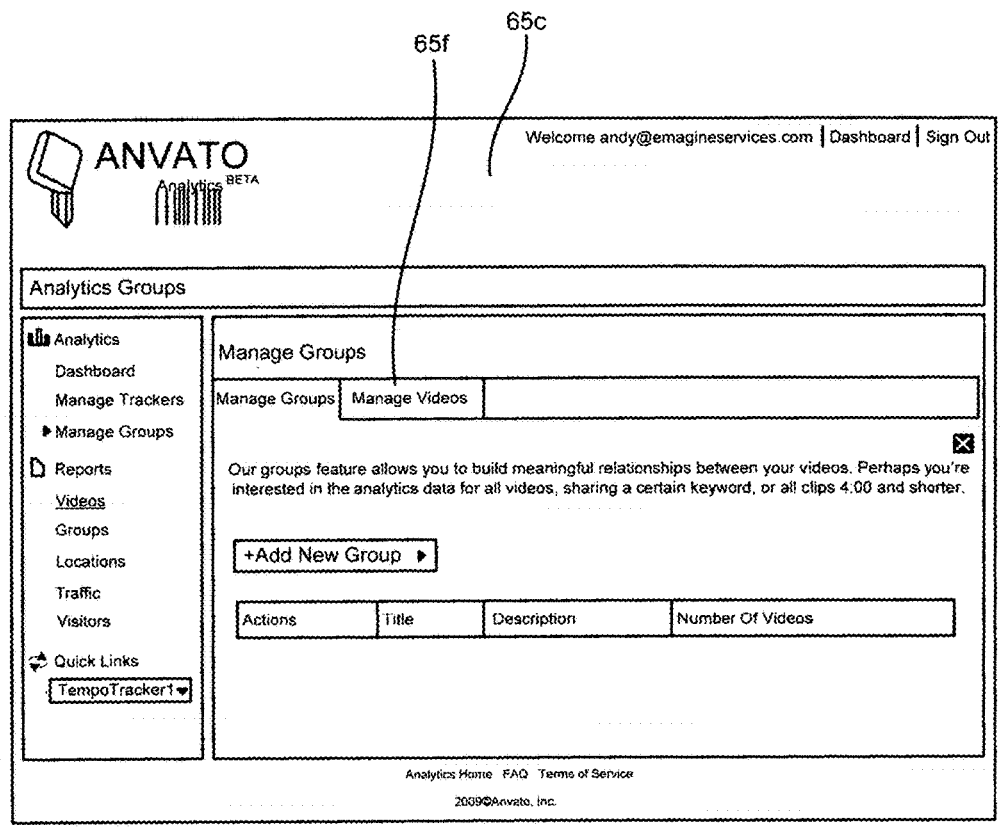
FIG. 21 is a screen shot corresponding to the Analytics Menu in FIG. 19 for managing and preparing Reports for Groups.

In one embodiment, as shown in FIG. 19, an Analytics Menu 65c is provided with a Manage Trackers function 65d activated for management and supervision of trackers assigned by the System. FIG. 20 illustrates a Manage Groups function 65e of the Menu activated. This feature allows the User to build meaningful relationships between their Video, or viewing analytics data for all videos sharing a particular keyword, or viewing all video clips shorter than a selected period of time. In FIG. 21, a screen shot is shown corresponding to the Analytics Menu selection for Reports —Groups 65f, namely, for managing and preparing Reports for Groups.

Figure 22:
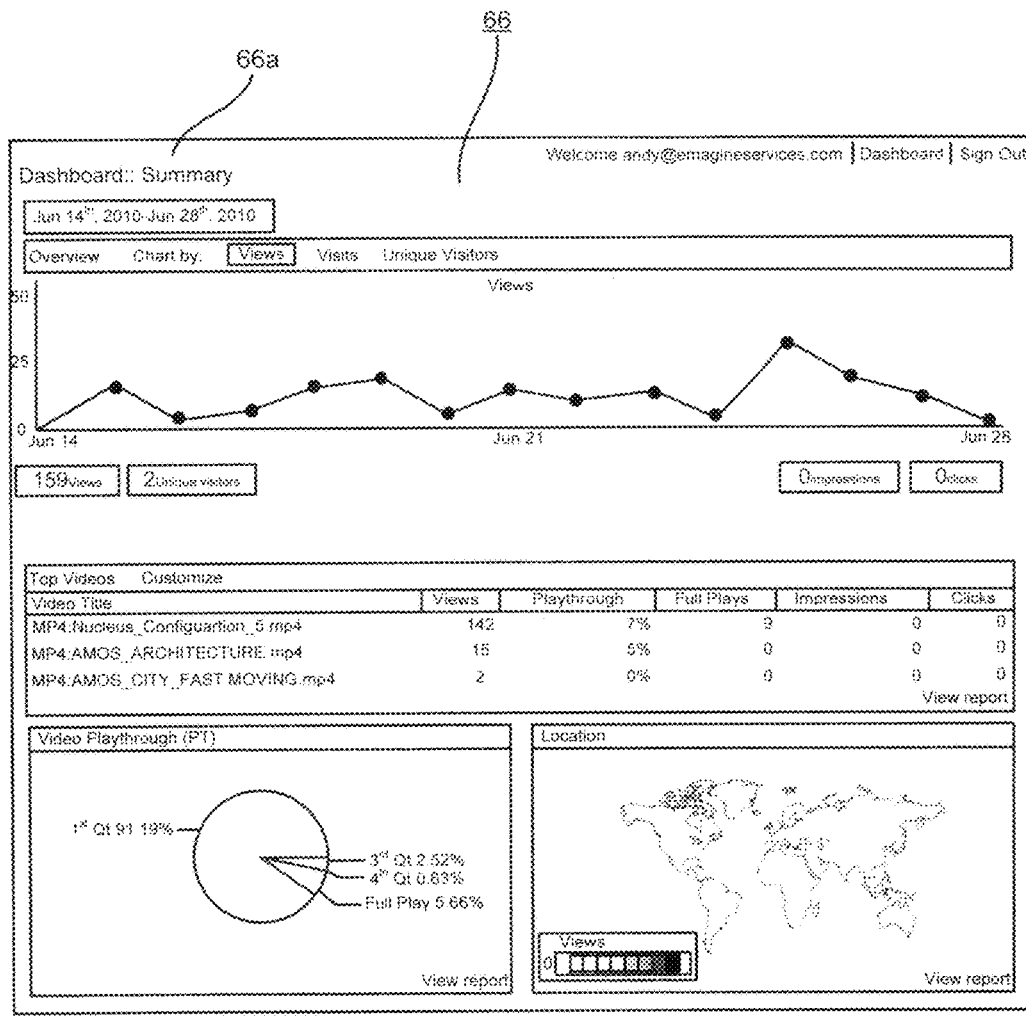
FIG. 22 is a screen shot of a Video Analytics Console of the Administrator Chair, according to FIG. 1, with Video Analytics Tab or Video Analytics—3 for tying the System of the present invention into advanced video analytics for Live, real-time events.
Figure 23:
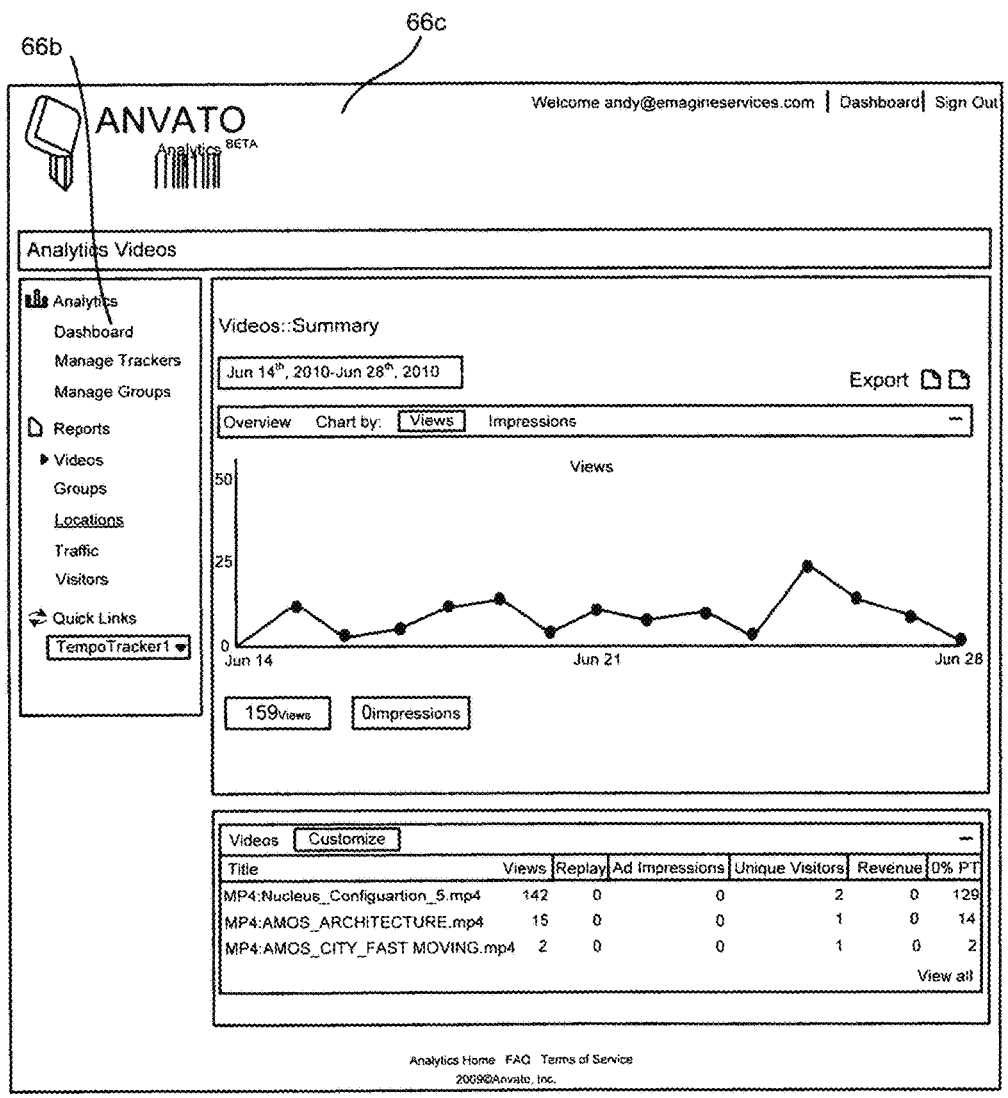
FIG. 23 is a screen shot showing a selection of Reports—Videos for the Analytics Menu set forth in FIG. 19 with corresponding Videos Summary of the total number of views of videos and a breakdown showing the specific Videos viewed.

The final Console of the Administrator Chair, according to the present embodiment, that is, Video Analytics Console 66, essentially ties the System of the present invention into the most advanced video analytics available for Live, real-time events. A screen shot appearing upon activation of a Video Analytics Tab 66a or Video Analytics—3 is shown in FIG. 22. Such function is accessible through Dashboard function 66b shown in the Analytics Menu. This function allows the customer to track Users across events, so that they may see who watched what, when they watched it, what they did, and how much they watched of any given event. All of the possible types of video related actions and activities are tracked and made available in a detailed reporting dashboard, organized by Event, User, Location, Content Type, or in any combination thereof. In FIG. 23, a screen shot is shown corresponding to the Analytics Menu selection for Reports—Videos 66c with corresponding Videos Summary of the total number of views of videos and a breakdown showing the specific Videos viewed.

Figure 24:
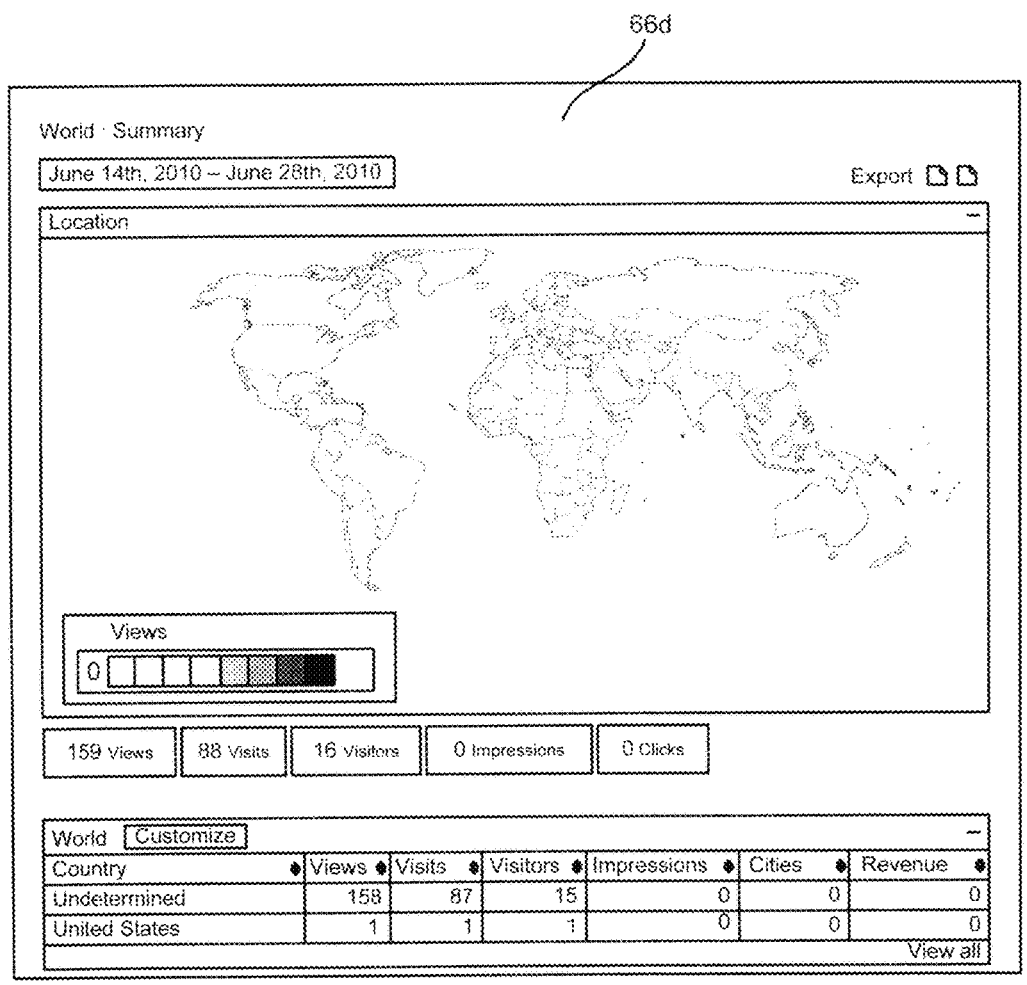
FIG. 24 shows activation of a Reports—Locations function in the Analytics Menu with a summary of views of Videos world-wide.
Figure 25:
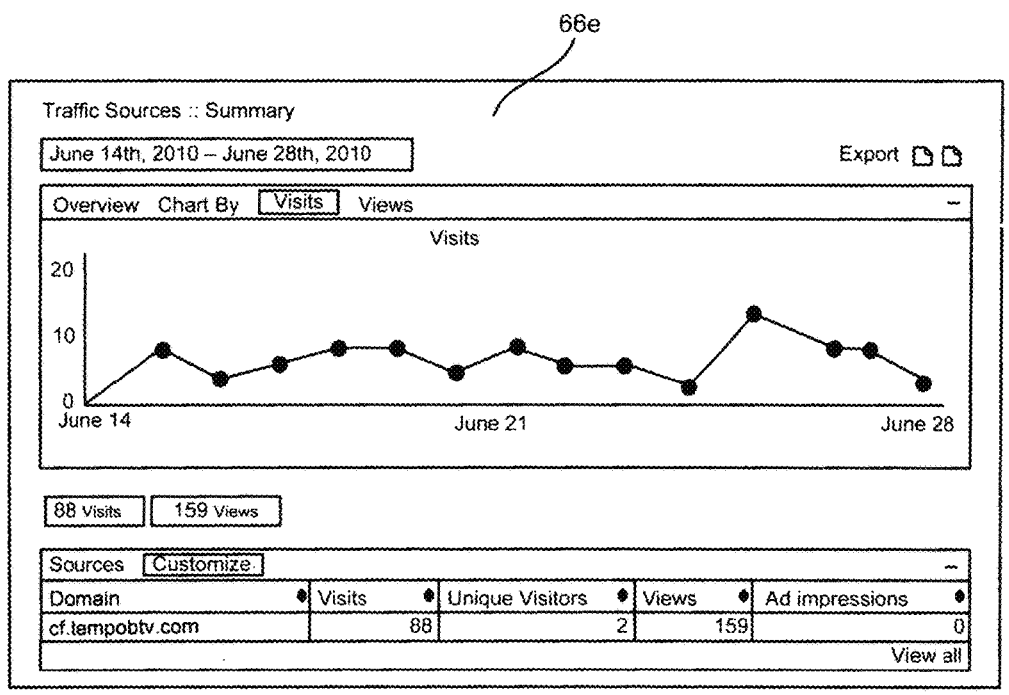
FIG. 25 is a screen shot of a Reports—Traffic function, upon activation in the Analytics Menu, with a summary of Traffic Sources.
Figure 26:
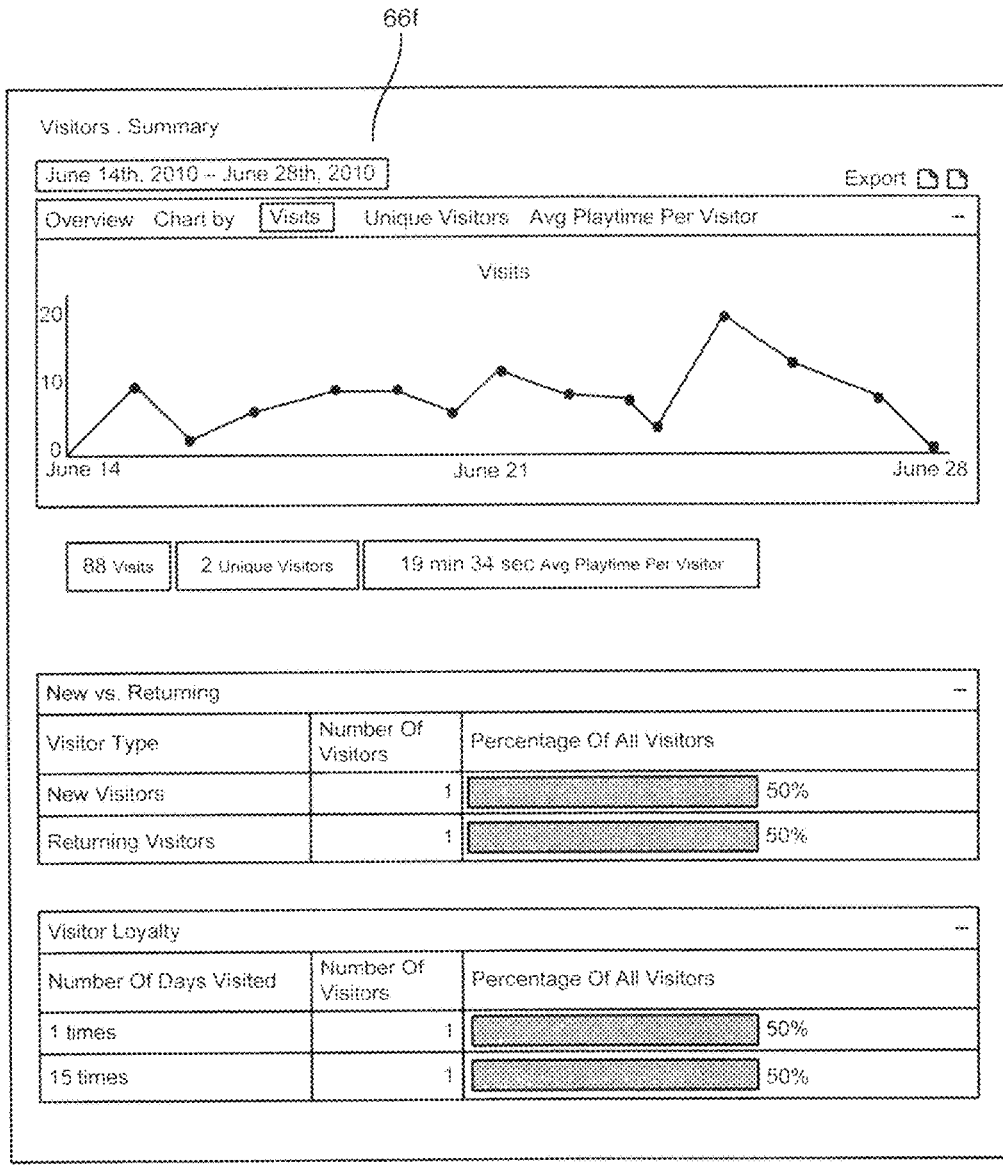
FIG. 26 is a screen shot of a Reports—Visitors function activated through the Analytics Menu which summarizes Visitor data and corresponding analytics regarding New vs. Returning Visitors and Visitor Loyalty.
Figure 27:
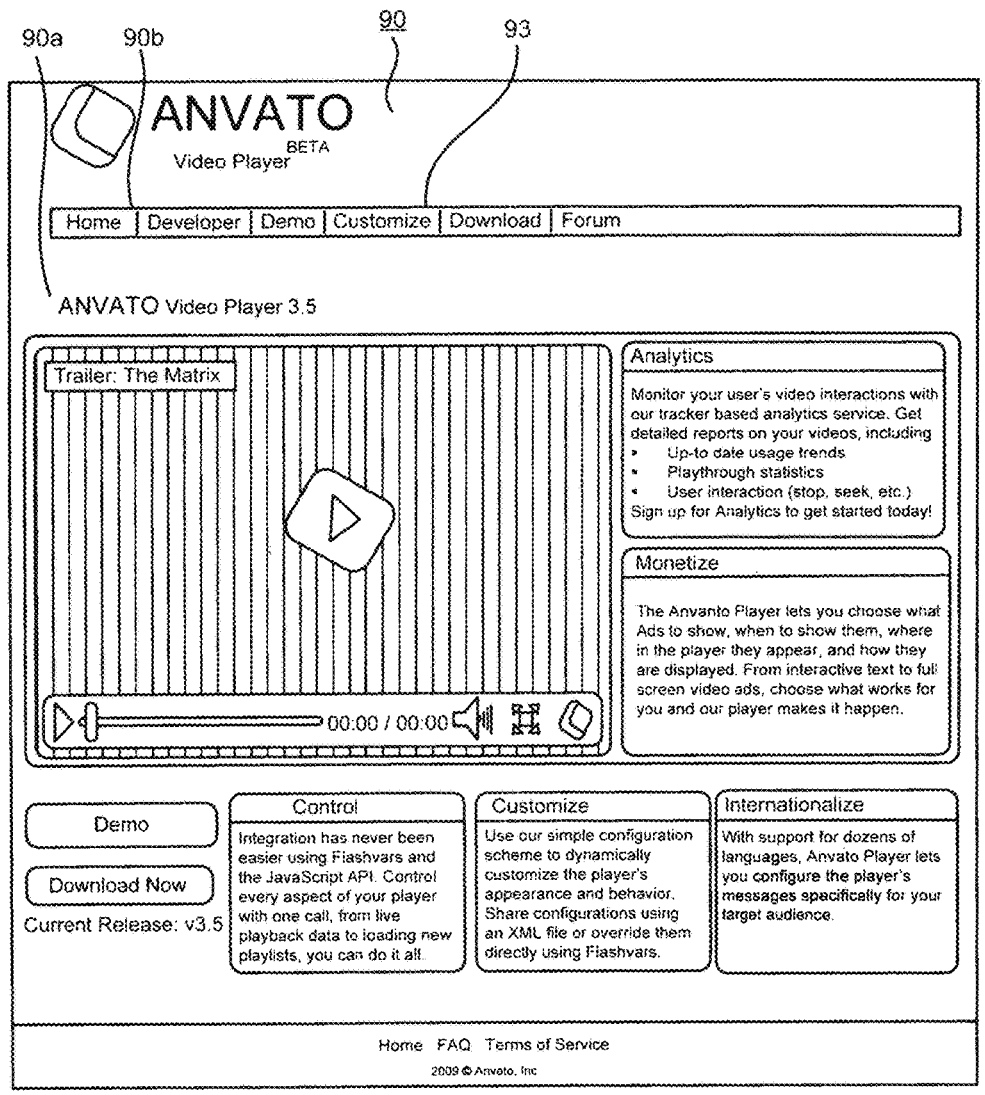
FIG. 27 illustrates an optional Video Player, upon activation of a Video Player Tab accessible through the Administrator's Chair for supporting the Master Control Suite, according to one aspect of the present invention.
Figure 28:
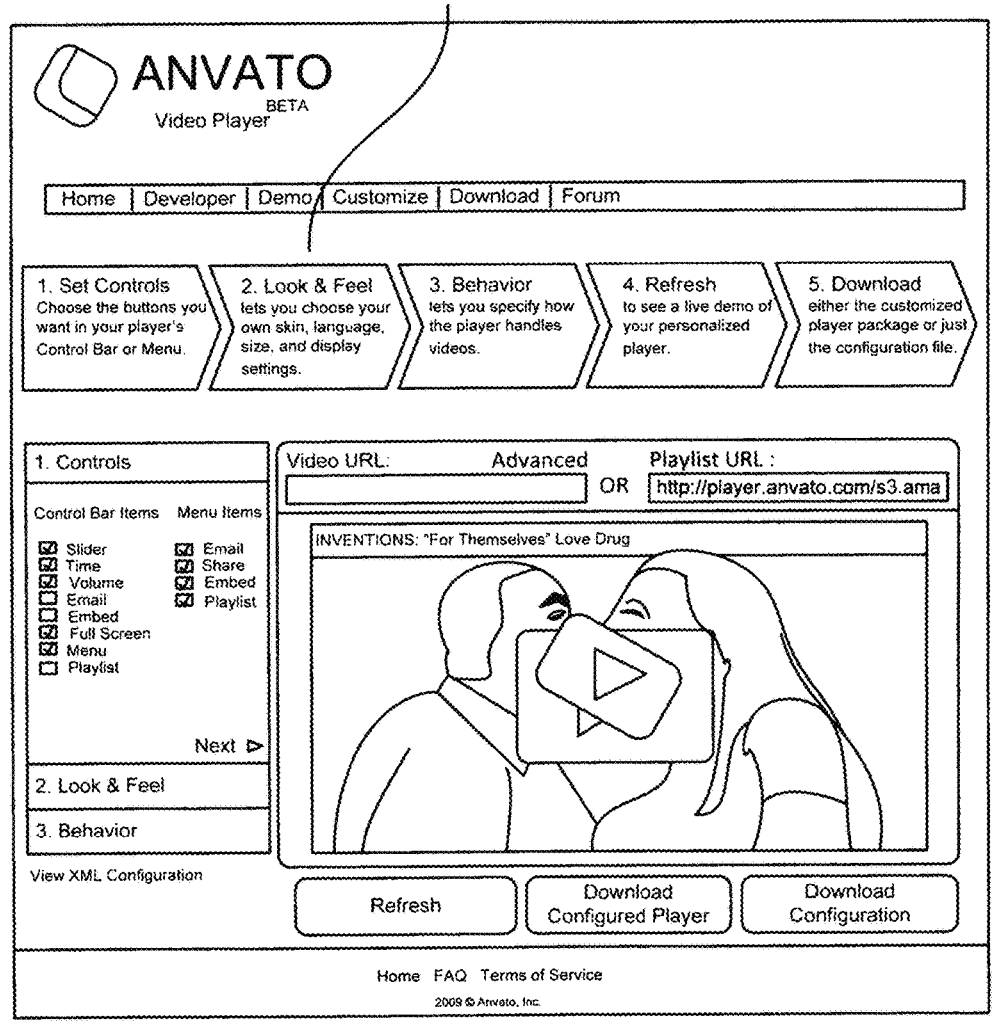
FIG. 28 is a screen shot of a Video Player—Customization function for enabling a wide range of visual or functional styling, functionality and other customization systems that enable the media player to support new customers and market opportunities without the need for custom programming.
Figure 29:
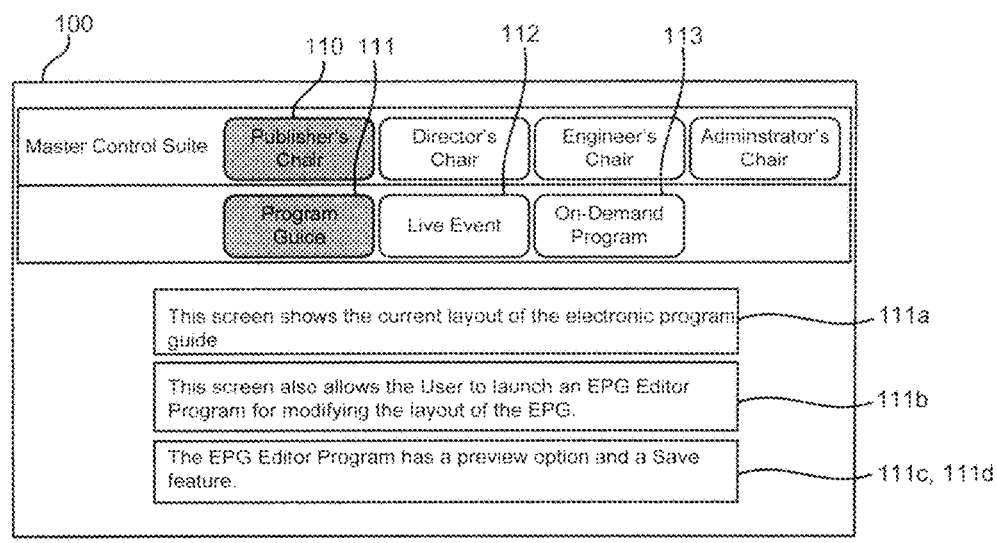
FIG. 29 illustrates a Master Control Suite screen display when the User selects the Publisher's Chair button of FIG. 1, which activates the Publisher's Chair Module, there appearing below the Publisher's Chair button, a row of buttons corresponding to various operative Consoles of the Publisher's Chair, in sequence, a Program Guide, a Live Event and an On-Demand Program button.
Figure 30:
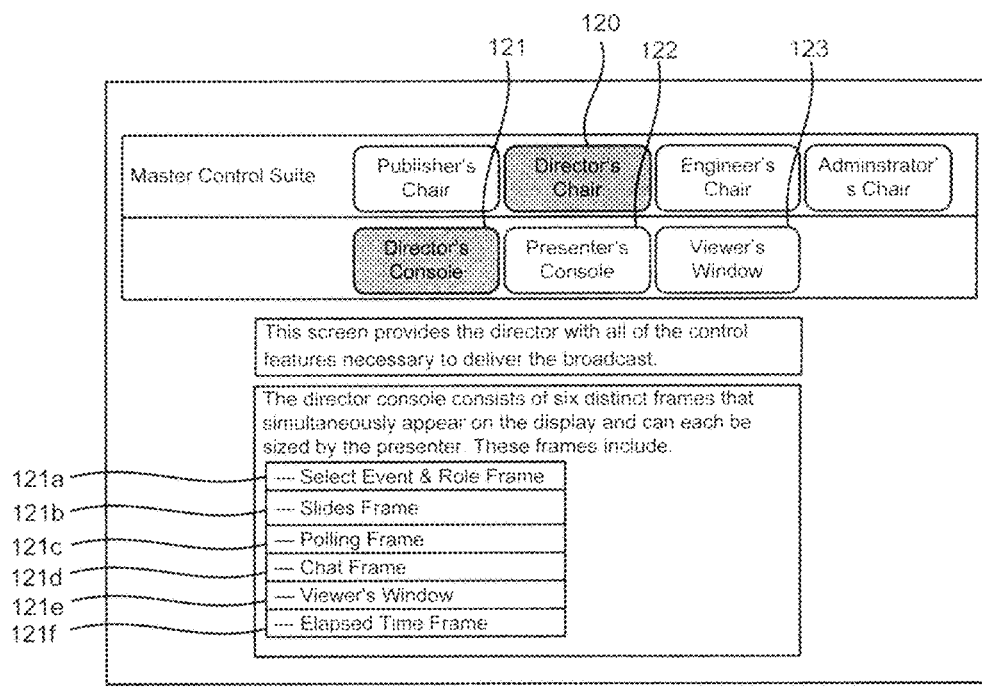
FIG. 30 is a Master Control Suite screen display when the User selects the Director's Chair button of FIG. 1, which activates the Director's Chair Module, there appearing below the Director's Chair button, a row of buttons corresponding to various operative Consoles of the Director's Chair, in sequence, a Director's Console, a Presenter's Console, and a Viewer's Console.
Figure 31:
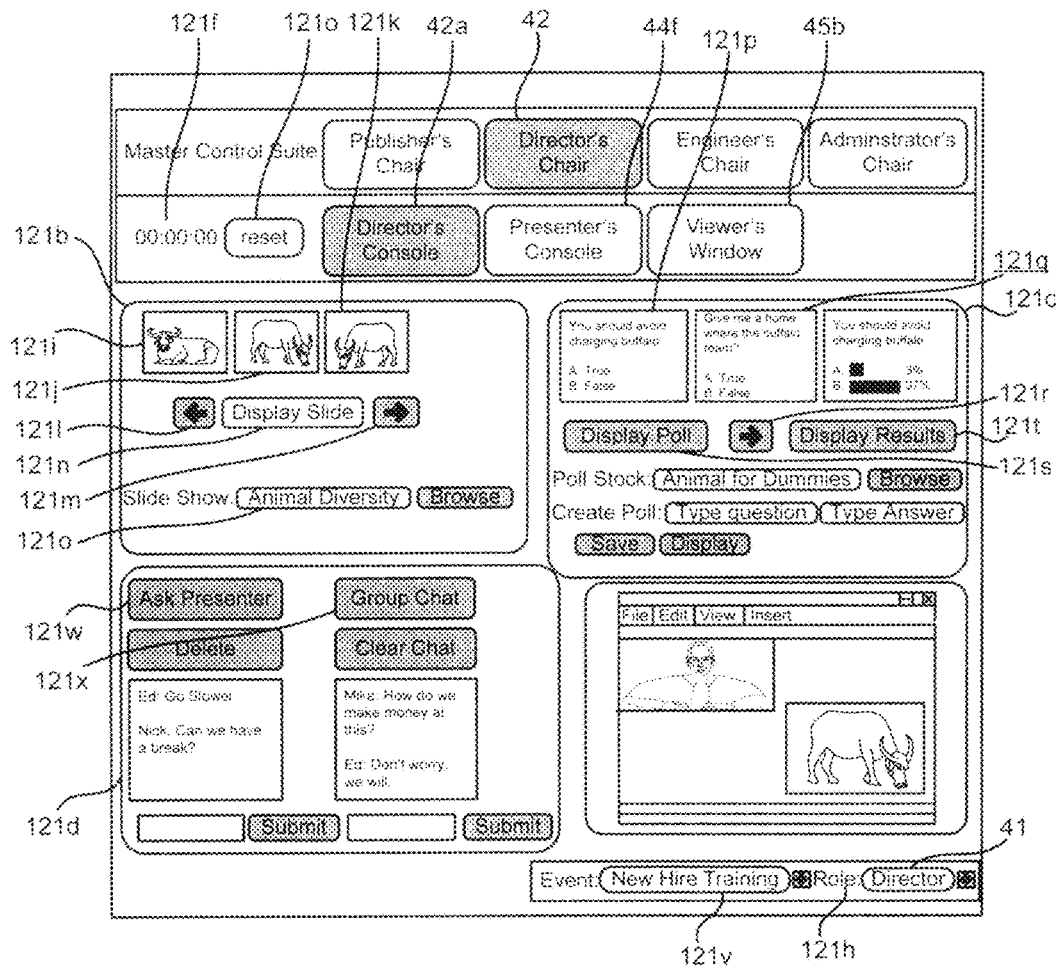
FIGS. 31 and 32 show a Master Control Suite screen display when the User selects the Select Event & Role Frame, which activates a field entitled "Event" with pull down menu detailing all scheduled Live Events listed in the Electronic Program Guide, selects, i.e., clicks on, the desired Event.

As shown in FIG. 24, a Reports—Locations function 66d is activated showing a summary of views of Videos worldwide. FIG. 25 is a screen shot of a Reports—Traffic function 66e, upon activation, with a summary of Traffic Sources. And FIG. 26 shows a screen shot of a Reports—Visitors function 66f activated which summarizes Visitor data and corresponding analytics regarding New vs. Returning Visitors and Visitor Loyalty.

Alternatively or concurrently, Administrator Chair or Module 60 is integrated with pre-existing enterprise Systems to enhance workflow.

Optionally, and in addition to the "core" areas of the Platform and System defined above, i.e., the Publisher's Chair, Director's Chair, Engineer's Chair and Administrator's Chair, the Platform and System of the present invention may include numerous other supporting components in modular or non-modular form. First, according to one aspect of the present invention, one or more or all of the following Player types 90 are provided, namely, Customizable, Broadcasting, Live, VOD, IDL, graphics display, audio, and other conventional types which support a broad range of media, protocols and styling choices. An illustrative Video Player 90a screen shot, upon activation of a Video Player Tab 90b accessible via the Administrator's Chair is shown, for instance, in FIG. 27.

Figure 39:
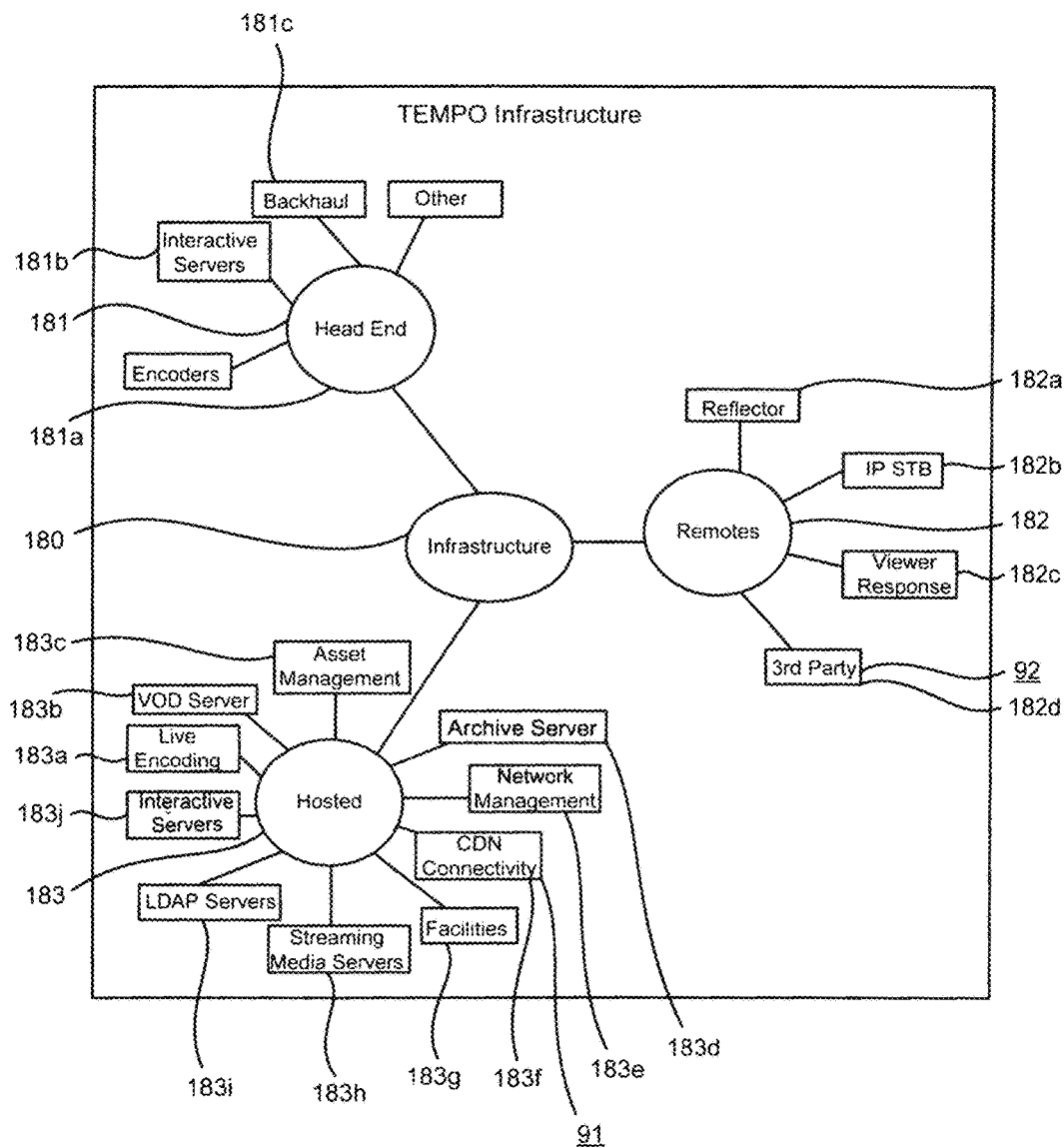
FIG. 39 is a diagram of a system infrastructure, in accordance with FIG. 36, with a Head End, Remotes, an IP STB, a Viewer Response, a third Party; and Hosted.

Second, alternatively or concurrently, and as best seen in FIG. 39, back-end Content Distribution Network (CDN) Management, tracking and reporting Systems 91 are provided with functions for management, reporting and generating billing data related to bandwidth and storage usage. Further in the alternative or concurrently therewith, and third, numerous, e.g., dozens, of secure, self-documenting Web Services 92 are provided that support data input/output and related control of the Platform and System and related databases, which enable a broad range of third party integration, partnership and deployment options that can be used to simply extend the Platform and System's capabilities and market opportunities.

Fourth, and also alternatively or concurrently, component(s) are provided for deployment automation and customization interfaces 93, which include variable documented interfaces and components used to deploy the Platform and System for new customers. Fifth, and alternatively or concurrently, Player Customization and settings API 94 are provided for enabling a wide range of visual or functional styling, functionality and other customization Systems that enable a Media Player 95 to support new customers and market opportunities without the need for custom programming. A screen shot of a Video Player—Customization function 96 is set forth in FIG. 28.

Overall, and at the kernel of the present invention, in facilitating use of code written using various self-documenting API and architecture definition tools, is the ability to grow and extend the functionality of the Platform and System in a manageable fashion.

In operation, according to another aspect of the present invention, a Master Control Suite screen 100 is displayed initially, each Module or Chair of Platform and System 17 being shown as a button and column of a linear, sequential menu. When the User clicks on (e.g., using a mouse) or touches (in the case of a touch screen) the Publisher's Chair button 110, the Publisher's Chair Module is activated, and the Master Control Suite screen displays, below the Publisher's Chair button, a row of buttons corresponding to various operative Consoles of the Publisher's Chair, in sequence, an Electronic Program Guide (EPG) 111, a Live Event 112 and an On-Demand Program button 113. A Master Control Suite screen of this general description is shown, for instance, in FIG. 29. Upon clicking the Program Guide button, the screen displays a current layout of the Electronic Program Guide 111a. The screen also provides buttons that allow the User to launch an EPG Editor Program 111b, permitting the User to modify, i.e., customize, the EPG layout. Upon launching the EGP Editor Program, a Preview Option button 111c as well as a Save feature button 111d appear for the described functions.

When the User clicks on the Live Event button 112, buttons are displayed that allow him/her to either create a new event or modify an existing event. In addition, a Field is displayed each for scheduling Start and Stop times for a selected Event, entering title and metadata for an Event, assigning an access level to one or more Viewers for Event viewing privileges, and/or for assigning a selected Media Player for an Event. A button to "Publish" an Event to the Electronic Program Guide is displayed subsequently or concurrently.

Finally, if the User clicks the On-Demand button 113, a screen is displayed which allows the User to either create a new On-Demand program or modify an existing one. A Field is displayed each for scheduling an expiration date of the On-Demand program, entering title, metadata, and length of the program, assigning an access level to one or more Viewers for On-Demand program viewing privileges, assigning a selected Media Player for an Event, and/or for selecting a VOD file to be uploaded to the service provider's network center, e.g., GSI Network Operations Center or the like. As in the case of Live Events, a button is additionally displayed to "Publish" the On-Demand Program to the Electronic Program Guide and upload to the service provider's network center.

When the User wishes to activate the Director's Chair module 40, he/she clicks on a Director's Chair button 120, and Master Control Suite screen 100 displays, below the Director's Chair button, a row of buttons corresponding to various operative Consoles of the Director's Chair, in sequence, a Director's Console 121, a Presenter's Console 122, and a Viewer's Console 123. A Master Control Suite screen of this general description is illustrated, for instance, in FIG. 30. This screen effectively provides the Director with all control features necessary to deliver a broadcast. Upon clicking the Director's Console button 121, a plurality of, e.g., six, distinct frames appear simultaneously on the display that can each be sized by the Presenter. These frames include a Select Event & Role Frame 121a, a Slides Frame 121b, a Polling Frame 121c, a Chat Frame 121d, a Viewer's Window 121e, and an Elapsed Time Frame 121f.

Upon clicking on the Select Event & Role Frame, a field entitled "Event" 121g is activated with pull down menu detailing all scheduled Live Events listed in the Electronic Program Guide. The User then selects, i.e., clicks on, the desired Event. If the User chooses the field entitled "Role" 121h, a pull down menu is activated which allows the User to establish himself/herself as either the "Director" or "Presenter". Notably, a Central Database is provided which allows only one person at a time to login as a Director. The Director has access to Director, Presenter and Viewer Tabs 42a, 44f and 45b, respectively. The Central Database also allows only one person at a time to login as a Presenter. The Presenter only has access to, i.e., views, Presenter Tab 44f. A Master Control Suite screen displaying a configuration of this general description is set forth in FIG. 31.

Should Slides Frame 121b be activated, a plurality of slides, e.g., three, are displayed, namely, one for Previous 121i, Current 121j and Next screen 121k. Controls for advancing the Slide 121l or for going backwards 121m are also shown, as is a button to Display/Retract Current Slide 121n. An additional button 121o is provided on the screen to Import Slides. By clicking this button, the User may open a browser which allows him/her to select PowerPoint, i.e., Microsoft PowerPoint presentation software, to be used for the assigned Live Event.

If Polling Frame 121c is activated by the User, the Master Control Suite screen displays Two Polls to the Presenter: namely, designated as Current 121p & Next 121q, and allows the User to Advance Poll or go backwards 121r. A button for Display/Retract current Poll to/from Viewers is also provided. The screen also displays "Current Poll Results" to the Presenter, and provides a button 121t for enabling "Current Poll Results" to be displayed/retracted to/from Viewers. Another button 121u on the screen allows the User to create polls "in advance" of the program. Optionally these polls may then be assigned to a folder for use with an assigned Live Event. A further button 121v enables the Presenter to create polls "on the fly", and consists, for instance, of two fields: namely, "question" and "responses".

The Chat Frame 121d displays the compiled "Ask The Presenter" questions submitted by Viewers, providing the ability to submit an "Ask The Presenter" message that is highlighted to indicate that it is coming from the Director. The Chat Frame also allows the User to delete specific questions from the "Ask The Presenter" queue, and displays a button 121w to Enable/Disable the "Ask The Presenter" feature for Viewers. In addition, the Chat Frame displays a "Group Chat" forum with chat capabilities for the Director, as well as provides the ability to participate in "Group Chat" and to clear all dialogue from "Group Chat". By clicking a button 121x that is also displayed, the User may Enable/Disable operation of the "Group Chat" forum.

The Viewer's Window Frame 121e of the Director's Chair displays the Media Player being used by Viewers to watch the Event. This window actively views the Event.

Finally, Elapsed Time Frame 121f of the Director's Console displays the elapsed time that the User has been logged into the Event. Such time is preferably displayed digitally in Hour:Minute:Second format. A Reset button 121o is included on the Master Control Suite screen for resetting time display to 00:00:00.

Upon clicking Presenter's Console button 122 of the Master Control Suite screen, the screen displays a plurality of, e.g., six, distinct frames and can each be sized by the Presenter. Like the Director's Console, these frames include a Select Event & Role Frame 122a, a Slides Frame 122b, a Polling Frame 122c, a Chat Frame 122d, a Viewer's Window 122e, and an Elapsed Time Frame 122f.

Upon clicking on the Select Event & Role Frame, a field entitled "Event" 122g is activated with pull down menu detailing all scheduled Live Events listed in the Electronic Program Guide. The User then selects, i.e., clicks on, the desired Event. Should the User choose the field entitled "Role" 122h, a pull down menu is initiated which permits the User to establish himself/herself as either the "Director" or "Presenter". Significantly, as is the case with the Director's Console, a Central Database is provided that allows only one person at a time to login as a Director. The Director has access to Director, Presenter and Viewer Tabs 42a, 44f and 45b, respectively. The Central Database also allows only one person at a time to login as a Presenter. The Presenter only has access to, i.e., views, the Presenter Tab. A Master Control Suite screen displaying a configuration of this general description is set forth in FIG. 32.

If the User activates Slides Frame 122b, a series of slides, e.g., three, are displayed, namely, one for Previous, Current and Next screen. Controls for advancing the Slide or for going backwards are also shown, as is a button to Display/Retract Current Slide 122i.

Should the Polling Frame 122c be activated by the User, the Master Control Suite screen displays Two Polls to the Presenter: namely, the Current & the Next poll, which also allows the User to Advance Poll or go backwards. A button for Display/Retract current Poll to/from Viewers 122j is also provided. Additionally, the screen displays "Current Poll Results" to the Presenter, and provides a button 122k for enabling "Current Poll Results" to be displayed/retracted to/from Viewers. Another button 122l on the screen, consisting, for example, of two fields: "question" and "responses", allows the Presenter to create polls "on the fly" as well.

The Chat Frame 122d not only displays the "Ask The Presenter" questions submitted by Viewers, but also allows the User to delete specific questions from the "Ask The Presenter" queue. It displays a button 122m to Enable/Disable the "Ask The Presenter" feature for Viewers. In addition, this Frame shows a "Group Chat" forum with chat capabilities for the Director, and provides the ability to participate in "Group Chat" and to clear all dialogue from "Group Chat". By clicking another button 122n on the screen, the User may Enable/Disable operation of the "Group Chat" forum.

Figure 33:
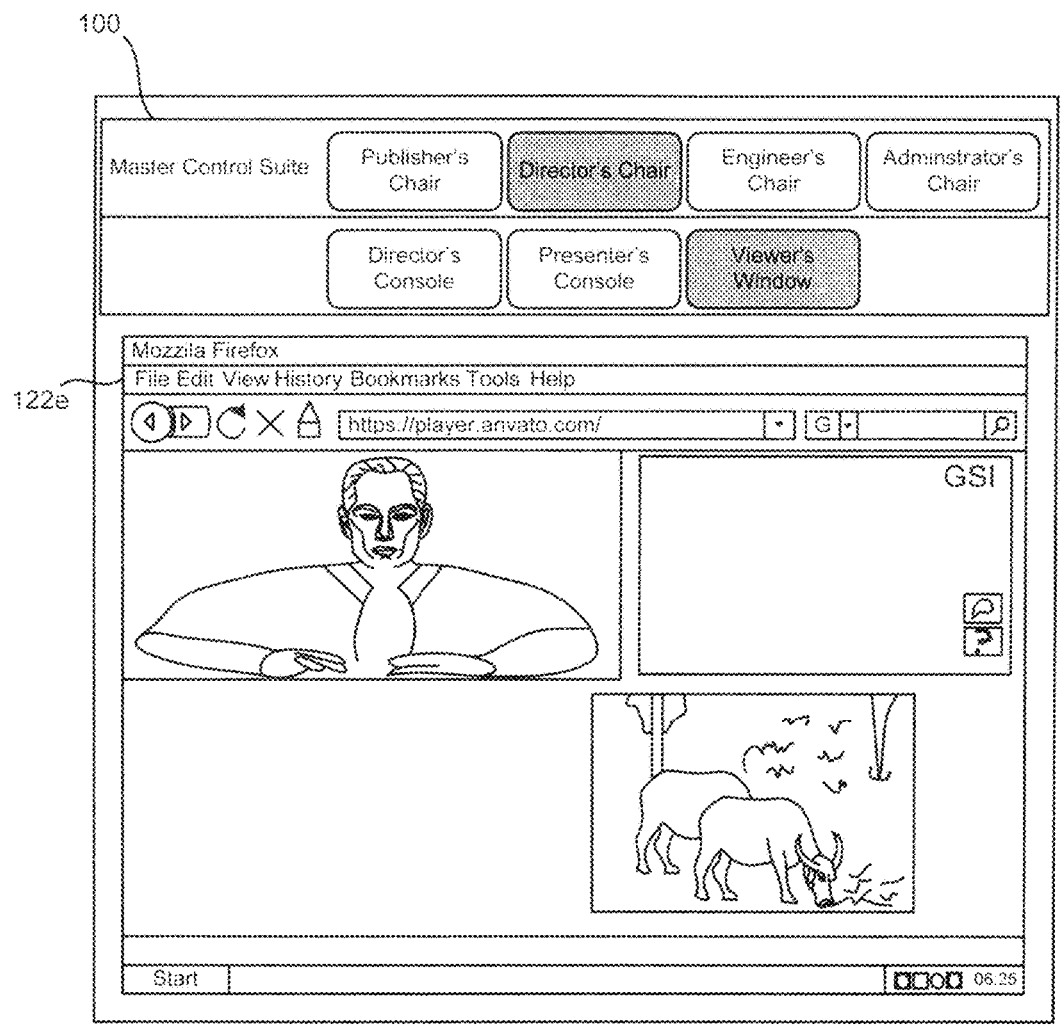
FIG. 33 illustrates a Master Control Suite screen display when the User selects an Elapsed Time Frame button of the Presenter's Console for the Director's Chair, the screen displaying the elapsed time that the User has been logged into the Event.
Figure 34:
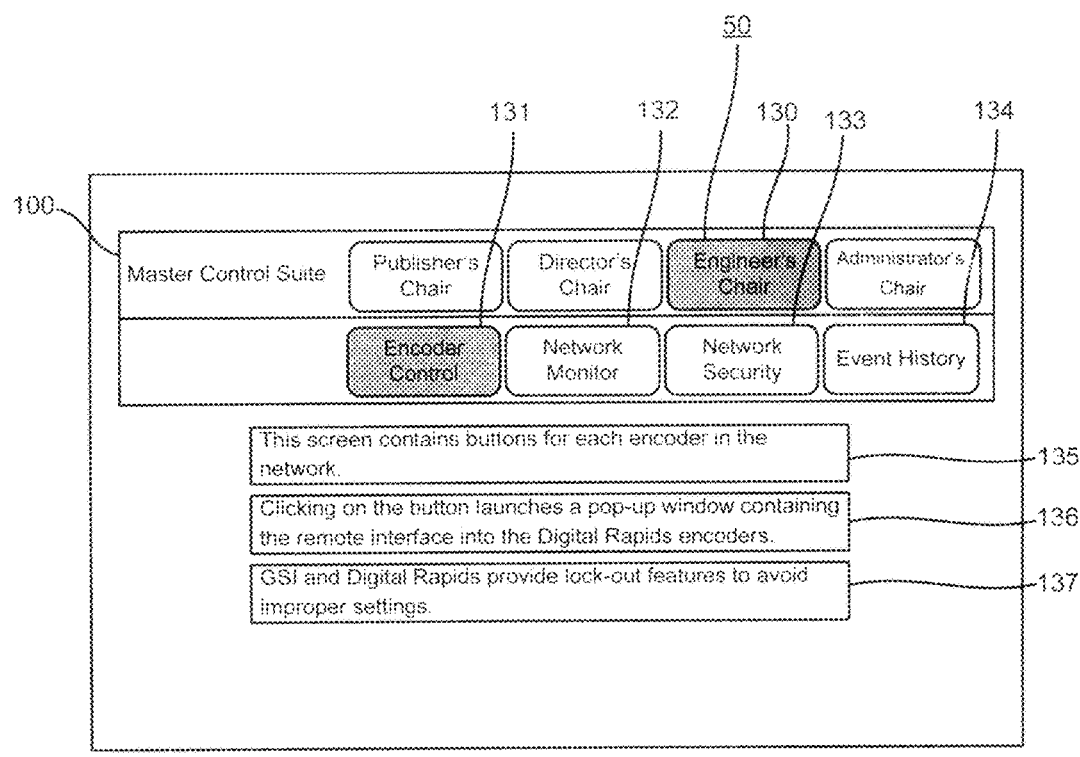
FIG. 34 illustrates a Master Control Suite screen display when the User selects the Engineer's Chair button, thereby activating the display of a row of buttons corresponding to various operative Consoles of the Engineer's Chair, in sequence, Encoder Control, Network Monitor, Network Security, and Event History.
Figure 35:
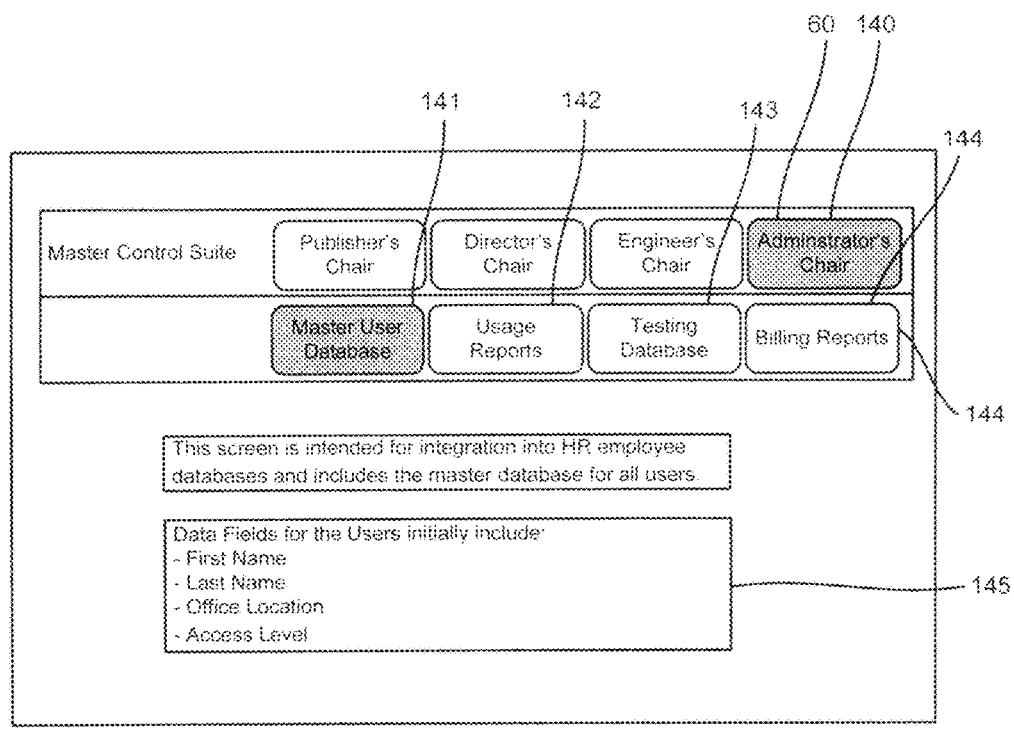
FIG. 35 is a screen shot of a Master Control Suite screen display when the User selects the Administrator's Chair button module, thereby activating the display of a row of buttons corresponding to various operative Consoles of the Administrator's Chair, in sequence, the Master User Database, Usage Reports, Testing Database and Billing Reports.
Figure 36:
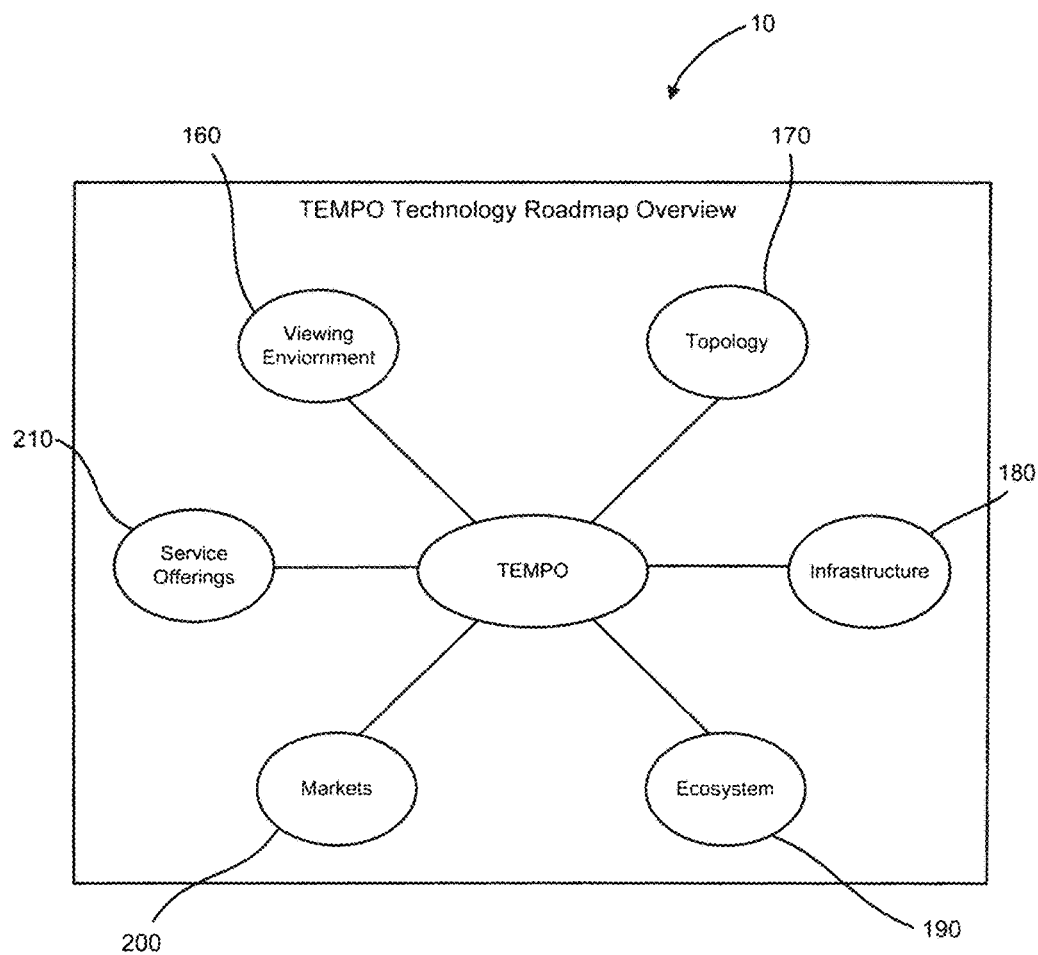
FIG. 36 is a diagram showing the technology platform and architecture of the Enterprise Media Control Platform, System and underlying Service, according to one embodiment of the present invention, with an array of functionality including a unique Viewing Environment, Topology, Infrastructure, Ecosystem, Markets and Service Offerings.

Again, and as best seen in FIG. 33, Viewer's Window Frame 122e of the Director's Chair displays the Media Player being used by Viewers to watch the Event. This window actively views the Event.

Figure 32:
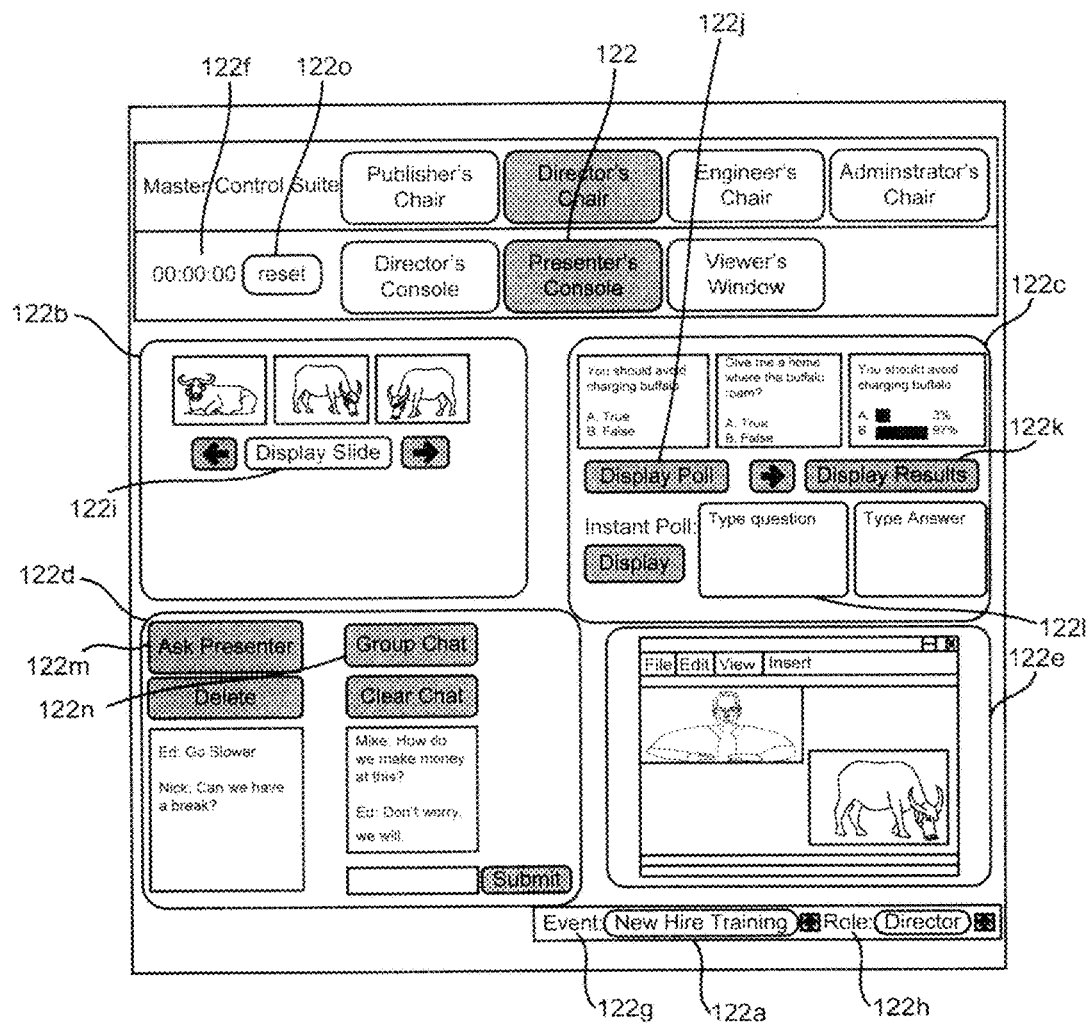

Last, the Elapsed Time Frame 122f of the Presenter's Console displays the elapsed time that the User has been logged into the Event. Elapsed. Time is desirably shown digitally in Hour:Minute:Second format. A Reset button 122o is provided on the Master Control Suite screen for resetting the time display to 00:00:00. A Master Control Suite screen displaying a configuration of this general description is illustrated in FIG. 32.

When the User wishes to activate the Engineer's Chair module 50, he/she clicks an Engineer's Chair button 130 on Master Control Suite screen 100, thereby activating the display of a row of buttons corresponding to various operative Consoles of the Engineer's Chair, in sequence, Encoder Control 131, Network Monitor 132, Network Security 133, and Event History 134. A Master Control Suite screen of this general description is shown, for instance, in FIG. 34. This screen effectively provides buttons 135 for each encoder in the network. Upon clicking Encoder Control button 131, a pop-up window is launched which includes a remote interface 136 to third party, e.g., Digital Rapids, encoders. As will be appreciated by those skilled in the art, lock-out features 137 are provided to avoid improper settings upon interfacing of the service of the present invention with the Digital Rapids encoders.

When the User clicks on Network Monitor button 132, the screen displays any and all Network Monitoring tools that can be made available to the customer of the service. Upon activating the Network Security button 133, the Master Control Suite screen provides control of network security elements that are made available to the customer. In this connection, a Master User Database application resides separately in the Administrator's Chair for linage to items such as Human Resource databases or the like. As for Event History button 134, upon activation, a pop-up window is launched containing an Event History Log Report from the service provider's network center, e.g., GSI Network Operations Center.

If the User activates Administrator's Chair module 60, i.e., by clicking on or touching the corresponding button 140 on the Master Control Suite screen, a row of buttons corresponding to various operative Consoles of the Administrator's Chair are displayed, in sequence, namely, Master User Database 141, Usage Reports 142, Testing Database 143 and Billing Reports 144. A Master Control Suite screen of this general description is shown, for instance, in FIG. 35. Upon selecting Master User Database Console 141, for example, the screen displayed integrates such information into Human Resources Employee Databases and includes the Master Database for all Users. Data fields 145 for the Users desirably include First Name, Last Name, Office Location and Access Level, buttons effectively being provided for each encoder in the network. Should the User select Usage Reports console 142 on the screen, a database is accessed which allows the Administrator to run reports of network usage. It is preferred that the Reports detail all activity by a specific User or specific Home Office. Preferably also, the Reports detail attendance for specific Live Events and On-Demand Programs.

Desirably, the System and Service of the present invention provides for single sign-on by a User.

Referring now to System infrastructure and interfaces 150 (see FIG. 37), according to various aspects of the present invention, the System provides three or more major interfaces including, but not limited to, Internet/Computer interface 13, Television interface 14, and Mobile Device 15 (e.g., cell phone, PDA, iPad). Each User of the System, namely, the Master (e.g., Globecomm Systems Service), Publisher, Presenter, Engineer, Administrator, Director, and Viewer may then access the System via a conventional portal through one or more of the major interfaces.

Each Media Player 95 is preferably not only modular but also optionally re-configurable. Other important functions provided include, but are not limited to, VOD Search, Content Search (desirably combined with VOD Search), Mouse Over (Navigation), Single Click, Double Click, Right Click. Additionally provided are platform adaptation functions for delivery across satellite network(s) including, but not limited to, the following: Multi-Cast Enabled, Deliver Over Satellite, and Deliver Over WAN. An objective is first to include delivery of content over a two-way and hybrid satellite network, and second to include IDL services over both two-way and hybrid satellite network. Further provided is an Electronic Program Guide layout for supporting single live channel and VOD-only clients. Since there are customers who only require a portion of the TEMP Service, either Live or VOD, this need is accommodated. Provided, in addition, are the capability for the live Presenter to poll viewers to confirm active participation and auto disconnect non-responsive viewers, and to view a listing of active-registered viewers. Active Directory/LDAP, Viewer analysis and support tools, Reporting and Analytics, and Billing and Payment functions are provided as well.

Optimally, the Platform and System of the present invention is integrated with a Learning Management System (LMS) 151 (see FIG. 40), and preferably a plurality thereof, using a specific Application Programming Interface (API). The Platform and System is integrated with Mobile Devices for delivery of ICC player over Mobile Devices, and for delivery of the IDL player over Mobile Devices. Preferably, Electronic Program Guide customization functionality is enhanced. Furthermore, the Platform and System are adapted for streaming to IP-set top box environments, requiring multicast implementation. Notably, the Engineer's Chair module 50 has the ability to gather information on the health of remote Set-Top Boxes (STB's) and management thereof. Accordingly, for example, Cilutions STB management API's or the like are implemented, as appropriate, i.e., Digital Media Bridge, Digital Signage, etc. Provisioning for Emergency Notification integration, e.g., implementation of Really Simple Syndication (RSS) feed, is also provided for frequently updated information.

Additional features integrated include, but are not limited to, Vistacast, customizable EPG's and Players, an On-Demand Console having a cbsnews.com look, Group Administration, Finish Live Voice, Ratings and comments on VOD, Live Events to Outlook, User Generated Contribution, Updated Analytics, and On-Demand Playlist to Channel.

Still further features include, but are not limited to, Live Mobile One-way and Two-way, Interactive Video Chat, Whiteboard and Shared Desktop, Interactive Classroom, Managed Hub, Remote Contribution from Video Conference Room, Signage Integration, Emergency Notification, Multicast Enabled TEMPO based on Adobe release 9/1, iVOD Authoring and P2P Partner.

Additional features include TEMPO platform integration for Digital Signage applications, i.e., Pyro-Mac-Mini, another is VoIP, Video Chat, Video Conferencing, Shared Desktop, Whiteboard, Synchronized PPT, Digital Rights Management (DRM), HR Systems, Enterprise Digital CMS, Enterprise Storage (distributed), Legacy Training Content, Legacy DRM, Enterprise Web and/or Intranet integration, Web Services, All Content Behind the Firewall Service, High-end Video Publishing/Distribution Platform.

Ecosystem related integration features include, but are not limited to, Content Creation, Event Production, Editing/Post Production, Encoding, Storage, Delivery (integration of CDN, P2P and Edge Multicast), Syndication/Promotion, Monetization, Software Application Integration Services (Enterprise Legacy Apps, Web 2.0 Tools, Web Services and Flash Media), Rich Media Training Professional Services, Video and Telepresence Conference Rooms (Curriculum Development and "Application" Templates), Portable Studios, and Web Services.

Preferably, at least a portion of Microsoft Silverlight, that is, the portion addressing the ability to run Windows Media Player, is integrated into the system of the present invention as well. Support is provided by a third party service, e.g., ZeroFootprint, for obtaining Certificates of Net Worthiness for use of the present invention in select Government Agencies.

Figure 37:
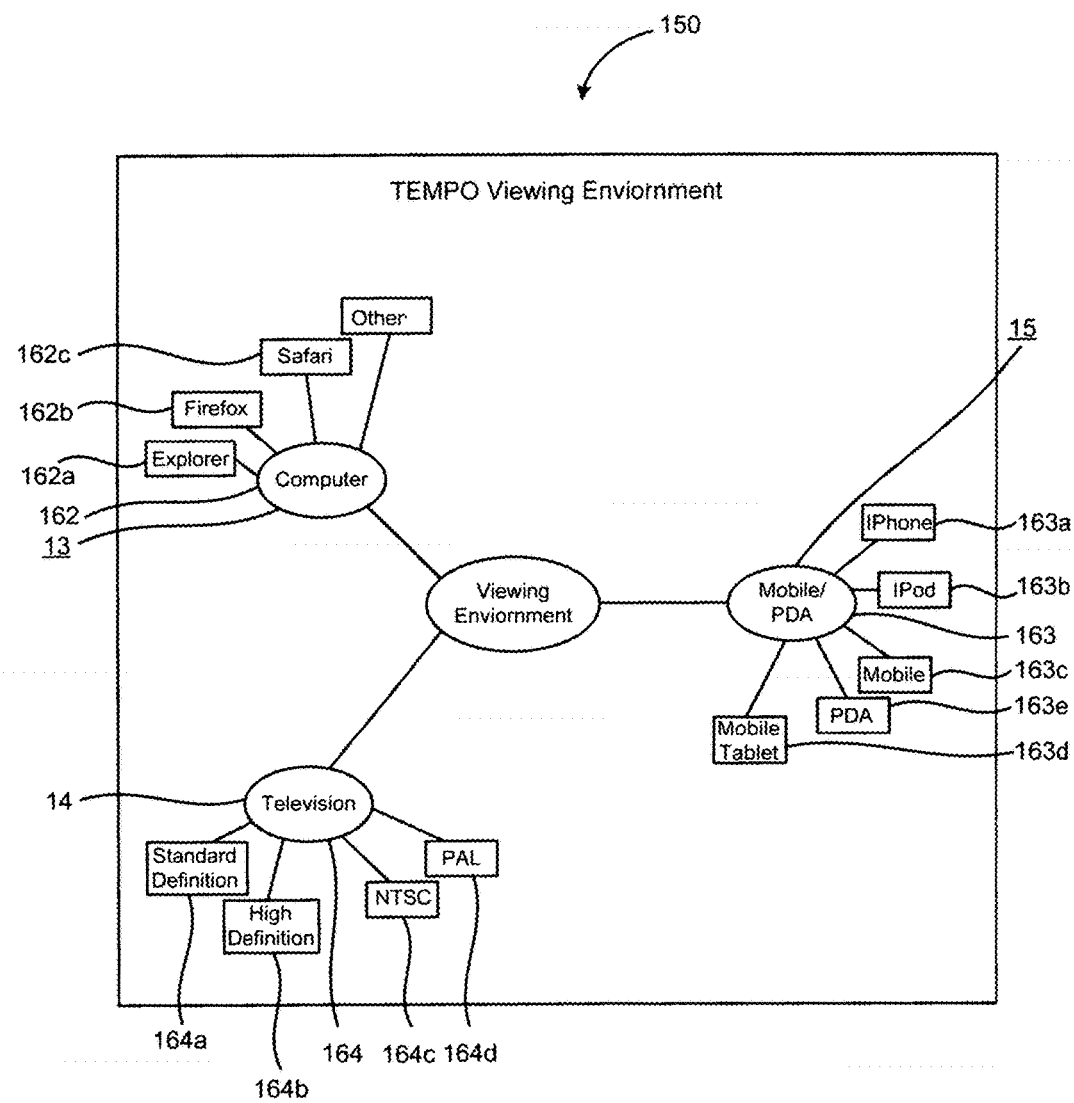
FIG. 37 is a diagram illustrating a Viewing Environment, in accordance with FIG. 36, encompassing one or more Computers with one or more Web Browsers, Mobile/PDAs, and Televisions.

The present invention provides a unique technology platform and architecture. According to one embodiment, illustrated generally in FIG. 36, the Enterprise Media Control Platform, System and underlying Service 10 of the present invention provides an array of functionality including a unique Viewing Environment 160, Topology 170, Infrastructure 180, Ecosystem 190, Markets 200 and Service Offerings 210. As best seen in FIG. 37, the Viewing Environment encompasses Computers (Desktop, Laptop, etc.) 161 with Web Browsers 162, namely, Microsoft Explorer162a, Firefox 162b, Safari 162c and/or others; a Mobile/PDA 163 (e.g., cellular telephone, Smart Phone), namely, iPhone 163a, iPod 163b, Mobile Device 163c, Mobile Tablet 163d and PDA 163e; and Televisions 164 including Standard Definition 164a, High Definition 164b, NTSC 164c and PAL 164d.

Figure 38:
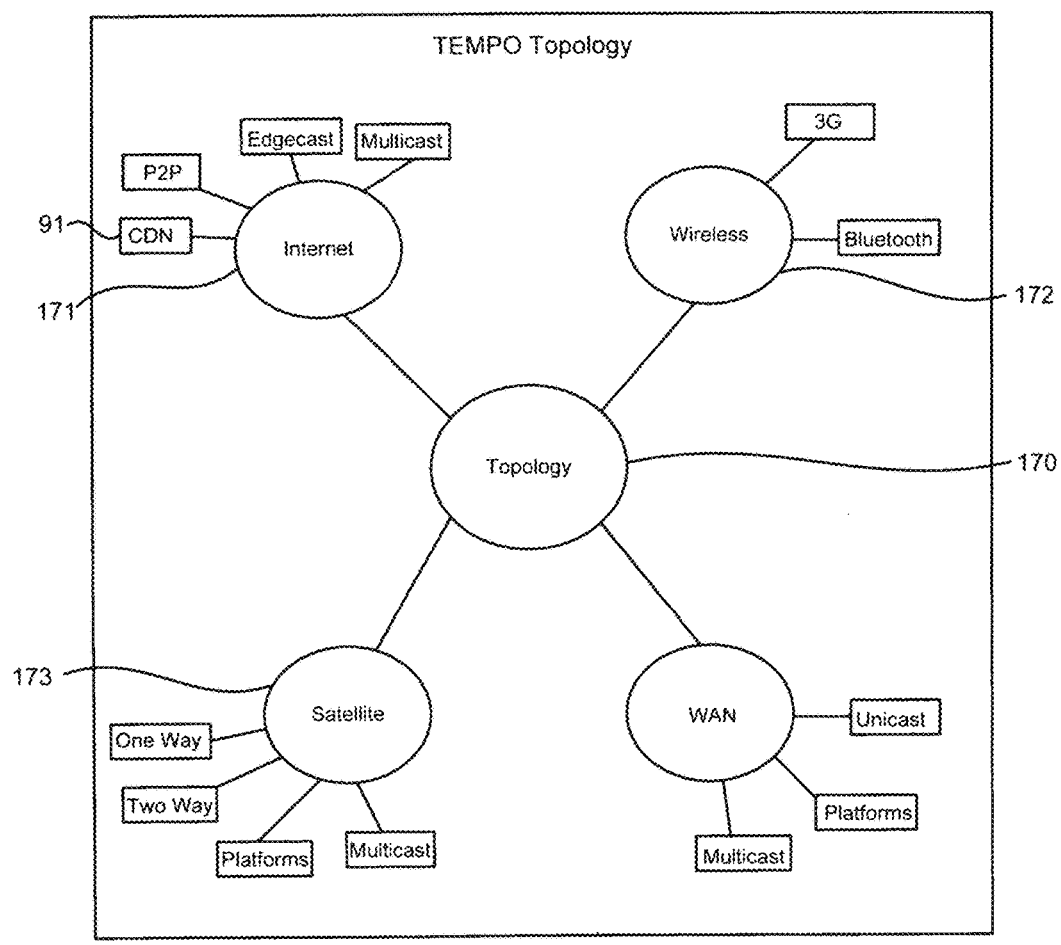
FIG. 38 is a diagram showing a platform and architecture topology, according to FIG. 36, including Internet, Wireless, WAN, and Satellite.

Topology 170, as illustrated in FIG. 38, includes Internet, i.e., CDN, P2P, EdgeCast and Multicast; Wireless 172, i.e., 3G, 4G and Bluetooth; WAN, namely, Unicast, Platforms and Multicast; and Satellite 173 including One-Way, Two-Way, Platforms and Multicast. As for the Infrastructure, according to FIG. 39, it includes a Head End 181 comprising Encoders 181a, Interactive Servers 181b, Backhaul 181c and others; Remotes 182, namely, a Reflector 182a, an IP STB 182b, a Viewer Response 182c, and a $3^{rd}$ Party 182d; and Hosted 183, i.e., Live Encoding 183a, VOD Server 183b, Asset Management 183c, Archive Server 183d, Network Management 183e, CDN Connectivity 183f, Facilities 183g, Streaming Media Servers 183h, LDAP Servers 183i and Interactive Servers 183j.

Figure 40:
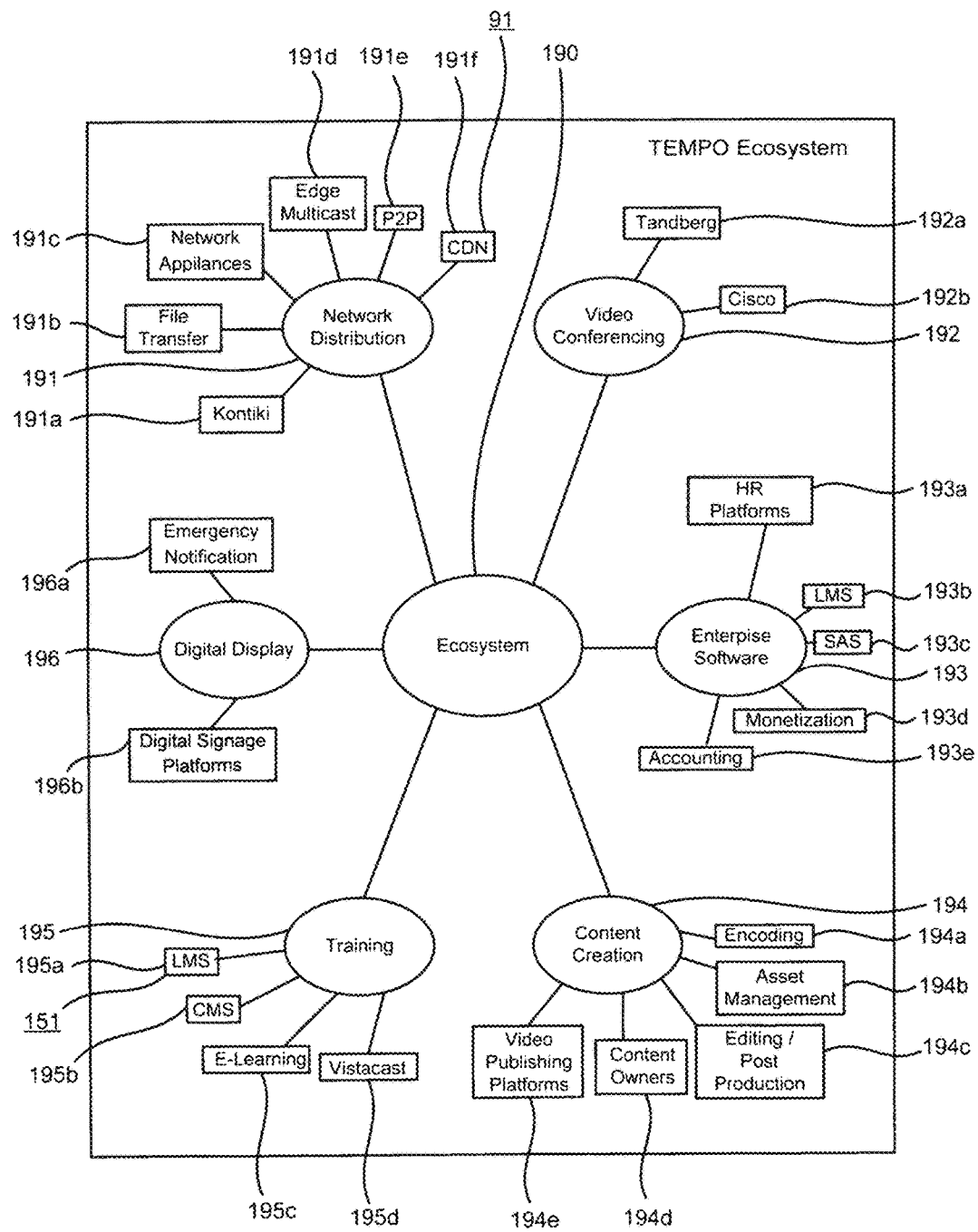
FIG. 40 shows an Ecosystem of the present invention, comprising Network Distribution, Video Conferencing, Enterprise Software, Content Creation, Training, and Digital Display.

Next is the Ecosystem 190 of the present invention which is shown, for instance, in FIG. 40. The Ecosystem comprises Network Distribution 191 including Kontiki 191a, File Transfer 191b, Network Appliances 191c, Edge Multicast 191d, P2P 191e and CDN 191f; Video Conferencing 192 including Tandberg 192a and Cisco 192b; Enterprise Software 193 including HR Platforms 193a, LMS 193b, SAS 193c, Monetization 193d and Accounting 193e; Content Creation 194 which comprises Encoding 194a, Asset Management 194b, Editing/Post Production 194c, Content Owners 194d, and Video Publishing Platforms 194e; Training 195 including LMS 195a, CMS 195b, E-Learning 195c and Vistacast 195d; and Digital Display 196 comprising Emergency Notification 196a and Digital Signage Platforms 196b.

Figure 41:
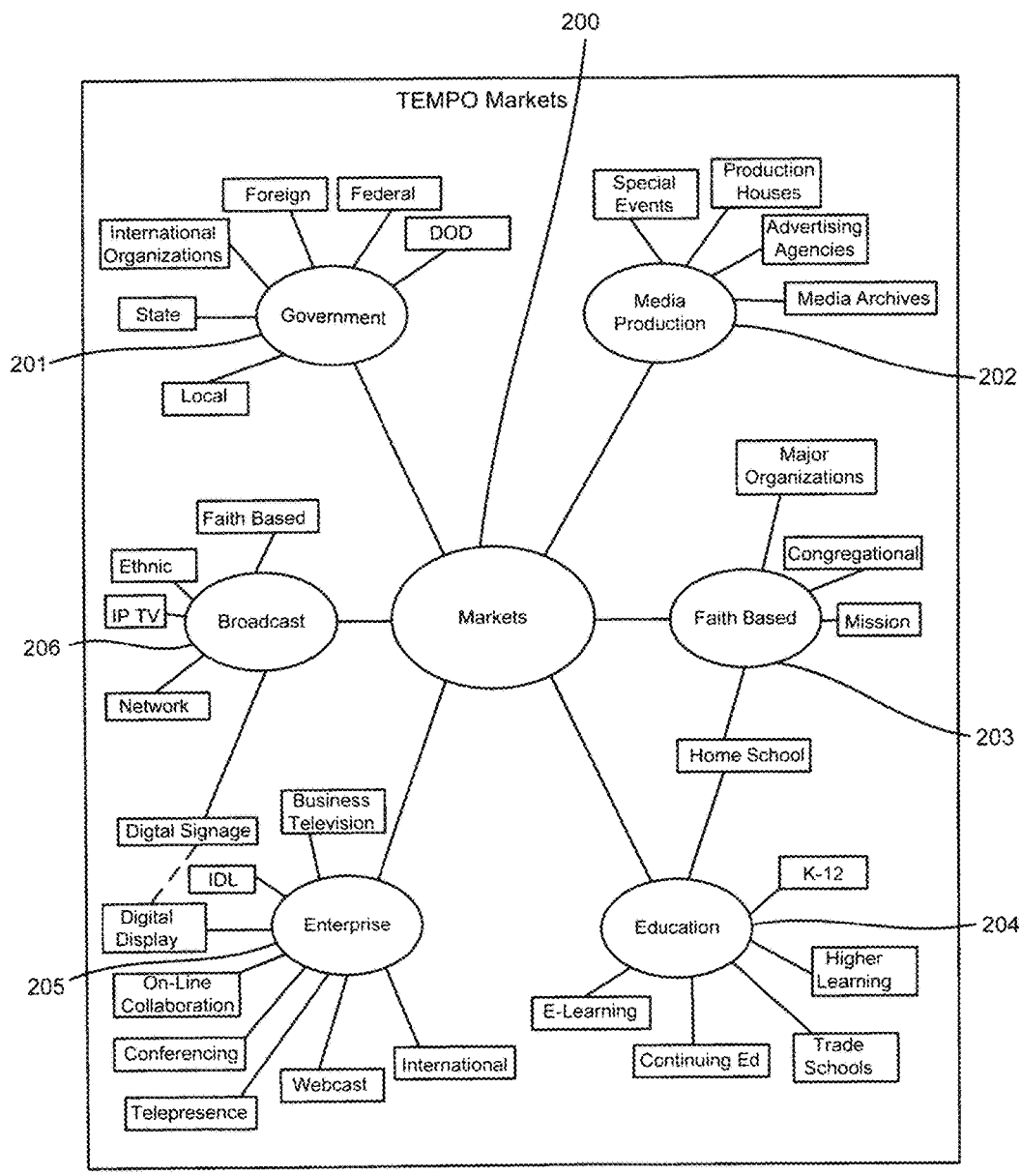
FIG. 41 is a diagram illustrating markets for the present invention including Government, Media Production, Faith Based, Education, Enterprise, and Broadcast.

The Markets 200 of the present invention are illustrated generally in FIG. 41. The Markets include Government 201 which comprises Local, State, International Organizations, Foreign, Federal and Department of Defense; Media Production 202 comprising Special Events, Production Houses, Advertising Agencies and Media Archives; Faith Based 203 including Major Organizations, Congregational, Mission and Home School; Education 204, namely, K-12, Higher Learning, Trade Schools, Continuing Ed and E-Learning; Enterprise 205 which comprises Business Television, IDL, Digital Display, On-Line Collaboration, Conferencing, Telepresence, Webcast and International; as well as Broadcast 206 which comprises Faith Based, Ethnic, IPTV, Network and Digital Signage markets. Notably, an optional linkage 207 is provided between the Digital Signage of the Broadcast market and Digital Display of the Enterprise market.

Figure 42:
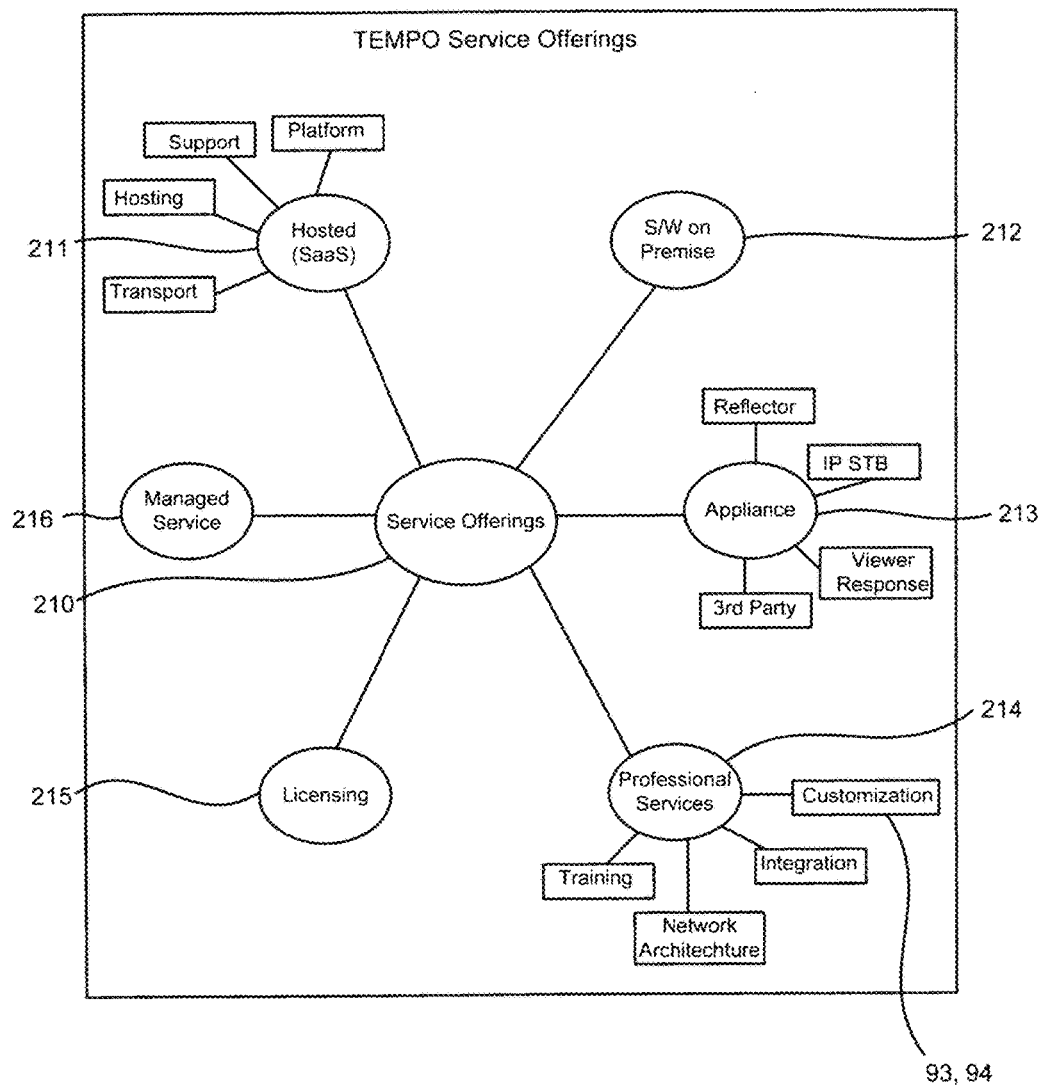
FIG. 42 is a diagram showing Service Offerings, according to one embodiment of the present invention, including Hosted (SaaS), Appliance, Professional Services, and Managed Service.

Finally, the present invention provides Service Offerings 210, as set forth in FIG. 42. The Service Offerings include Hosted (SaaS) 211 which comprises Transport, Hosting, Support and Platform; S/W on Premise 212; Appliance 213 which comprises Reflector, IP STB, Viewer Response and 3$^{rd}$ Party; Professional Services 214 including Customization, Integration, Network Architecture and Training; Licensing 215; and Managed Service 216.

Figure 43:
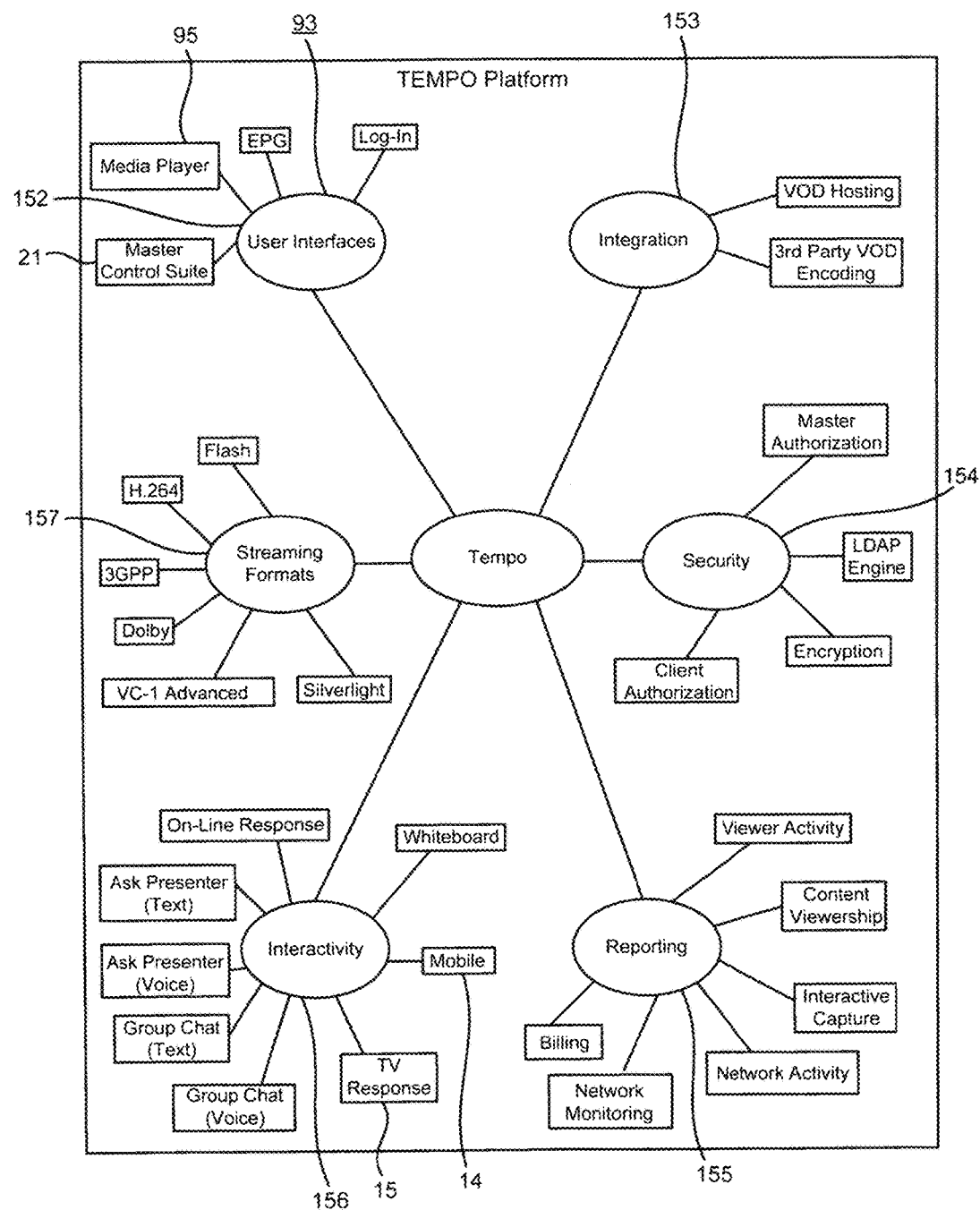
FIG. 43 is a diagram illustrating a novel platform according to the present invention including, in combination, unique User Interfaces, Integration, Security, Reporting, Interactivity, and Streaming Formats.

Specifically, as shown in FIG. 43, the present invention concurrently provides a novel platform including, in combination, unique User Interfaces 152 (Master Control Suite, Media Players Electronic Program Guide, and Secure Login), Integration 153 (VOD Hosting and 3$^{rd}$ Party VOD Encoding), Security 154 (Master Authorization, LDAP Engine, Encryption and Client Authorization), Reporting 155 (Viewer Activity, Content Viewership, Interactive Capture, Network Activity, Network Monitoring and Billing), Interactivity 156 (On-Line Response, Ask Presenter (Text), Ask Presenter (Voice), Group Chat (Text), Group Chat (Voice), TV Response, Mobile Devices, and Whiteboard), and Streaming Formats 157 (Flash Player, H.264, 3GPP, Dolby, VC-1 Advanced and Silverlight).

Another key aspect of the present invention is the novel architecture and functionality of the Platform, which provides control and management, for instance, of Interactive Distance Learning and Training in both Real-Rime, or Live, or File based content that is completely Internet based. The System and Platform, according to the present invention, supports many variations of Enterprise Corporate communications as well.

The Enterprise Media Platform is preferably hosted at a conventional or unconventional Network Operations Center, e.g., GSI Network Operations Center or the like, with multiple Internet Content Delivery Networks for ensuring reliable service to viewers. The present invention and/or the service it provides allows the service provider to, in effect, become a single source provider for both terrestrial and satellite-based Enterprise Media Networks. By coupling a versatile software platform with 24/7 network monitoring and global field services, the present invention creates a total solution for the enterprise market.

Generally speaking, the present invention incorporates and provides a business software platform accommodating both internal (e.g., from a secure corporate WAN) and external (e.g., via the Internet, Satellite, Television and/or Cellular Communications Networks) video communications across multiple content delivery topologies to multiple viewing environments (e.g., Computers, Televisions and/or Mobile Devices). As described above, such capabilities include Secure Delivery of Live & On-Demand Content; Delivery Across CDN, Satellite, Corporate WAN; Delivery to PC's, TV's and Mobile Telephones; Interactive Communications; Business Intelligent Analytics; a Global Delivery Platform; Media Publishing, Transcoding and Event Capture Services.

The technology Platform of the present invention is preferably built on an Adobe Platform or the like, because of the rather enormous graphics and visuals to be handled, and so that the Platform preferably looks the same on every machine (e.g., Computer or display), whether on a Mac, Firefox, Explorer, etc. It is also preferred that the System utilize an Adobe based server (e.g., running on an open source Adobe Flex framework or operating system) and a Cold Fusion server (e.g., also running an Adobe Flex operating system). Simply put, the present invention, in this embodiment, provides one platform that is Flex based. Uniquely, the credentials the User is assigned change what the User experiences. There is no "server" side and no "client" side, just one platform and one set of code. Everyone runs the same Computer code and one operating system decides what you get to access and operate based on a Username and Password. In this respect, the simplicity of the present invention is what creates its power.

Adobe Flex leverages elements of Adobe Flash and Action Scripts to create a powerful, efficient open source platform that accommodates a wide range of application integration and extension options. For enterprise or business application, the Flex platform enables the System of the present invention to more readily create customized interfaces and integrate with existing enterprise software packages, such as Human Resource Platforms and Learning Management Systems. Flex has also been found advantageous for its extraordinary security and scalable platform.

The present invention provides secure networking and protects the integrity of all Live and Qn-Demand content. It integrates with most conventional Enterprise Security Platforms, including Lightweight Directory Access Protocol (LDAP) that is used by Microsoft Active Directory, Novell Netware, and Cisco networking products. For applications that do not have these security platforms, the present invention may be used to provide a secure access directory for a customer's network.

Additionally, streaming is provided preferably in either Adobe Flash or H.264, depending on the viewing environment. In this manner, content may originate from any organization's facility, the service provider (e.g., Globecomm Systems) or one or more cloud-based VOD servers, thereby providing an optimal network architecture.

Moreover, the present invention provides a wide array of Media Players, allowing a content publisher to select the Media Player with appropriate functionality for a specific streamed event. Preferably, all Media Players are created in Adobe Flex and are customizable. The Viewer is only required to have a reasonably up-to-date version of a conventional Web Browser (Microsoft Internet Explorer, Mozilla Firefox, or Apple Safari) to view network programming. No added software (other than Adobe Flash) or plug-ins are required on the Viewer's Computer.

In this manner, the present invention minimizes latency in the delivery of content, which is particularly important for Live interactive programming.

Figure 44:
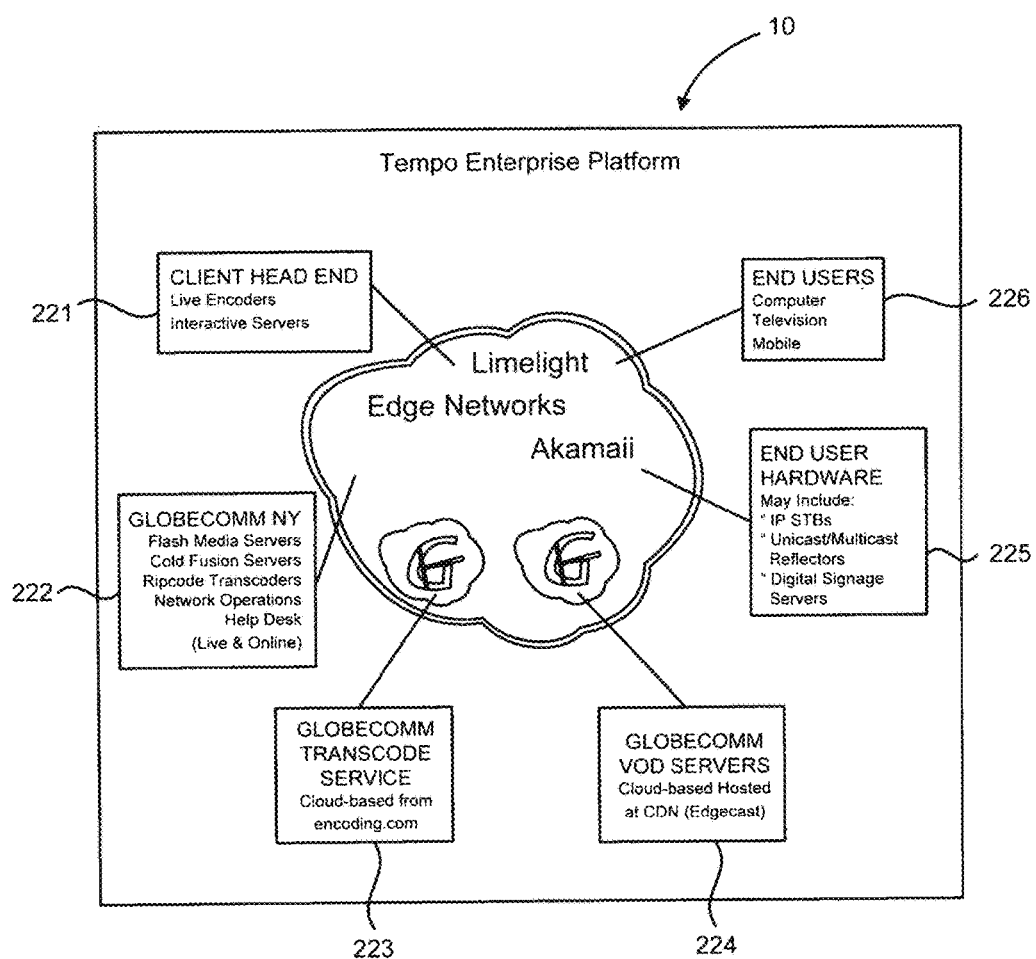
FIG. 44 shows schematically an Enterprise Media Control Platform, in accordance with one embodiment of the present invention, comprising a Client Head End, a Service Provider, a Cloud-based Transcode Service, Cloud-based VOD Servers hosted at a Content Delivery Network, End User Hardware, and End Users.
Figure 45:
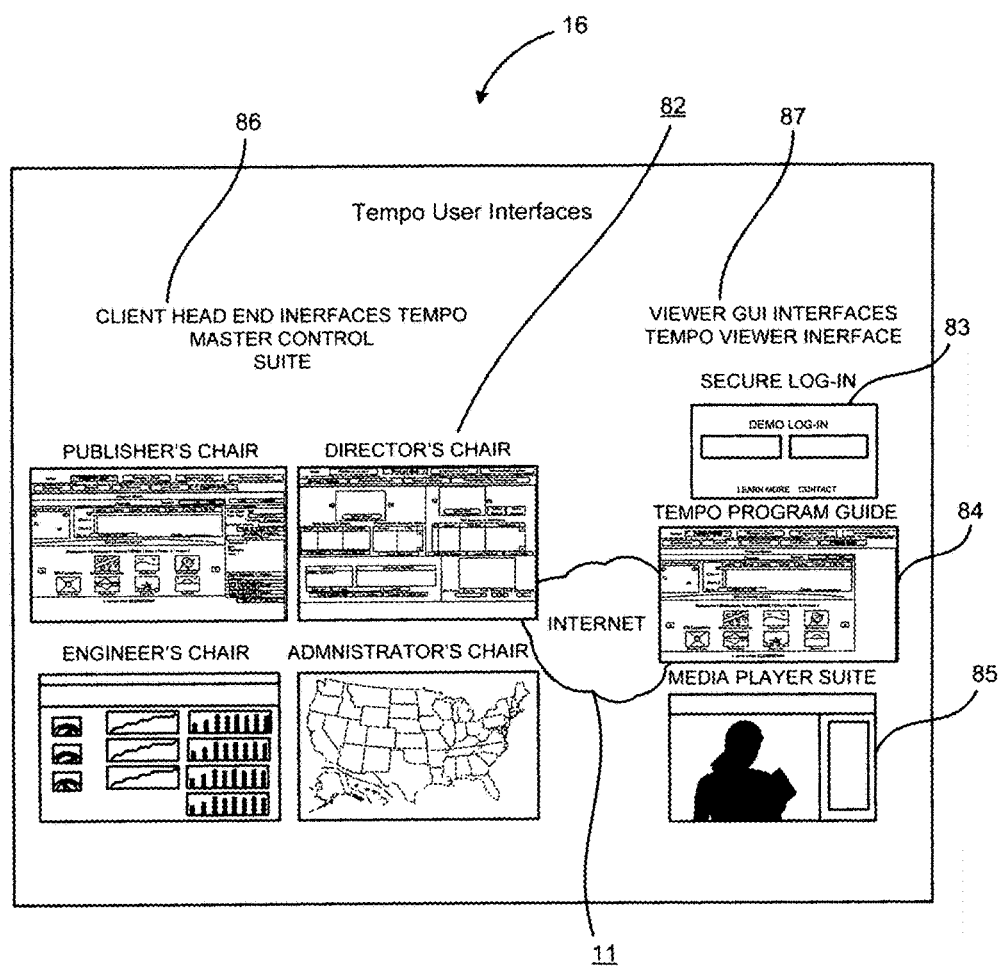
FIG. 45 is a diagram illustrating both User/Client Head End Interfaces (Master Control Suite) and Viewer GUI Interfaces (Viewer Interface)

As shown in FIG. 44, a Enterprise Media Control Platform 220, in accordance with one embodiment, includes a Client Head End 221 comprising Live Encoders and Interactive Servers; a Service Provider 222 having Flash Media Servers, Cold Fusion Servers, Ripcode Transcoders, Network Operations and a Help Desk (Live and Online); a Cloud-based Transcode Service 223 (e.g., from encoding.com); Cloud-based VOD Servers 224 hosted at a Content Delivery Network (e.g., Edgecast); End User Hardware 225 optionally including IP STB's, Unicast/Multicast Reflectors and/or Digital Signage Servers; and End Users 226, namely, Computers, Televisions and/or Mobile Devices, collectively, for example, over Limelight Edge Networks Akamaii. The applicable interface for the Platform is desirably supplied by the Service Provider, e.g., Assignee Globecomm Systems.

A Viewer Interface 82 provides Viewer 80 with a series of intuitive interfaces and navigation which allow ease of operation for Users of any skill level. In the present embodiment, the three primary Viewer Interfaces are Secure Login 83, Viewer Content Interface 84 and Media Players 85. A diagram illustrating both User/Client Head End Interfaces 86 (Master Control Suite) and Viewer GUI Interfaces 87 (Viewer Interface) are shown, for instance, in FIG. 45.

In general, the User enters the Service of the present invention using a Secure Web Login Interface. Desirably, the System provides for a single sign-on by a User. The Secure Login Interface is either a conventional or non-conventional customer-furnished security authorization System integrated with the Service of the present invention or with the Service's own security authorization System. According to one arrangement, the Lightweight Directory Access Protocol (LDAP) System identifies the User and determines which content a specific User is authorized to view. This security and database approach allows the Service to create a record of the content viewed by each User and records all interactive responses by the User. This data can be compiled using the System Analytics Engine, e.g., conventional, to produce actionable feedback or can be exported to a Learning Management System, e.g., of a conventional type.

Figure 46:
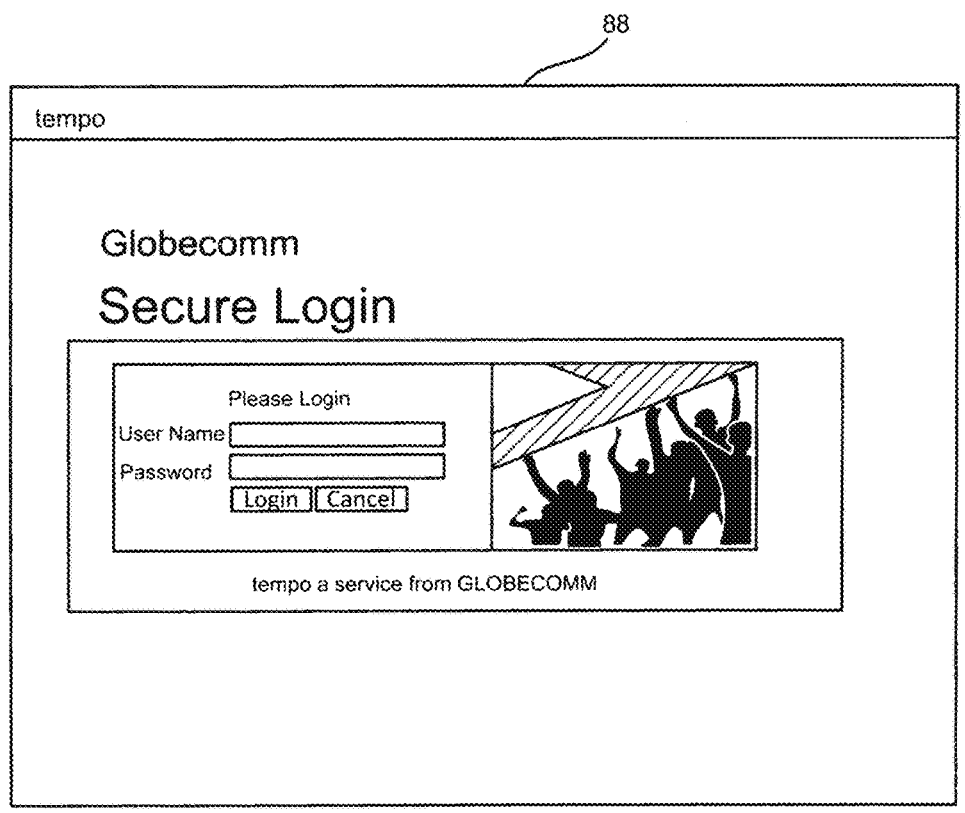
FIG. 46 is a screen shot showing a Secure Login Web Page optionally branded to the Enterprise that is using/running a Service Secure Login Interface.

The Secure Login Interface is readily integrated into any HTML page using an Application Programming Interface (API). The Service may host Web Sites as part of the Service it provides to the customer, the Secure Login Web Page 88 optionally being branded to the Enterprise that is using/running the Service, as illustrated in FIG. 46.

Figure 47:
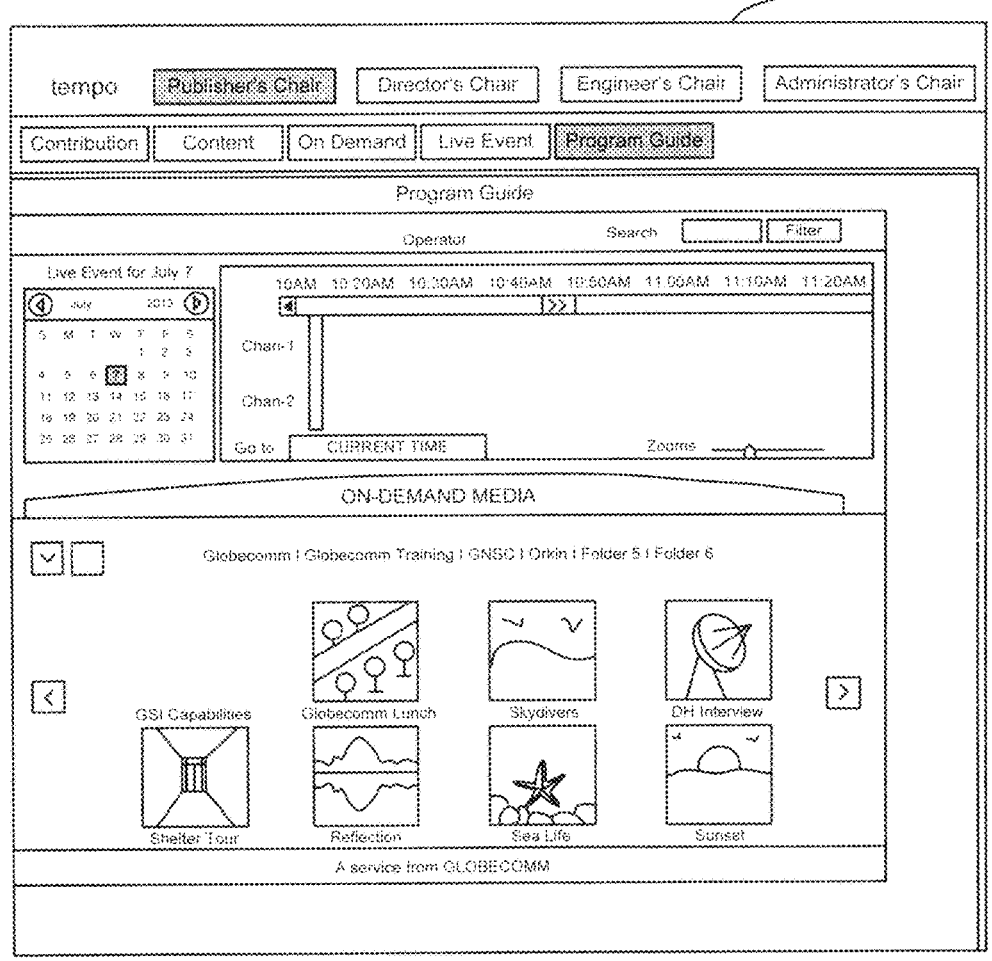
FIG. 47 is a screen shot displaying a Web Portal, such as the Electronic Program Guide User Interface, for allowing the User to browse available Live or On-Demand content for viewing, once the User has been successfully authorized via his/her Username and Password.

Once the User has been successfully authorized via his/her Username and Password, he/she is directed to a Web Portal, such as the Electronic Program Guide User Interface 89 shown in FIG. 47. This Interface permits the User to browse available Live or On-Demand content for viewing. It is preferred that all Viewer Content Interfaces of the present invention include search functions that allow the User to readily identify specific programming.

A "standard" EPG-styled Content Interface may include one or more or all of the following: (i) a Network Branding function that allows the User to create his/her own branded content interface; (ii) a Calendar Interface which permits the Viewer to select future dates to browse Live Events; (iii) a Live Event Guide which enables the User to browse Live Events with Television-like navigation; (iv) a Program Metadata function by which placing the cursor over any event will reveal program metadata, and which allows a future event to be saved to the Viewer's Microsoft Outlook Calendar; (v) a Content Search function, with a search algorithm based on Title and Metadata data fields, allowing Viewers to search for content across the Platform; (vi) On-Demand Folders wherein On-Demand programming is organized in a folder system which, according to one aspect of the present invention, permits a plurality, e.g., three, of tiers of sub-folders as well as automated folders for items such as Social Media and Highest Rated content; (vii) an On-Demand Content Guide which permits a Viewer to browse On-Demand programming with the ability to enter folders and view metadata (i.e., when the cursor is placed over the thumbnail image); and (viii) a Thumbnail/List Views function that provides the Viewer with the capability to view On-Demand programming in either a thumbnail or list view. Each Interface of the present invention is preferably managed and customized by the User using the Master Control Suite.

It is further preferred that the present invention contain a suite of Media Players designed to provide Viewers with the necessary features for yielding the desired viewing experience. The Media Player Suite provides specific Media Players for Broadcast, Presentation, and Interactive Distance Learning applications. Various conventional players usable for Live Events and On-Demand programming are available, as will be appreciated by those skilled in the art.

Figure 48:
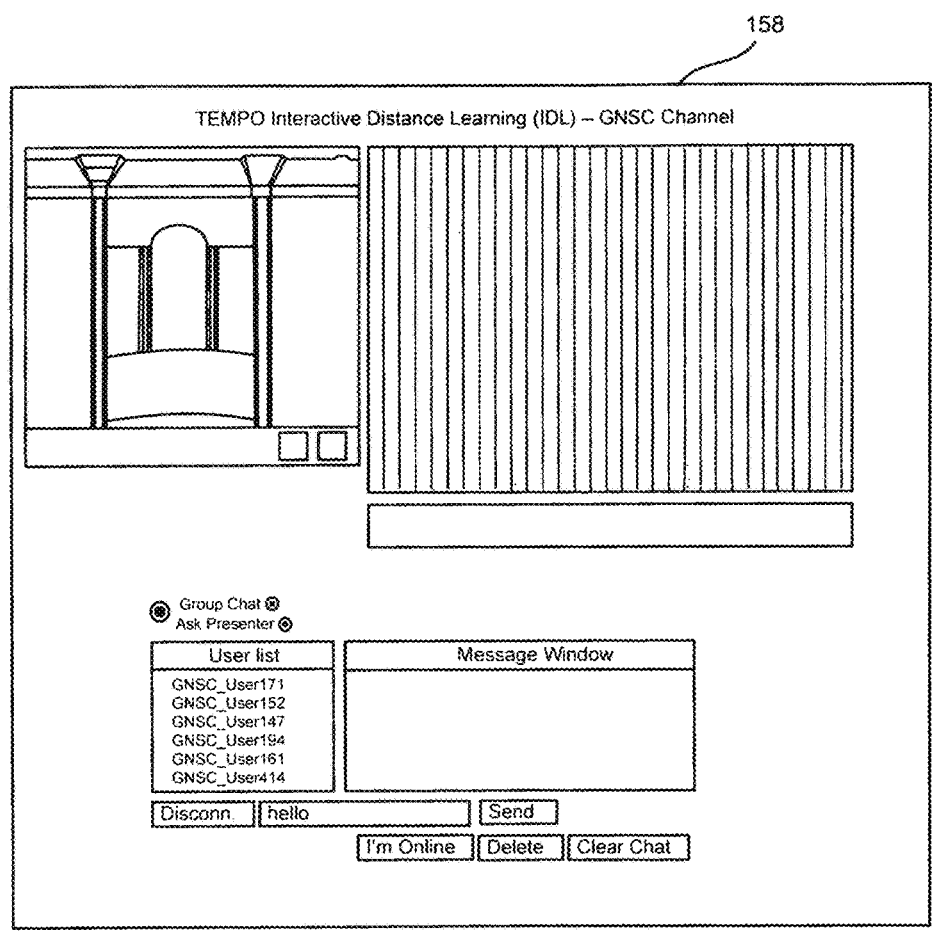
FIG. 48 is a screen shot of a representative Interactive Distance Learning Media Player, in accordance with various aspects of the present invention.

Features of an Interactive Distance Learning Player 158, as described above, include, but are not limited to, the Video Window, Slide And Polling Window, Ask The Presenter Interactivity, Group Chat Interactivity, Media Player Sizing, Full Screen Mode, Volume Control/Mute, Progress Bar (with Slide Locator for On-Demand programming), and Play/Pause Control (for On-Demand). A screen shot of a representative Interactive Distance Learning Media Player is shown in FIG. 48. Similarly, the Presentation Player desirably includes a Video Window, Slide And Polling Window, Media Player Sizing, Full Screen Mode, Volume Control/Mute, Progress Bar (with Slide Locator for On-Demand), and Play/Pause Control (for On-Demand).

As for the Broadcast Player, it includes a Video Window, a Media Player Sizing function, Full Screen Mode, Volume Control/Mute, a Progress Bar (with Slide Locator for On-Demand programming), and Play/Pause Control (for On-Demand).

Figure 49:
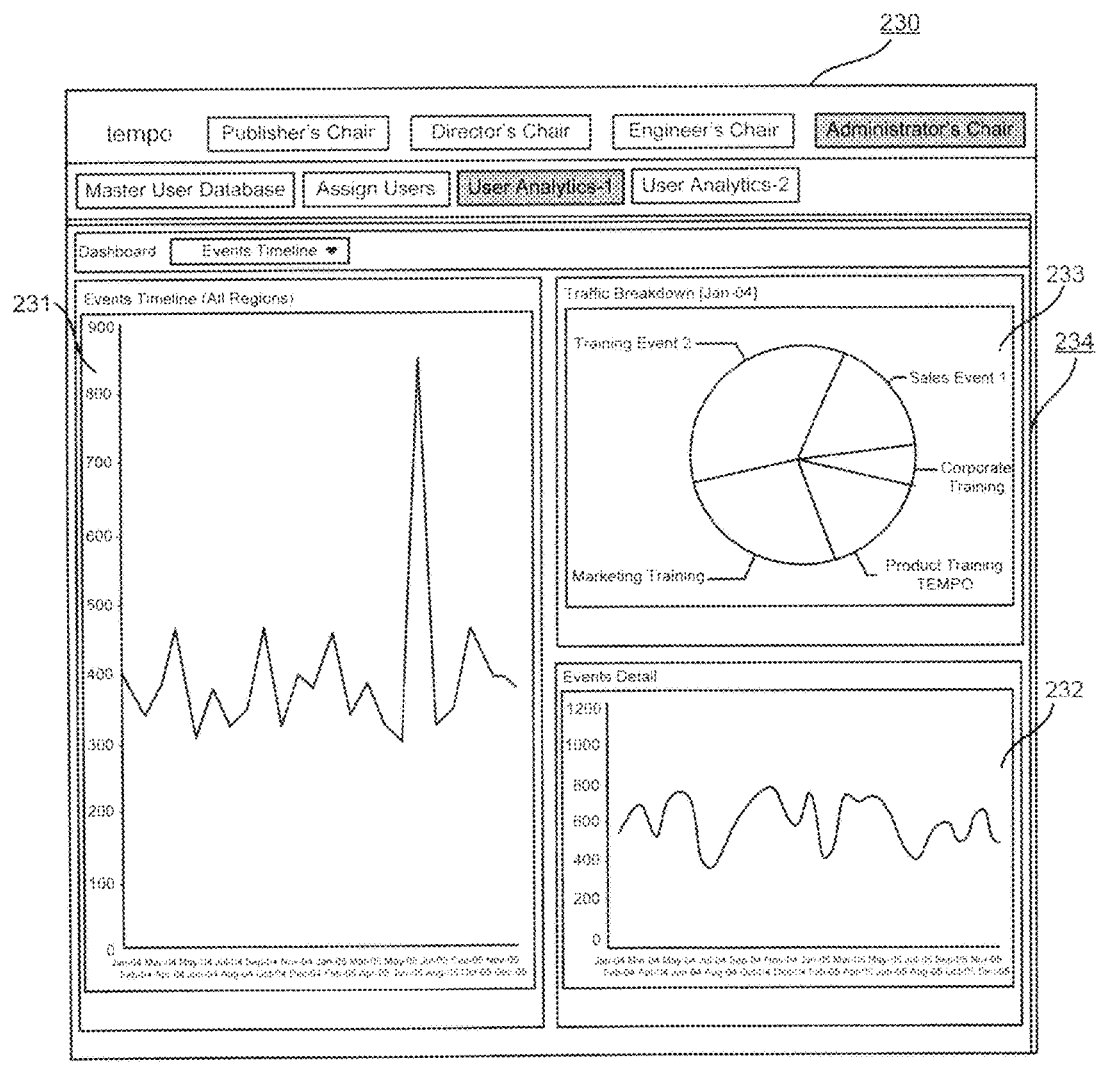
FIG. 49 shows an exemplary Analytics Dashboard interface that organizes and allows the User to generate one or more reports based on any of the data that is collected by the System.

Yet a further interface of the present invention is System Analytics 230. More particularly, the present invention is integrated with Fusion Charts to create an interface that allows Users to generate a wide variety of reports based on any of the data that is collected by the System. It organizes analytics into three sections: Network Analytics 231, Program Analytics 232, and Viewer Analytics 233, all of which analytics are customizable. A sample Analytics Dashboard 234 is shown in FIG. 49.

Alternatively or concurrently, the Platform, System and Service are preferably fully SCORM 1.2 compliant for purposes of recording time and test scores for non-federal systems.

The Platform, System and Service, in accordance with one arrangement of the present invention, has selected minimum system requirements for reliable operation. First, the Viewer is required generally to have a minimum amount of available bandwidth on, or associated with, the Viewing Device. The recommended bandwidth requirements are 500 Kbps (minimum required for 300 Kbps encoded video) for Low Quality viewing and 700 Kbps (minimum required for 500 Kbps encoded video) for High Quality viewing. Also recommended is a broadband connection with 3 Mbps downstream and 512 Kbps upstream. As will be appreciated by those skilled in the art, these values may differ depending on the nature and quality of the video being streamed. Minimum Window Requirements are provided in Table I below.

TABLE 1.2-1

Tempo Minimum Windows Requirements

| | Viewer | | Master Control Suite | |
|---|---|---|---|---|
| Parameter | Minimum | Recommended | Minimum | Recommended |
| CPU | Intel Pentium-4 3.0 GHz or Equivalent | Intel Pentium-4 3.0 GHz or Equivalent | Intel Pentium-4 3.0 GHz or Equivalent | Intel Pentium-4 3.0 GHz or Equivalent |
| Memory | 512 MB | 1 GB | 1 GB | 2 GB |
| Video Memory | 64 MB | 128 MB | 128 MB | 256 MB |
| Operating System | Windows 2000 Windows XP Windows Vista Windows 7 | Windows XP Windows Vista Windows 7 | Windows XP Windows Vista Windows 7 | Windows XP Windows Vista Windows 7 |
| Video Resolution | 1024 × 768 | 1280 × 1024 | 1280 × 1024 | 1280 × 1024 |
| Browser | Internet Explorer 7 Mozilla Firefox 3.6 | Internet Explorer 8 Mozilla Firefox 3.6 | Internet Explorer 8 Mozilla Firefox 3.6 | Internet Explorer 8 Mozilla Firefox 3.6 |
| Adobe Flash | Version 10 | Version 10 | Version 10 | Version 10 |

Minimum Macintosh Requirements for a system, according to another embodiment of the present invention, are as follows:

TABLE 1.2-2

Tempo Minimum Macintosh Requirements

| | Viewer | | Master Control Suite | |
|---|---|---|---|---|
| Parameter | Minimum | Recommended | Minimum | Recommended |
| CPU | Intel Core Duo 1.83 GHz or Equivalent | Intel Core Duo 1.83 GHz or Equivalent | Intel Core Duo 1.83 GHz or Equivalent | Intel Core Duo 1.83 GHz or Equivalent |
| Memory | 512 MB | 1 GB | 1 GB | 2 GB |
| Video Memory | 64 MB | 128 MB | 128 MB | 255 MB |
| Operating System | OSX 10.5 | OSX 10.6 | OSX 10.5 | OSX 10.6 |
| Video Resolution | 1024 × 768 | 1280 × 1024 | 1280 × 1024 | 1280 × 1024 |
| Bandwidth Requirement | 750 kb/s or higher | | | |
| Browser | Safari 4.0 Mozilla Firefox 3.6 | Safari 4.0 Mozilla Firefox 3.6 | Safari 4.0 Mozilla Firefox 3.6 | Safari 4.0 Mozilla Firefox 3.6 |
| Adobe Flash | Version 10 | Version 10 | Version 10 | Version 10 |

Generally speaking, according to various aspects of the present invention, components, modules, programming and interfaces, as described above, may be custom or conventional products, within the spirit and scope of at least one aspect of the present invention.

Various modifications and alterations to the present invention may be appreciated based on a review of this disclosure. These changes and additions are intended to be within the scope and spirit of this invention.

What is claimed is:

1. An interactive, program-controlled, enterprise management system for selective access to operation, design, delivery and control of TCP/IP data as a Web application over an interactive global communications network, the system comprising:
   a network including a plurality of servers for operation over the interactive global network, each server having one or more microprocessors and system memory; and
   a plurality of user devices each for presenting media content from the servers on a display, the display interfaced to the corresponding user device;
   at least one of the servers housing a publisher module for creating content on the network including live events and uploading of video-on-demand programming;
   at least one of the servers housing a single director module housed on at least one of the servers for controlling access to, and managing viewing of, the network content in real-time or live, including management of the live events with selective control over creation and management of slides, polling and on-line chat, the director's module enabling switching between any system module created, while automating the capture of all system interactive activity for later analytics, security and operations;
   at least one of the servers housing an engineer module for controlling network infrastructure including encoders and media servers, real-time network status and access to any open trouble tickets on the network; and
   at least one of the servers housing an administrator module for managing the viewer database, testing database, usage reports, billing and analytics, the administrator module including at least one function for administrator switching such that the operating node of the system for managing the viewer database, testing database, usage reports, billing and analytics is selectively switchable by and between one or more users of the system;
   the system further comprising a master control user interface for one-click access to each of the publisher, director, engineer and administrator modules so as to provide user access to and interaction with the major application areas corresponding to the respective modules for the entirety of control and management of the system by the user; and
   the system further including, in combination, advanced stream handling and automated content delivery network handoff and integration so as to provide at least tenfold magnification of the number of simultaneous users;
   wherein the system permits networks to distribute across multiple Internet content delivery networks including satellite, terrestrial, mobile, symmetrical and asymmetrical transport to simultaneously reach and interact with satellites, computers, televisions and mobile devices interactively and globally, and concurrently allow an operator to create and customize a secure, private network for its internal communications, employee training and digital display; and
   wherein each of the modules is stored in the system memory and is executed by one or more of the microprocessors on the at least one server housing the respective module(s).

2. The system set forth in claim 1, wherein the administrator module is integrated with one or more servers of pre-existing enterprise systems to enhance workflow.

3. The system set forth in claim 1, wherein the engineer module includes a virtual toolbox for speeding resolution of issues with an array of troubleshooting tools.

4. A program-controlled apparatus including an enterprise management platform and interactive system for control and management of the delivery of content over one or more TCP/IP enabled networks, the platform and interactive system having cloud-based programming modules for providing selective access to operation, design, delivery and control, respectively, of TCP/IP data as a Web application over an interactive global communications network, the platform and interactive system modules further permitting distribution of TCP/IP data across multiple Internet content delivery networks for simultaneously reaching and interacting with satellites, computers, televisions and mobile devices interactively and globally, while concurrently allowing an operator to create and customize a secure, private network for its internal communications, employee training and digital display, the system comprising:
   a network including a plurality of cloud-based servers for operation over the global network, each server having one or more microprocessors and system memory; and
   a plurality of user devices each for presenting media content from the servers on a display, the display interfaced to the corresponding user device;
   at least one of the servers housing a publisher module for creating content on the network including live events and uploading of video-on-demand programming;
   at least one of the servers housing a single director module housed on at least one of the servers for controlling access to, and managing viewing of, the network content in real-time or live, including management of the live events with selective control over creation and management of slides, polling and on-line chat, the director's module enabling swtiching between any system module created, while automating the capture of all system interactive activity for later analytics, security and operations;

at least one of the servers housing an engineer module for controlling network infrastructure including encoders and media servers, real-time network status and access to any open trouble tickets on the network; and at least one of the servers housing an administrator module for managing the viewer database, testing database, usage reports, billing and analytics, the administrator module including at least one function for administrator switching such that the operating node of the system for managing the viewer database, testing database, usage reports, billing and analytics is selectively switchable by and between one or more users of the system;

the system further comprises a master control user interface for one-click access to each of the publisher, director, engineer and administrator modules for user access to and interaction with each of the major application areas corresponding to the respective modules for the entirety of control and management of the system by the user; and the system further including, in combination, advance stream handling and automated content delivery network handoff and integration so as to provide at least tenfold magnification of the number of simultaneous users;

wherein the system concurrently allows an operator to create and customize a secure, private network for its internal communications, employee training and digital display;

each of the modules is stored in the system memory and is executed by one or more of the microprocessors on the at least one server housing the respective module(s); and the one or more TCP/IP enabled networks includes satellite, terrestrial, mobile, symmetrical and asymmetrical transport for operation over the interactive global communications network.

5. A method for providing selective access to operation, design, delivery and control of TCP/IP data as a Web application over an interactive global communications network using an interactive, program-controlled, enterprise management system, the system including a network including a plurality of servers for operation over the interactive global network, each server having one or more microprocessors and system memory, a plurality of user devices each for presenting media content on a display, the display interfaced to the corresponding user device, and, in combination, advanced stream handling and automated content delivery network handoff and integration so as to provide at least tenfold magnification of the number of simultaneous users;

creating content on the network, using a publisher module housed on at least one of the servers, including live events and uploading of video-on-demand programming;

controlling access to, and managing viewing of, the network content, using a single director module housed on at least one of the servers, for in real-time or live, including management of the live events with selective control over creation and management of slides, polling and on-line chat, the director's module enabling switching between any system module created, while automating the capture of all system interactive activity for later analytics, security and operations;

controlling network infrastructure including encoders and media servers, real-time network status and access to any open trouble tickets on the network, using an engineer module housed on at least one of the servers;

managing the viewer database, testing database, usage reports, billing and analytics using an administrator module housed on at least one of the servers, the managing step including administrator switching, performed by at least one function of the administrator module, such that the operating node of the system for managing the viewer database, testing database, usage reports, billing and analytics is selectively switchable by and between one or more users of the system; and distributing data from the system across multiple Internet content delivery networks including satellite, terrestrial, mobile, symmetrical and asymmetrical to simultaneously reach and interact with satellites, computers, televisions and mobile devices interactively and globally, and concurrently creating and customizing by way of operator selection a secure, private network for its internal communications, employee training and digital display.

* * * * *